US008784512B2

(12) United States Patent
Wadley et al.

(10) Patent No.: US 8,784,512 B2
(45) Date of Patent: Jul. 22, 2014

(54) THIN FILM BATTERY SYNTHESIS BY DIRECTED VAPOR DEPOSITION

(75) Inventors: Haydn N. G. Wadley, Keswick, VA (US); Yoon Gu Kim, Charlottesville, VA (US); Sang-wan Jin, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 783 days.

(21) Appl. No.: 12/733,160

(22) PCT Filed: Aug. 13, 2008

(86) PCT No.: PCT/US2008/073071
§ 371 (c)(1),
(2), (4) Date: Apr. 28, 2010

(87) PCT Pub. No.: WO2009/023744
PCT Pub. Date: Feb. 19, 2009

(65) Prior Publication Data
US 2010/0242265 A1    Sep. 30, 2010

Related U.S. Application Data

(60) Provisional application No. 60/964,471, filed on Aug. 13, 2007, provisional application No. 60/964,452, filed on Aug. 13, 2007, provisional application No. 61/039,186, filed on Mar. 25, 2008, provisional application No. 61/053,471, filed on May 15, 2008, provisional application No. 61/080,539, filed on Jul. 14, 2008, provisional application No. 61/080,911, filed on Jul. 15, 2008.

(51) Int. Cl.
H01M 4/82    (2006.01)
H01M 6/00    (2006.01)
H01M 10/00   (2006.01)
H01M 6/04    (2006.01)
H01M 6/14    (2006.01)
H01M 4/02    (2006.01)

(52) U.S. Cl.
USPC ........... 29/623.5; 429/122; 429/188; 429/302

(58) Field of Classification Search
CPC .................. Y02E 60/122; Y02E 60/12; B29L 2031/3468; H01M 6/40; H01M 2/00; H01M 4/82; H01M 6/00; H01M 10/00; H01M 6/04; H01M 6/14
USPC .................. 29/623.1; 429/122, 188, 191, 302
See application file for complete search history.

(56) References Cited

U.S. PATENT DOCUMENTS

| | | | | |
|---|---|---|---|---|
| 5,338,625 A | * | 8/1994 | Bates et al. | 429/322 |
| 5,344,728 A | * | 9/1994 | Ovshinsky et al. | 429/223 |
| 5,411,592 A | * | 5/1995 | Ovshinsky et al. | 118/718 |
| 5,534,314 A | | 7/1996 | Wadley et al. | |
| 5,561,004 A | * | 10/1996 | Bates et al. | 429/162 |
| 5,597,660 A | * | 1/1997 | Bates et al. | 429/322 |
| 5,635,087 A | * | 6/1997 | Schiller et al. | 219/121.43 |
| 5,705,293 A | * | 1/1998 | Hobson | 429/162 |
| 6,863,699 B1 | | 3/2005 | Krasnov et al. | 29/623.1 |
| 6,982,132 B1 | * | 1/2006 | Goldner et al. | 429/162 |
| 2001/0032666 A1 | * | 10/2001 | Jenson et al. | 136/256 |
| 2002/0001747 A1 | * | 1/2002 | Jenson et al. | 429/162 |
| 2002/0110733 A1 | * | 8/2002 | Johnson | 429/149 |
| 2003/0097989 A1 | * | 5/2003 | Shinde et al. | 118/726 |
| 2004/0023106 A1 | * | 2/2004 | Benson et al. | 429/122 |
| 2004/0101761 A1 | * | 5/2004 | Park et al. | 429/322 |
| 2004/0118347 A1 | * | 6/2004 | Groves et al. | 118/723 EB |
| 2005/0008772 A1 | * | 1/2005 | Zhang et al. | 427/126.1 |
| 2005/0181280 A1 | * | 8/2005 | Ceder et al. | 429/231.1 |
| 2009/0081102 A1 | * | 3/2009 | Dai et al. | 423/306 |

FOREIGN PATENT DOCUMENTS

| JP | 2004-4139968 | * | 5/2004 | ............. H01M 4/02 |
|---|---|---|---|---|
| JP | 2007-005219 | * | 1/2007 | ........... H01M 10/58 |

OTHER PUBLICATIONS

Hawley's Condensed Chemical Dictionary [Hawley's] (Lewis, 14th edition, John Wiley and Son, Inc. [New York] Copyright 2002 {taken as December}, {http://www.knovel.com/web/portal/browse/display?_EXT_KNOVEL_DISPLAY_bookid=704&VerticalID=0}).*

(56) References Cited

OTHER PUBLICATIONS

Whitacre et al. Journal of The Electrochemical Society vol. 148 No. 10 pp. A 1078-A1084 2001.*
Real Dictionary ("onto" Synonym Section, Real Dictionary (C) 2001, Available May 26, 2003, Princeton University Princeton NJ USA {http://www.realdictionary.com/?q=onto}).*
UPTO interpreter Memo May 2013 (p. 1).*
Groves et al. [Groves II] Surface Engineering vol. 16 No. 6 pp. 461-464.*
USPTO Interpreter Translation Addendum (Statement Documents dated May 2, 2013 and Oct. 11, 2013) for Hayashi JP 2007-005219.*

* cited by examiner

*Primary Examiner* — Patrick Ryan
*Assistant Examiner* — Aaron Greso

(74) *Attorney, Agent, or Firm* — Vorys, Sater, Seymour and Pease LLP; Vincent M DeLuca; Robert J. Decker

(57) ABSTRACT

The present invention relates to methods for forming one or more thin film layers on a substrate, to form a multilayer product such as a lithium battery cell. The method involves passing a gas stream comprising at least one doping agent and at least one entrained source material through a plasma; impinging the gas stream on a substrate; and reactively depositing the at least one doping agent, and the at least one entrained source material on the substrate. The present invention provides a method of fabricating a power cell having a plurality of layers, and a method of fabricating a battery by electrically connecting a current collecting layer of a first power cell to a current collecting layer of a second power cell.

43 Claims, 44 Drawing Sheets

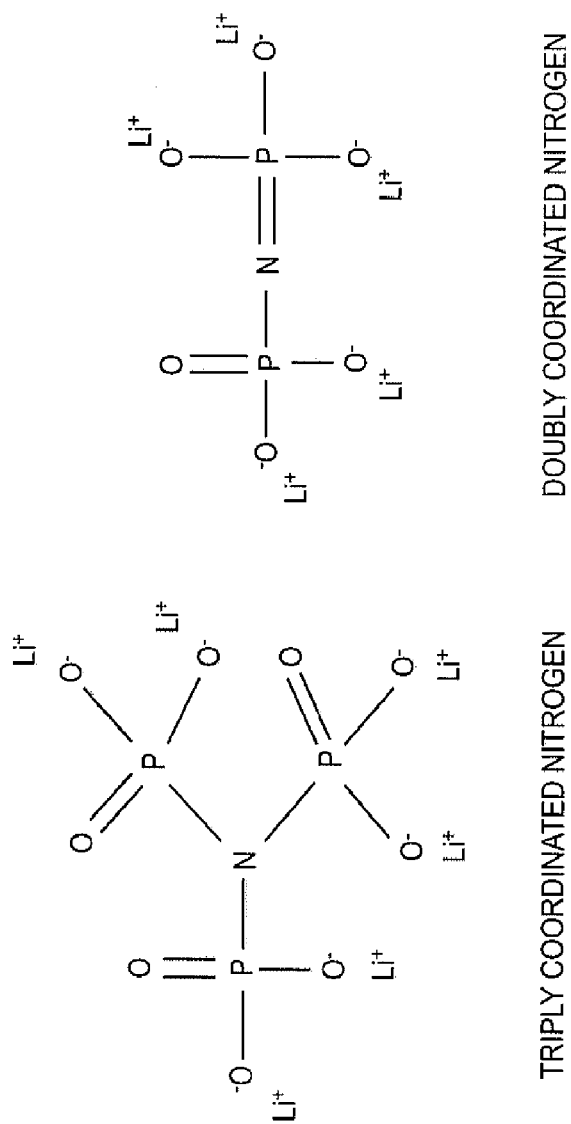

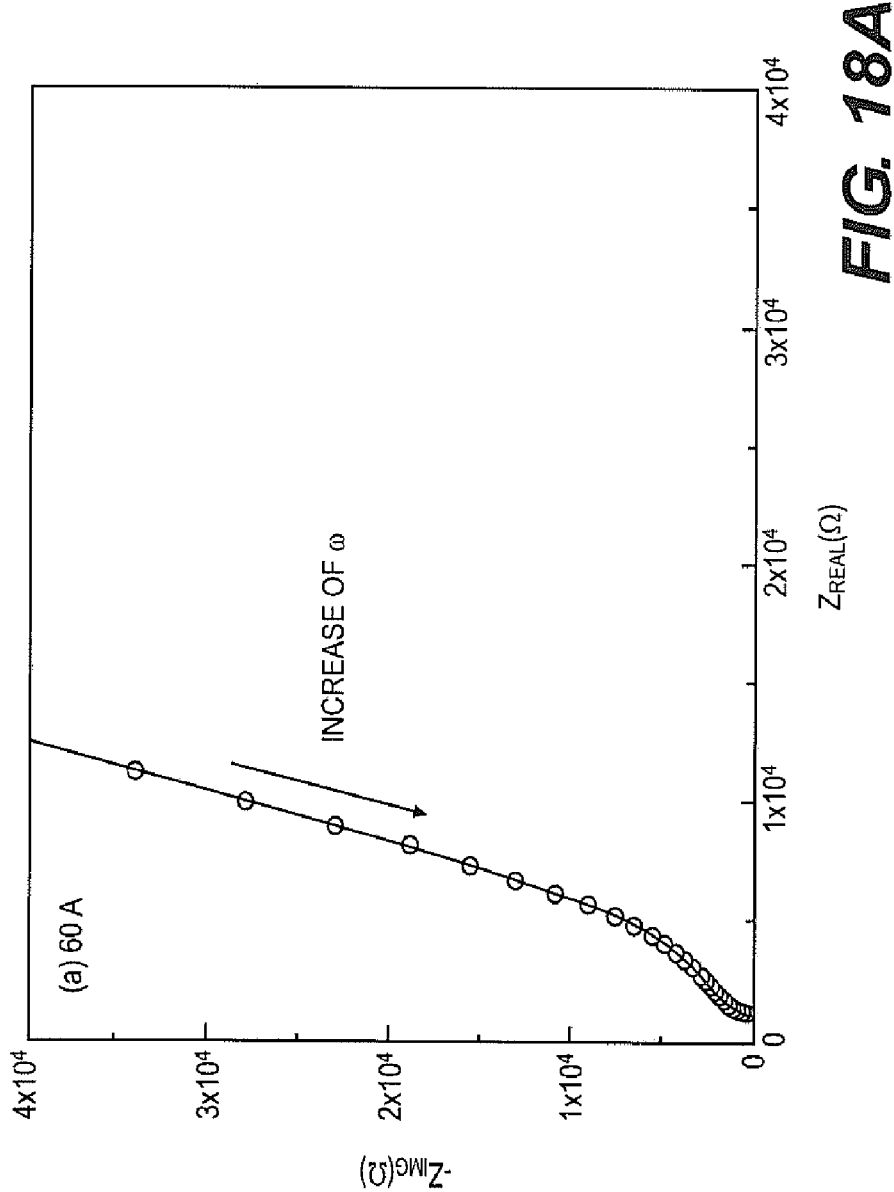

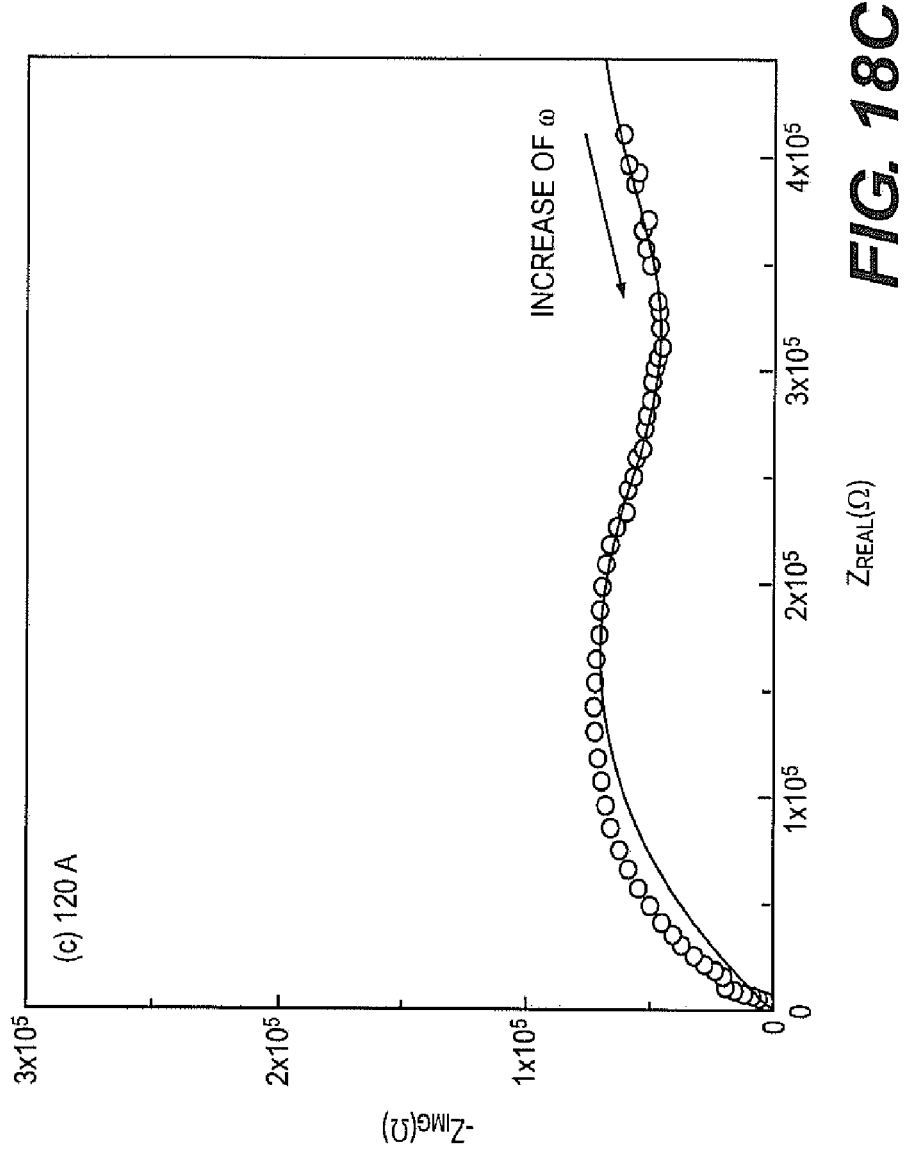

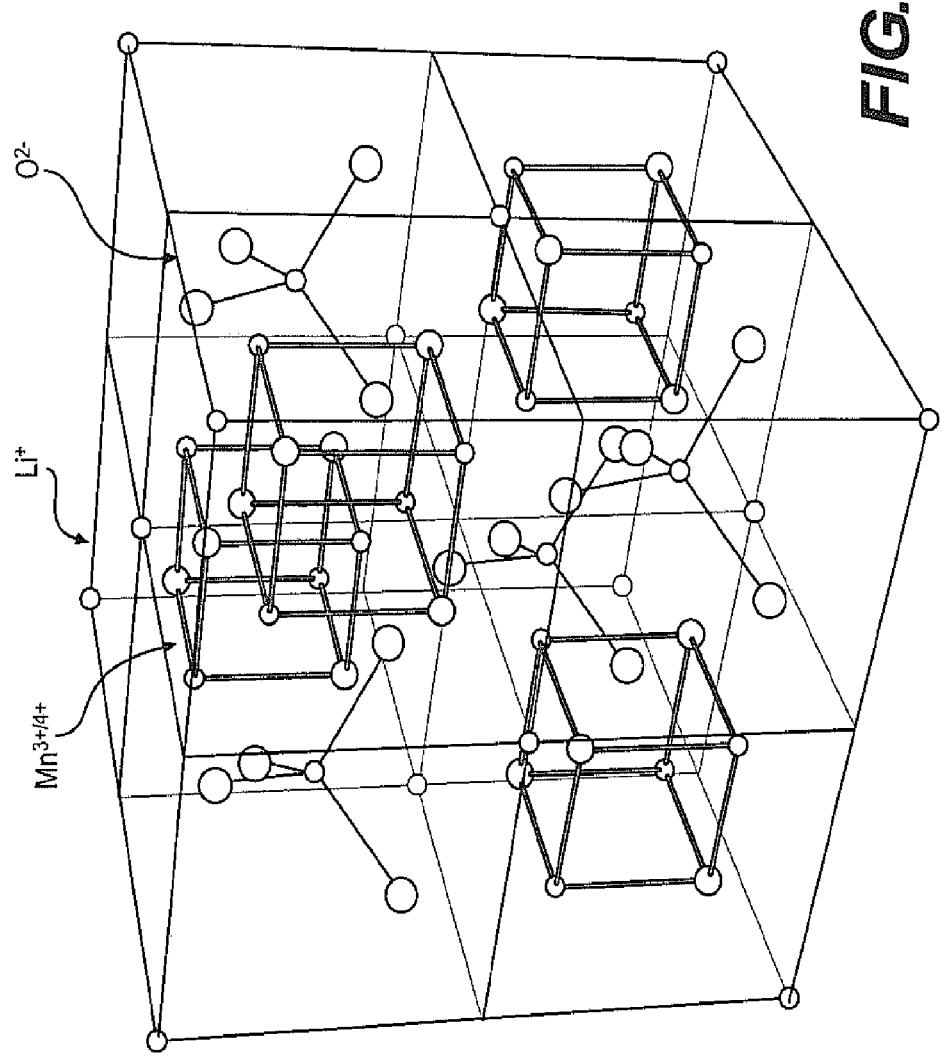

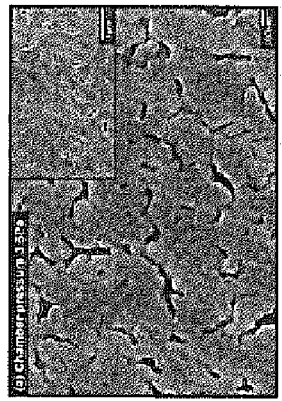
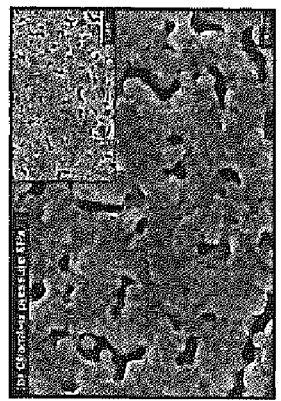
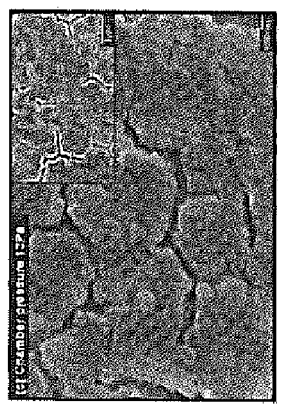
FIG. 27A
FIG. 27B
FIG. 27C

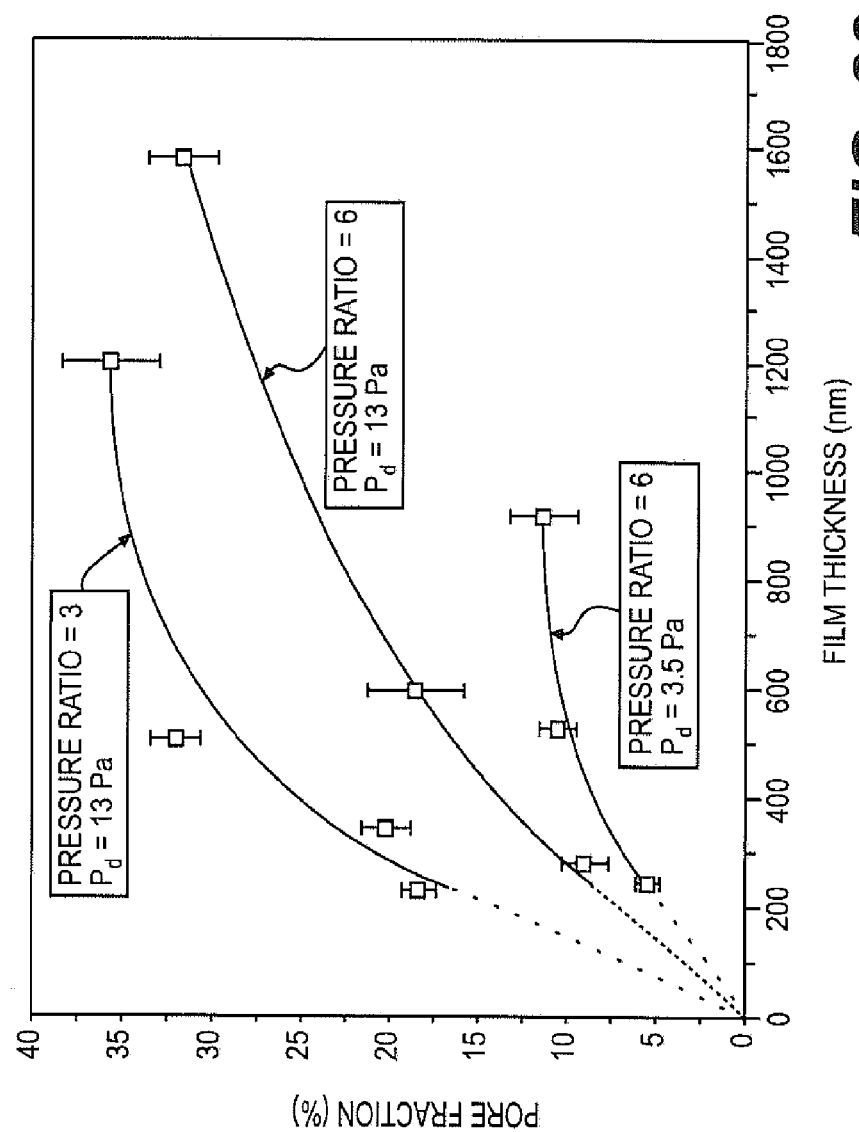

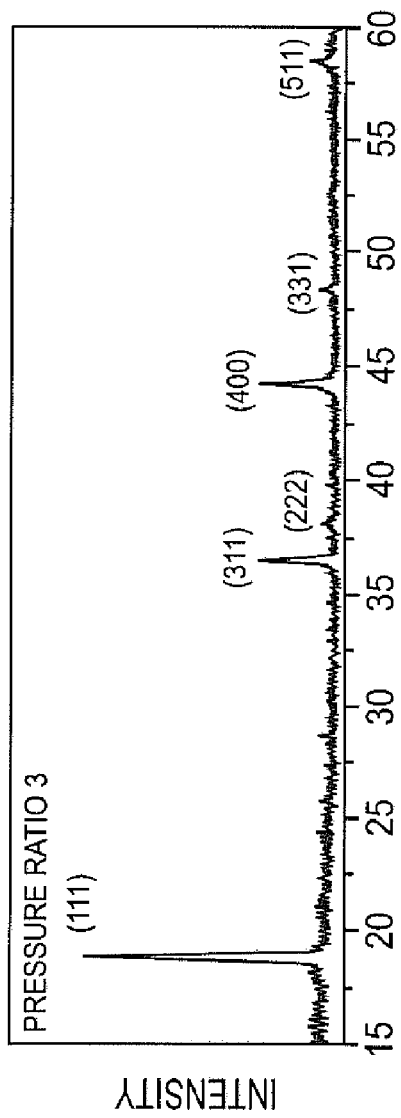
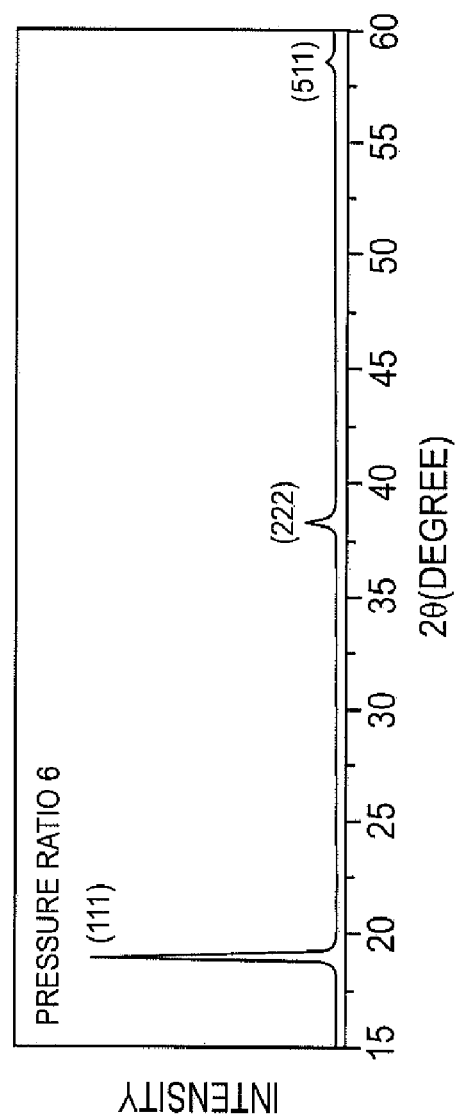
FIG. 32A
FIG. 32B

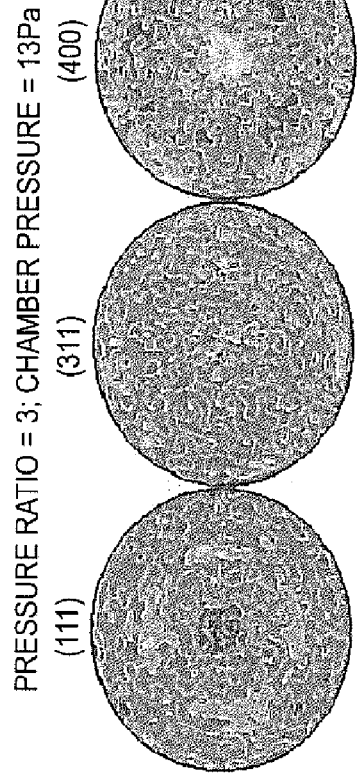
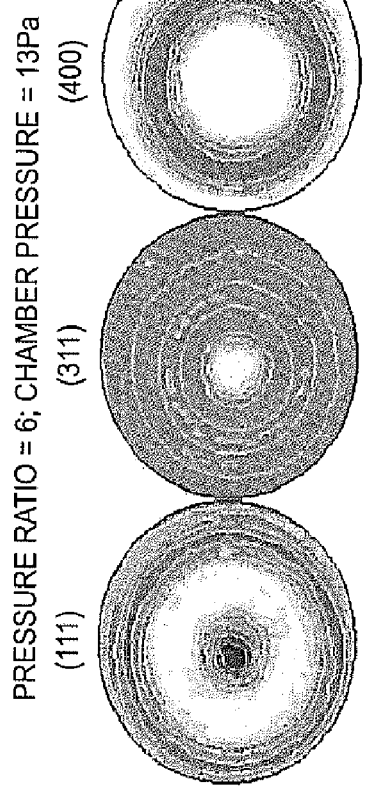

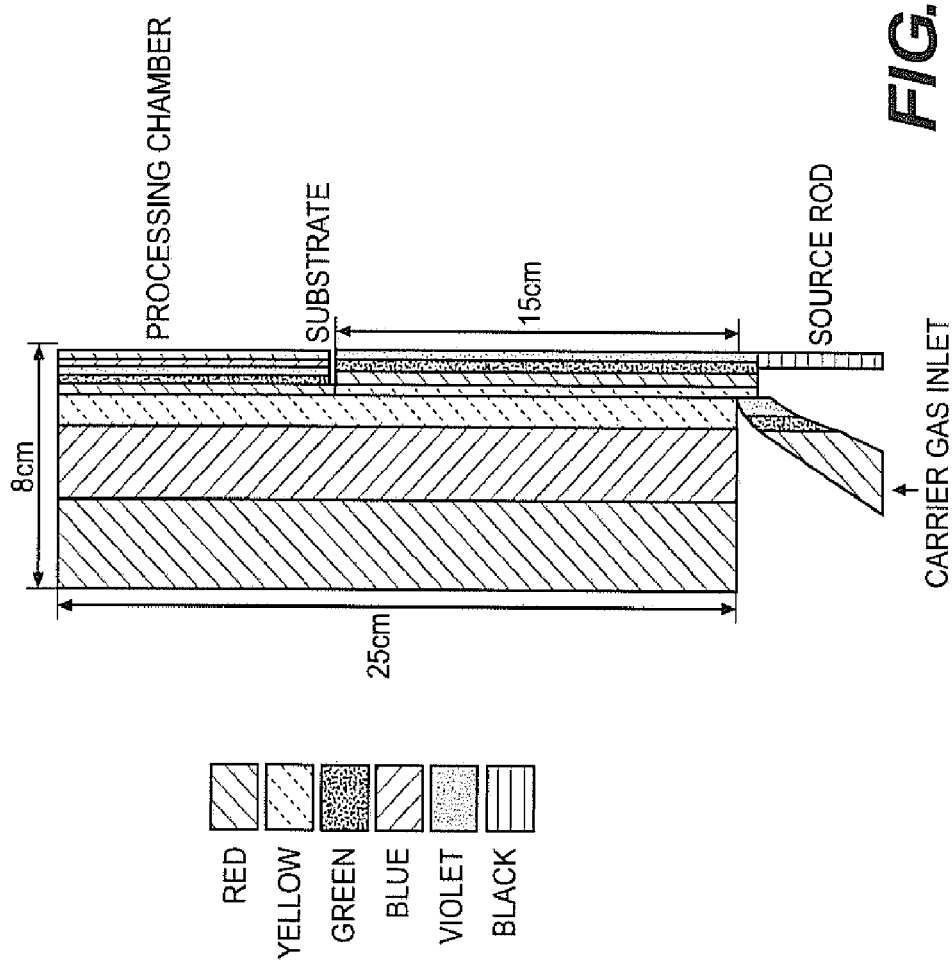

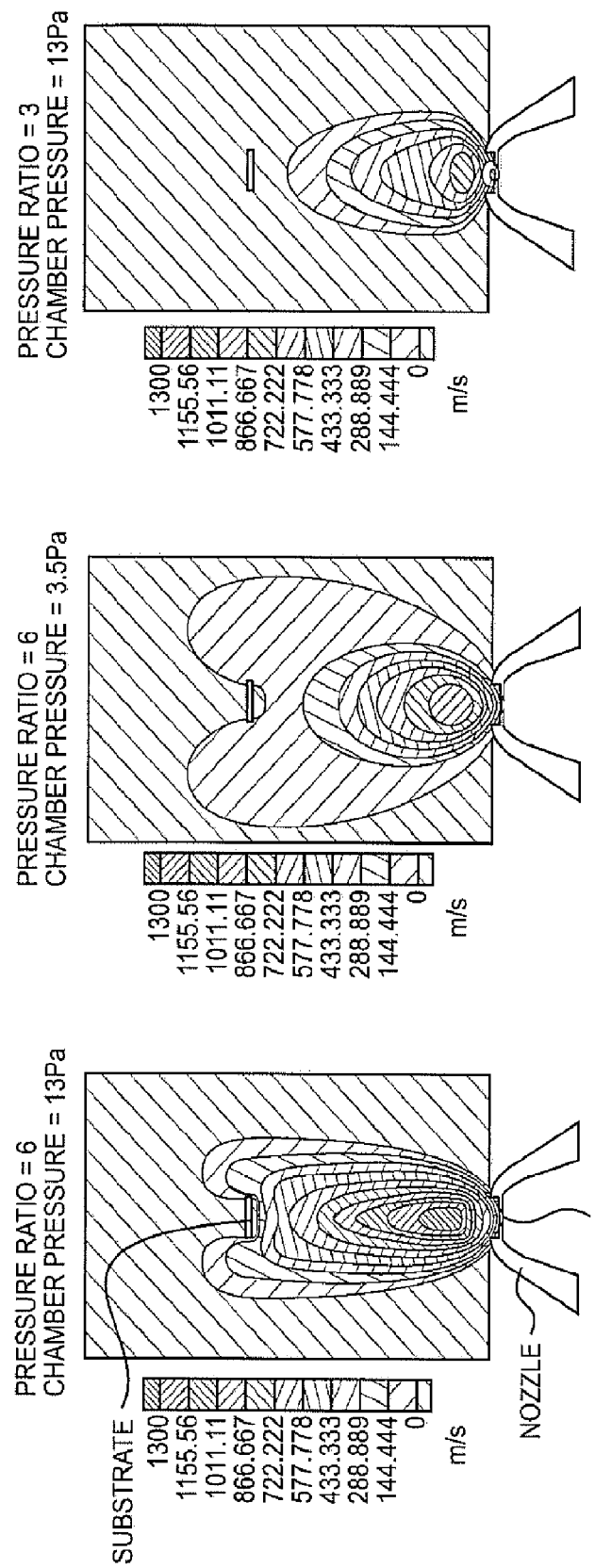

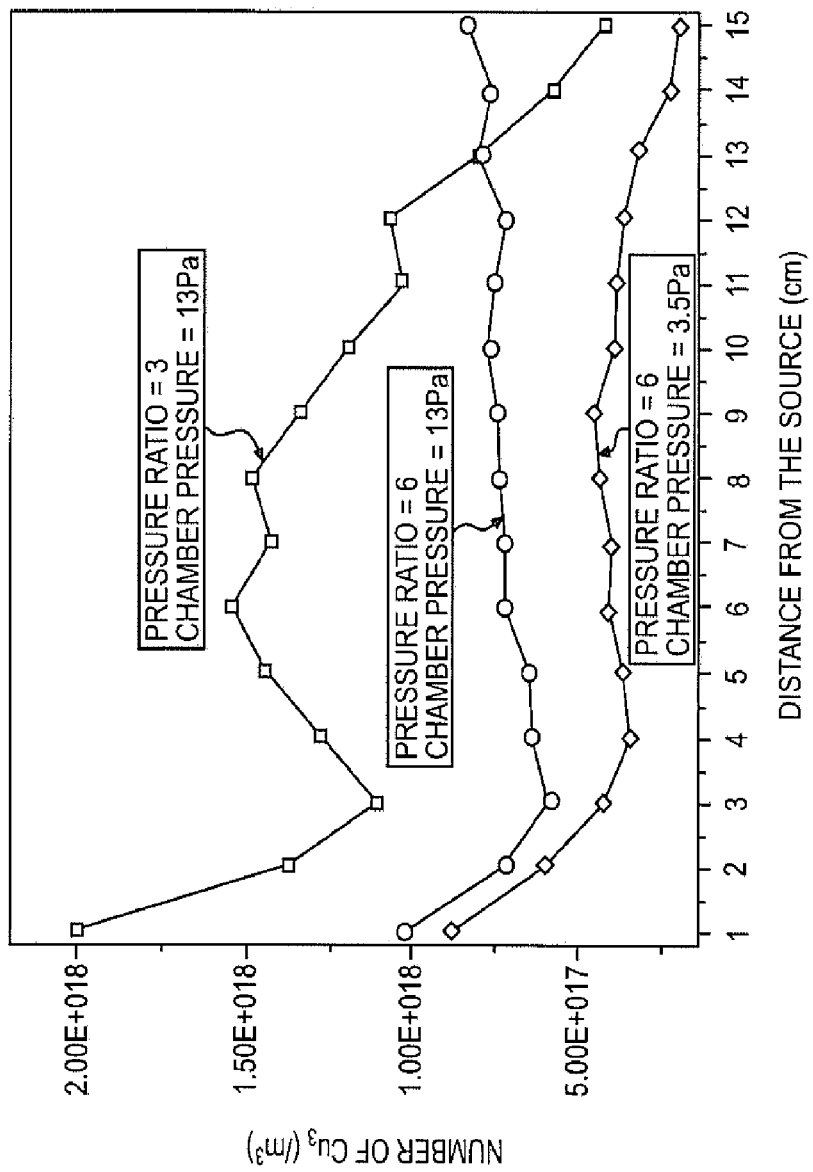

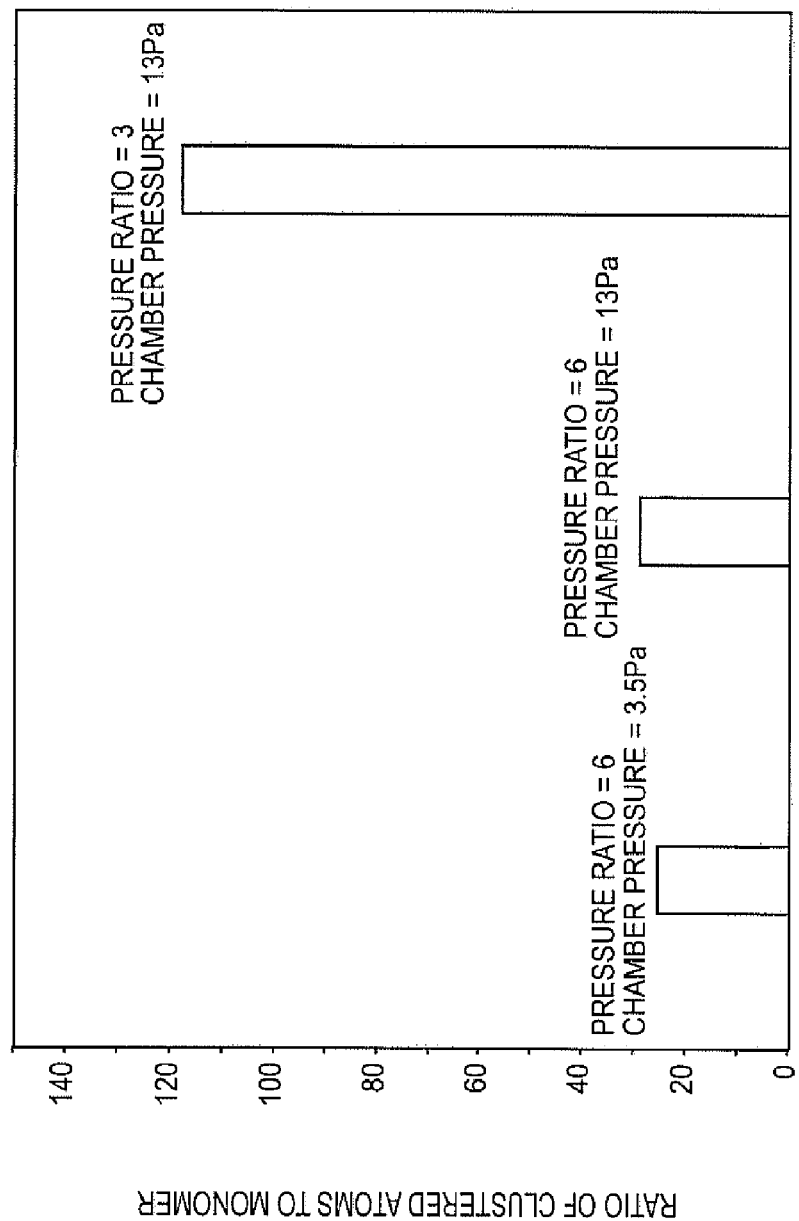

THIN FILM BATTERY SYNTHESIS BY DIRECTED VAPOR DEPOSITION

CROSS-REFERENCE TO RELATED APPLICATIONS

This application claims benefit under 35 U.S.C. §119(e) to:
U.S. Provisional Patent Application Ser. No. 60/964,452 filed on Aug. 13, 2007, and to
U.S. Provisional Patent Application Ser. No. 60/964,471 filed on Aug. 13, 2007, and to
U.S. Provisional Patent Application Ser. No. 61/039,186 filed on Mar. 25, 2008, and to
U.S. Provisional Patent Application Ser. No. 61/053,471 filed on May 15, 2008, and to
U.S. Provisional Patent Application Ser. No. 61/080,539 filed on Jul. 14, 2008, and to
U.S. Provisional Patent Application Ser. No. 61/080,911 filed on Jul. 15, 2008,
which are hereby incorporated by reference in their entireties.

Throughout this specification, reference is made to a numbered list of patents, applications, and publications. The list of patents, applications, and publications is provided at the end of the disclosure. [Ref. 1], for example, refers to J. M. Tarascon and M. Armand, *Nature* 414 (2001) 359-367.

BACKGROUND

Thin film solid-state batteries are widely used in medical devices to provide power for microelectromechanical systems (MEMS), and as on-chip power sources because of their light weight, small size, and high power storage density [Ref. 67-69]. Rechargeable thin-film Li/Li-ion batteries have been widely investigated as higher energy density replacements for nickel-metal hydride rechargeable batteries [Ref. 1] and also for use as on-chip power sources [Ref. 2]. Secondary, or rechargeable, thin-film Li/Li-ion batteries are multi-layer structures [Ref. 2, 3]. These batteries consist of a current collector, a cathode, an anode and a solid electrolyte. A schematic illustration of such a device based upon the storage of lithium ions is shown in FIG. 1. Their total thickness is normally less than 15.0 μm including the ~6 μm thick environmental protective layer that is needed to avoid absorption of oxygen and moisture [Ref. 4]. During the discharge of these batteries, lithium ions diffuse from the anode, migrate through the solid electrolyte and accumulate in the cathode layer by intercalation [Ref. 5]. Electron flow occurs in the reverse direction through a load resistor. Both processes reverse during a charging cycle.

The effective charge and discharge of rechargeable thin-film Li/Li-ion batteries requires a thin-film electrolyte that blocks electron transport while allowing high conductive passage of lithium ions [Ref. 6]. This translates into an electron conductivity less than $\sim 10^{-14}$ S/cm and a Li-ion conductivity in the $10^{-5}$-$10^{-8}$ S/cm range [Ref. 5]. It is also essential that the thin-film electrolyte through thickness be free of interconnected porosity or cracks to avoid electrical breakdown (electrical shorting) when a voltage is applied across the electrolyte [Ref. 7]. The thin-film electrolyte also needs to be both thin (1-2 μm) to reduce internal resistive losses, and uniform in thickness to avoid localization of the discharge process [Ref. 6]. In rechargeable thin-film lithium batteries, the thin-film electrolyte should also not decompose when in intimate contact with a lithium metal anode. The thin-film electrolyte therefore plays a crucial role in the operation of rechargeable thin-film Li/Li-ion batteries and its synthesis must be carefully controlled to achieve the desired composition and structure needed to optimize battery performance [Ref. 6].

Many electrolyte chemistries have been investigated for rechargeable thin-film Li-ion batteries [Ref. 8, 9]. They include $Li_2S$—$P_2S_5$—$LiI$ [Ref. 10], $Li_2S$—$SiS_2$—$LiI$ [Ref. 11], $Li_2S$—$SiS_2$—$Li_3PO_4$ [Ref. 12], $Li_2O$—$P_2O_5$—$Li_2SO_4$ [Ref. 13], $Li_2O$—$B_2O_3$—$LiI$ [Ref. 14], $Li_2O$—$Al_2O_3$—$B_2O_3$ [Ref. 15], $Li_2O$—$Al_2O_3$—$SiO_2$ [Ref. 16], $Li_2O$—$SiO_2$—$B_2O_3$ [Ref. 17], and lithium phosphorous oxynitride (Lipon) [Ref. 18]. While the Li-sulfate electrolytes have a high Li-ion conductivity of $10^{-3}$-$10^{-4}$ S/cm, they are highly reactive with air and are difficult to fabricate because of their corrosive nature. The Li-oxide electrolytes are much more stable in oxygen but also absorb moisture [Ref. 9]. They also have a lower Li-ion conductivity ($10^{-6}$-$10^{-8}$ S/cm) than Li-sulfate electrolytes [Ref. 8, 9]. Furthermore, both the Li-sulfate and Li-oxide electrolytes are decomposed when they come into contact with a lithium anode with an applied potential of up to 5.0 V [Ref. 9]. Lipon electrolytes have been extensively investigated for thin film Li/Li-ion battery applications [Ref. 3], and are widely used in thin film Li/Li-ion batteries because they do not decompose when in contact with a lithium anode. They also possess a relatively high Li-ion conductivity (in the $10^{-6}$-$10^{-7}$ S/cm range) [Ref. 18, 19]. Since the ionic conductivity of amorphous Lipon films is generally more isotropic and higher than that of crystalline films, amorphous Lipon films are preferred for solid electrolyte applications [Ref. 6].

Rechargeable thin-film batteries based upon lithium anodes and Lipon electrolytes have been fabricated by a combination of resistive thermal evaporation and reactive RF-magnetron sputtering. Bate et al. successfully synthesized Lipon films using RF-magnetron sputtering under either mixed Ar—$N_2$ or pure $N_2$ atmospheres [Ref. 18]. While high quality Lipon films could be synthesized, the RF-magnetron sputtering suffered from a very low deposition rate (~1 nm/min.) due to the low working pressure (~20 mTorr) and low power (12-40 W) needed to avoid cracking of the target [Ref. 20]. Attempts have been made to increase the deposition rate of Lipon films by using a $N_2$—He (instead of an Ar) plasma. However, the deposition rate of the Lipon films still remained less than 3.0 nm/min. [Ref. 21]. Several attempts have been made to synthesize Lipon films by other deposition approaches including Pulse Laser Deposition (PLD) [Ref. 22], Ion Beam Assisted Deposition (IBAD) [Ref. 23], and electron-beam (EB) evaporation [Ref. 24]. The deposition rate of PLD films was in the 13.3-50 nm/min range while those synthesized using IBAD could be grown at up to ~66 nm/min. Both approaches therefore enabled film growth at much higher deposition rates than the RF-magnetron sputtering approach. The PLD and IBAD methods resulted in films with a Li-ion conductivity in the $1.4 \times 10^{-6}$-$4 \times 10^{-8}$ S/cm range [Ref. 22, 25]. Unfortunately, the Lipon films deposited by the PLD approach had a very rough surface morphology while those synthesized by the IBAD approach contained large tensile stresses which led to film cracking and electrical shorting in metal/Lipon/metal test cells [Ref. 22, 23].

The EB evaporation approach has employed moderate power (300 W) e-beams for the evaporation of a Lipon source and a moderate power (~250 W), 13.54 MHz inductively coupled Ar—$N_2$ plasma (ICP) reactor for reactive synthesis in an ionized nitrogen environment [Ref. 24]. These EB evaporated Lipon films had a Li-ion conductivity of $\sim 10^{-7}$-$10^{-8}$ S/cm and could be grown at somewhat higher deposition rates (~8.33 nm/min) than those achievable using reactive RF-magnetron sputtering [Ref. 24]. While the maximum deposition rate for this approach was significantly less than that of the PLD and IBAD approaches, it appears a promising route for the more economical deposition of Lipon films, especially if the deposition rate can be improved without adversely affecting other properties of the electrolyte.

After depositing the cathode and Lipon films by RF-magnetron sputtering, a battery structure is usually completed by deposition of a lithium anode using a resistive thermal evaporation method [Ref. 3]. Lithium alloys are highly reactive with water vapor and so the resistive thermal evaporation step is usually conducted inside a dry, inert environment in order to avoid reactions during the transfer of samples [Ref. 26].

A plasma-assisted directed vapor deposition (PA-DVD) approach for the deposition of various metals and metal oxides has recently been developed [Ref. 27, 28]. This electron beam evaporation-based approach has a multi-source capability raising the possibility of depositing all the layers of a thin film battery within a single reactor [Ref. 27]. The deposition techniques also allow uniform conformal coating of surfaces including the interior of cellular structures.

During discharge, Li$^+$ ions leave the anode, diffuse through the electrolyte, and are intercalated within the cathode material. An electron current simultaneously flows via the leads between the cathode and anode through a load resistor. The overall discharge reaction can be written as:

Anode: $x\text{Li} \rightarrow x\text{Li}^+ + xe^-$

Cathode: $M + x\text{Li}^+ + xe^- \rightarrow \text{Li}_x M$ where M is a transition metal atom in a transition metal oxide that typically serves as the host cathode for the lithium ions.

Lithium transition metal oxides such as $LiCoO_2$ and $LiMn_2O_4$ are widely used for the cathode material [Ref. 70-72]. $LiCoO_2$ has a layered structure (R-3m), which facilitates lithium insertion and extraction during battery operation [Ref. 70]. It is widely used in commercial batteries in part because of its high specific charge storage capacity (~130 Ah/kg) and excellent rechargeability (>1000 cycles) [Ref. 70-72]. However, $LiCoO_2$ is costly, and it has significant toxicity issues [Ref. 73]. $LiMn_2O_4$ is a candidate alternative cathode material for high energy density battery applications [Ref. 74, 75].

The performance of the cathode layers in thin films batteries depends on many aspects of the film including its composition [Ref. 76-80], degree of crystallinity [Ref. 81], grain size [Ref. 82], and the film's pore volume fraction and topology [Ref. 83, 84]. Stoichiometric $LiMn_2O_4$ has a cubic spinel structure (Fd3m), FIG. 19 [Ref. 85]. FIG. 19 shows the unit cell of cubic spinel $LiMn_2O_4$. The space group of the cubic spinel is Fd3m, and there are 56 atoms per unit cell. Lithium atoms are tetrahedrally coordinated with oxygen atoms, while the manganese atoms are octahedrally coordinated with oxygen atoms. In the ideal cubic spinel structure, the Li and Mn ions are located at tetrahedral (8a) and octahedral (16d) sites in the cubic-closed-packed oxygen ion frame (32e) [Ref. 86]. Li$^+$ ions can be intercalated and deintercalated reversibly in this lattice during charging and discharging without breaking the basic lattice structure [Ref. 86].

The spinel phase of lithium manganese oxide exists over a wide composition range [Ref. 87] and can be relatively easily grown if the appropriate synthesis conditions are used [Ref. 86]. By changing the growth temperature and oxygen partial pressure, both stoichiometric $Li_{1+x}Mn_{2-x}O_4$ [Ref. 76, 78], and non-stoichiometric $LiMn_2O_{4\pm x}$ [Ref. 79, 88] films have been grown. The value of x in these lithium manganese oxide films modifies electrochemical properties, and changes both the specific storage capacity and the cylclic rechargeability [Ref. 76].

These changes in properties are thought to result from modifications to the average Mn oxidation state required to achieve charge neutrality of an overall unit cell [Ref. 76]. Higher Mn oxidation states appear to promote retention of charge storage during repeated cycling, but they reduce the maximum charge storage capacity [Ref. 76]. Better cathode performance is exhibited by films that contain a significant pore volume fraction [Ref. 83, 84]. A small grain size also appears favorable for enhancing the ionic mobility [Ref. 89]. Finally, films with a strong (111) preferred orientation provide improved electrode performance because the (111) direction is a channeling direction for Li ions, and enhance their effective diffusivity is enhanced in this direction [Ref. 83, 90].

Lithium-transition metal oxide films such as lithium manganese oxide can be fabricated by either electron-beam evaporation [Ref. 82, 89, 91], sputtering [Ref. 81, 90-94], or by pulsed laser deposition [Ref. 80, 95-97]. For example, reactive electron beam evaporation has been used to synthesize $LiMn_2O_4$ films with a small grain size and good electrochemical performance [Ref. 89]. Wang et al have used magnetron sputtering to grow $Li_4Ti_5O_{12}$ thin films, which are an isostructure to $LiMn_2O_4$ [Ref. 83]. They have produced two types of surface morphologies of films; one relatively dense and the other consisting of island-like grains with interconnected grain boundary pores. In addition, they examined the electrochemical properties of different degree of textures with the same surface morphologies. They found that the highly textured, porous films with interconnected grain boundary pores exhibited better electrode performance. The typical deposition rate of sputtering techniques is usually less than ~10 nm/min [Ref. 93].

An electron-beam directed vapor deposition (EB-DVD) technique has recently been developed for synthesizing binary metal oxides with controlled compositions and pore fraction [Ref. 98-102]. In this approach, an electron beam is used to evaporate a source material located in a water cooled crucible positioned in the throat of a nozzle that forms a supersonic gas jet. This jet entrains and transports the vapor to a substrate. The gas jet speed is determined by the pressure difference between the pressure upstream of the nozzle opening and that downstream in the growth chamber, and by the ratio of the specific heats of the gas used to form the jet [Ref. 103]. Inert carrier gases such as helium or argon sometimes doped with small amount of oxygen or other reactive gases are typically used. Changing the upstream to downstream modifies the degree of collimation of the vapor flux and the fraction of vapor deposited on a substrate [Ref. 99]. The technique has been used to grow thick yttrium stabilized zirconia coatings at very high deposition rates in excess of ~10 μm/min for use as thermal barriers [Ref. 98, 99, 104]. The invention described shows that the directed vapor deposition approach can be used to deposit the cathode layers of thin film batteries with quite compositionally complex chemistries. Using the lithium manganese oxide system as an example we show that the film composition, phase content, texture and pore volume fraction can all be controlled by the jet speed and the deposition pressure [Ref. 98, 99].

BRIEF SUMMARY

One embodiment of the present invention relates to a method for forming an electrolyte layer or a cathode layer of a thin film battery on a substrate. The method comprises forming at least one layer by: impinging a gas stream comprising at least one doping agent and at least one entrained source material on the substrate; and reactively depositing the at least one doping agent, and the at least one entrained source material on the substrate.

A second embodiment of the present invention relates to a method for forming an electrolyte layer of a thin film battery on a substrate. The method comprises forming an electrolyte layer by passing a gas stream comprising at least one doping agent and at least one entrained source material through a plasma; impinging the gas stream on the substrate; and reactively depositing the at least one doping agent, and the at least one entrained source material on the substrate.

A third embodiment of the present invention relates to a method for forming a cathode layer of a thin film battery by impinging a gas stream comprising at least one entrained source material onto a substrate and reactively depositing the at least one entrained source material on the substrate. The at least one entrained source material is selected from the group consisting of group IA metals, group IIA metals, group IIIB metals, group IVB metals, group VB metals, group VIB metals, group VIIB metals, group VIII metals, group IB metals, group IIB metals, mixtures thereof, compounds thereof, and alloys thereof. Preferably, the at least one entrained source material comprises Li. Preferably, the at least one entrained source material is elemental Li. Preferably, the at least one entrained source material is a Li alloy.

A fourth embodiment of the present invention relates to a method of fabricating a power cell having a cathode layer, an electrolyte layer, and an anode layer. The method comprises: sequentially depositing the plurality of layers of said power cell on a substrate, wherein the deposition takes place within a single chamber, wherein said electrolyte layer is formed by: passing a gas stream comprising at least one doping agent and at least one entrained source material through a plasma; impinging the gas stream on the substrate; and reactively depositing the at least one doping agent, and the at least one entrained source material on the substrate.

A fifth embodiment of the present invention relates to a method of fabricating a battery. The method comprises: fabricating a plurality of power cells each having a cathode layer, an electrolyte layer, and an anode layer, by sequentially depositing the plurality of layers of each power cell on a substrate, wherein the deposition takes place within a single chamber, wherein said electrolyte layer is formed by: passing a gas stream comprising at least one doping agent and at least one entrained source material through a plasma, impinging the gas stream on the substrate, and reactively depositing the at least one doping agent, and the at least one entrained source material on the substrate; and electrically connecting a current collecting layer of a first power cell to a current collecting layer of a second power cell.

BRIEF DESCRIPTION OF THE DRAWINGS

These and other features, aspects, and advantages of the present invention will become better understood with reference to the following description and appended claims, and accompanying drawings where:

FIG. 13: shows an illustration of two ways that nitrogen can be incorporated in Lipon;

FIG. 19: shows the unit cell of cubic spinel $LiMn_2O_4$;

FIG. 27: shows the effect of chamber pressure upon the surface morphology of lithium manganese oxide films;

FIG. 32: shows X-ray diffraction patterns of heat-treated lithium manganese oxide films grown using pressure ratios of 3, and 6;

FIG. 33: shows pole figures of lithium manganese oxide films annealed 700° C. in air for 1 hour grown at various pressure ratios;

FIG. 34: shows a grid setup of directed simulation of Monte Carlo simulation;

FIG. 35: shows simulated vapor atom velocities for experimental processing conditions;

DETAILED DESCRIPTION

Figure 1:
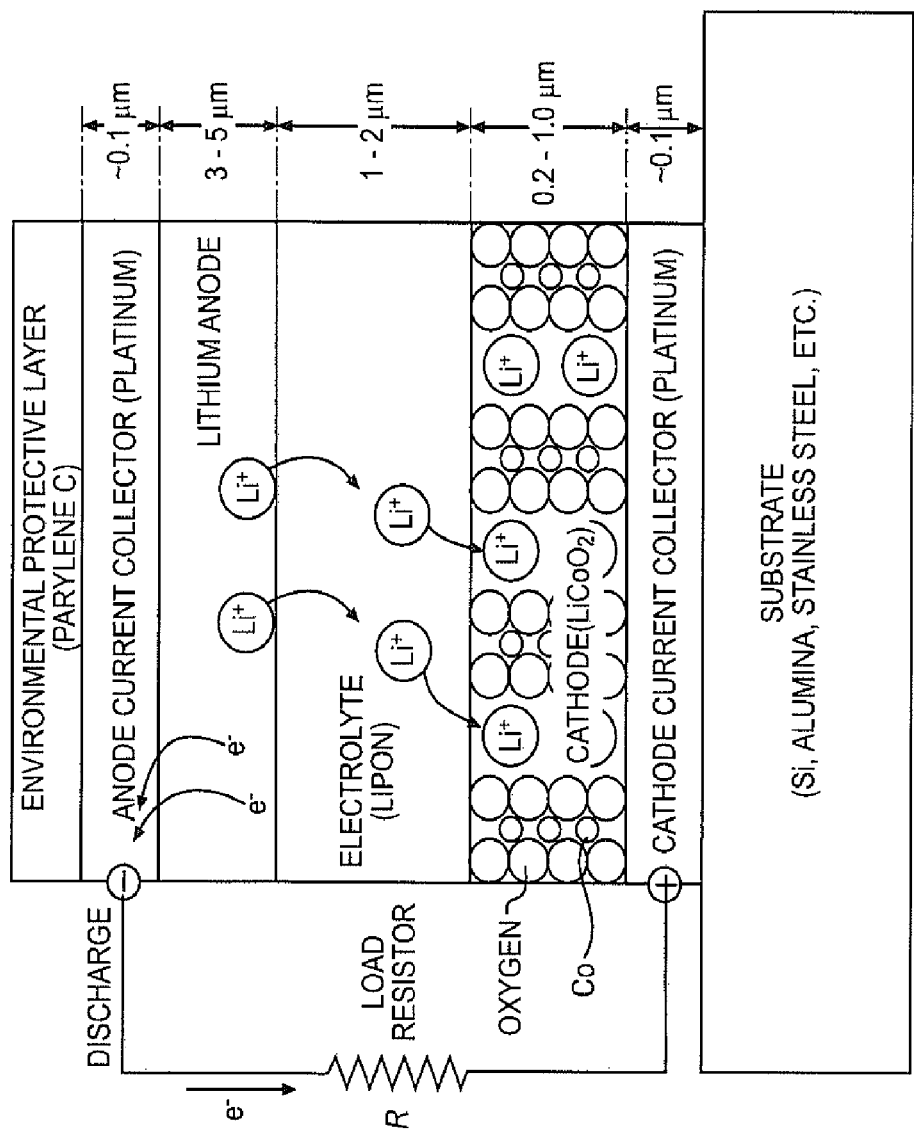
FIG. 1: shows a schematic diagram of the operation of a thin film battery using a lithium phosphorous oxynitride (Lipon) electrolyte that separated a lithium metal anode and lithium cobalt cathode.

The present invention may be understood more readily by reference to the following detailed description of preferred embodiments of the invention as well as to the examples included therein. In the following detailed description and in the claims which follow, reference will be made to a number of terms which shall be defined to have the following meanings:

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

One embodiment of the present invention relates to a method for forming an anode layer of a thin film battery on a substrate. The method comprises forming an anode layer by: impinging a gas stream comprising at least one entrained source material on the substrate; and reactively depositing the at least one entrained source material on the substrate.

Preferably, for the formation of the anode layer, the at least one entrained source material is selected from the group consisting of group IA metals, group IIA metals, group IIIB metals, group IVB metals, group VB metals, group VIB metals, group VIIB metals, group VIII metals, group IB metals, group IIB metals, mixtures thereof, compounds thereof, and alloys thereof. Preferably, the at least one entrained source material comprises Li. Preferably, the at least one entrained source material is elemental Li. Preferably, the at least one entrained source material is a Li alloy.

Another embodiment of the invention, relates to a method for forming an electrolyte layer and a cathode layer of a thin film battery. The method comprises forming an electrolyte layer or a cathode layer by: passing a gas stream comprising at least one doping agent and at least one entrained source material through a plasma; impinging the gas stream on the substrate; and reactively depositing the at least one doping agent and at least one entrained source material on the substrate. Preferably, for the electrolyte layer the at least one entrained source material is lithium phosphate, and the at least one doping agent is a compound used to fabricate thin film lithium ion batteries. Preferably, the at least one doping agent is provided in a flux of from greater than 0 to $4.28 \times 10^{18}$ molecules/$cm^2 \cdot s$. It is also preferable that the at least one doping agent is selected from the group consisting of nitrogen ($N_2$), oxygen ($O_2$), and ammonia ($NH_3$).

The gas stream can further comprise at least one inert component. Preferably, the at least one inert component comprises at least one of helium (He), neon (Ne), argon (Ar), krypton (Kr), and Xenon (Xe).

The substrate can comprise an electron conductive material. Preferably, the substrate comprises at least one of silicon, carbon, platinum, copper, and silver.

It is preferable that the deposition occurs in a low-vacuum environment of from $7.5 \times 10^{-3}$ to 0.75 Torr.

Preferably, the at least one film layer produced according to the inventive method has a porous columnar structure.

Preferably, passing the gas stream through the plasma can increases the gas phase reactivity and/or the surface reactivity of the at least one doping agent by causing the at least one doping agent to undergo a degree of electronic excitation, ionization and/or dissociation. It is also preferable, if passing the gas stream through the plasma also increases the gas phase reactivity and/or the surface reactivity of the at least one source material by causing the at least one source material to undergo a degree of electronic excitation, ionization and/or dissociation.

Preferably, the at least one entrained source material is at least one evaporant produced in a low vacuum environment by bombarding at least one source target with directed energy. The directed energy can be an electron laser beam. The at least one source target can be at least one $Li_3PO_4$ rod. Preferably, the process further comprises initially sintering the at least one $Li_3PO_4$ rod in air Particularly preferably, the sintering is conducted at a temperature of from 850 to 950° C. for a duration of from 9 to 11 hours.

In some cases it is preferable that multiple source targets are bombarded with directed energy to produce multiple evaporants. The multiple source targets can be bombarded with directed energy sequentially to produce a multilayer structure. The multiple source targets can be bombarded with directed energy simultaneously. Preferably, the multiple evaporants are produced to form a vapor having a composition, and the method further comprises controlling the composition of the vapor.

It is particularly preferable that the method further comprises applying a negative bias voltage to the substrate. Preferably, the negative bias voltage is in a range of from 0 to 50 V.

It is preferable that the deposition occurs at rate of from 0.01-10,000 nm/min. More preferably, the deposition occurs at rate of from 9-177.7 nm/min.

Preferably, the gas stream has an upstream pressure ($P_u$) and a downstream pressure ($P_d$), and $P_u$ is at least twice $P_d$. Particularly preferably, the gas stream is supersonic.

It is particularly preferable that the at least one film layer produced is a thin film layer comprising at least three components, wherein the at least three components include: one or more cationic bonding components each selected from the group consisting of lithium (Li), sodium (Na), potassium (K), rubidium (Rb), cesium (Cs), francium (Fr), boron (B), aluminum (Al), gallium (Ga), indium (In), thallium (Tl); one or more anionic bonding components each selected from the group consisting of nitrogen (N), phosphorus (P), arsenic (As), antimony (Sb), bismuth (Bi), ununpentium (Uup), oxygen (O), sulfur (S), selenium (Se), tellurium (Te), polonium (Po), fluorine (F), chlorine (Cl), bromine (Br), and iodine (I); and optionally one or more covalent bonding components each selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), carbon (C), silicon (Si), germanium (Ge), tin (Sn), and lead (Pb). Preferably, the at least one film layer produced is a pore free. Particularly preferably, the thin film electrolyte is a lithium phosphorus oxynitride (Lipon) film. Preferably, the Lipon film has a nitrogen:phosphorous ratio of 0.1 to 5. More preferably, the Lipon film has a nitrogen:phosphorous ratio of 0.39 to 1.49. Preferably, the Lipon film has a thickness in the range of from 0.01-10 µm. More preferably, the Lipon film has a thickness in the range of from 1-2 µm. Preferably, the Lipon film has a lithium ion conductivity less than $10^{-7}$ S/cm. More preferably, the Lipon film has a lithium ion conductivity in the range of from $10^{-6}$ to $10^{-7}$ S/cm. Preferably, the Lipon film is grown in less than 40 minutes. More preferably, the Lipon film is grown in about 20 minutes.

Preferably, the substrate is positioned such that a plasma sheath is formed on at least one surface of the substrate, the plasma sheath establishing a potential which attracts positively charged ions toward the substrate. Preferably, the plasma is an argon hollow cathode plasma, activated with a low voltage electron beam with a current of from 1 to 200 A, and wherein the hollow cathode injected electrons are accelerated towards an anode plate.

Preferably, the low voltage electron beam has a current of from 60 to 200 A. More preferably, the low voltage electron beam has a current of from 120 to 150 A.

A second embodiment of the present invention relates to a method for forming one or more film layers on a substrate. The method comprises forming at least one of the one or more film layers by: simultaneously entraining two or more source materials in an entrainment stream comprising an inert component; impinging the entrainment stream on the substrate to deposit the two or more source materials on the substrate. Preferably, the entrainment stream further comprises a doping agent. More preferably, at least one of the two or more source materials is an evaporant. Preferably, the evaporant is a lithium transition metal oxide. Preferably, the evaporant is lithium manganese oxide. Preferably, the deposition occurs at rate of from 0.01-2,000 nm/s. Preferably, the deposition occurs at rate of from 1.6-20 nm/s. Preferably, the method of the second embodiment further comprises annealing the film at a temperature of up to 1,000° C. Preferably, the method of the second embodiment further comprises annealing the film at a temperature of from 300 to 700° C. More preferably, the film is annealed for from 0.01 to 60 minutes. More preferably, the film is annealed for from 15 to 60 minutes. Preferably, the method of the second embodiment is carried out at temperatures of up to 1,000° C. More preferably, the method of the second embodiment is carried out at temperatures of from 300 to 700° C. Preferably, at least one of the one or more film layers is a thin film cathode.

A third embodiment of the present invention relates to a method of fabricating a power cell having a plurality of layers. The method comprises: sequentially depositing the plurality of layers of said power cell on a substrate, wherein the deposition takes place within a single chamber, wherein at least one of said plurality of layers is formed by: passing a gas stream comprising at least one doping agent and at least one entrained source material through a plasma; impinging the gas stream on the substrate; and reactively depositing the at least one doping agent, and the at least one entrained source material on the substrate. Preferably, each layer of said plurality of layers is deposited at ambient temperature. Preferably, a first layer of said plurality of layers is deposited at a first temperature that is different from a second temperature at which a second layer is deposited.

A fourth embodiment of the present invention relates to a method of fabricating a battery. The method comprises: fabricating a plurality of power cells, wherein at least one of said plurality of layers is formed by: passing a gas stream comprising at least one doping agent and at least one entrained source material through a plasma, impinging the gas stream on the substrate, and reactively depositing the at least one doping agent, and the at least one entrained source material on the substrate; and electrically connecting a current collecting layer of a first power cell to a current collecting layer of a second power cell. Preferably, the interconnecting is accomplished by lithographically electrically connecting said current collecting layers. Preferably, the method of the fourth embodiment further comprises encapsulating the battery, wherein the deposition and the encapsulation takes place within a single chamber.

In a PA-DVD approach to the deposition of thin film battery electrolytes, this invention teaches that a supersonic gas jet can be generated via an annular nozzle that surrounds the source-containing crucible(s) [Ref. 27]. A moderate power, high voltage electron beam is then used to thermally evaporate the source materials either sequentially for layered systems or simultaneously for alloy deposition. A supersonic helium gas jet focuses and rapidly transports the vapor towards a substrate. This can also significantly reduce lateral spreading of the evaporant enabling the vapor plume cross section to be matched to that of the substrate and thereby increase the deposition rate of a film [Ref. 28, 29]. Plasma activation can be implemented using a hollow cathode-activated deposition (HAD) process [Ref. 30]. The HAD process can improve the microstructures of some films by increasing the mobility and reactivity of the vapor fluxes, and by reducing the significance of shadowing as vapor condenses on the surface of a substrate at a more normal incidence. Nitrogen doping of the gas jet provides a potential means for reactively forming nitrogen rich compounds. However, because nitrogen has a strong triple bond (with an bond energy of 9.8 eV), plasma assistance is usually necessary for its incorporation in Lipon and other nitrogen containing electrolyte films. Other reactive gases can be used other electrolyte compositions.

We have exemplified the use of the PA-DVD approach for synthesizing the electrolytes of solid state, thin film battery by showing the deposition of Lipon thin films and have demonstrated the effects of film structure, morphology, and composition upon film's ionic conductivity by varying the conditions used for film synthesis. It is shown that significant concentrations of nitrogen can be incorporated during $Li_3PO_4$ deposition provided plasma assistance is used. This plasma assistance enables the synthesis of amorphous, fully dense Lipon films at rates that are up to 45 times higher than those achieved with reactive RF-magnetron sputtering. We find that the Lipon films made by this approach have a Li-ion conductivity comparable to that of material prepared by conventional EB evaporation with inductively coupled plasma activation. Extensions to other solid electrolytes containing reactive metals and reactive gases are included as embellishments of the invention.

The plasma-assisted directed vapor deposition (PA-DVD) approach (and related structure and apparatus) has been successfully used to synthesize solid electrolytes such as lithium phosphorous oxynitride (Lipon) films.

1) Using this approach, it has been possible to deposit films at rates up to 45 times those reported for reactive RF-magnetron sputtering processes.
2) The use of a plasma during deposition facilitated significant microstructure control enabling the growth of porous, amorphous columnar or dense amorphous electrolyte structures with no detectable porosity or cracking.
3) Control the level of nitrogen incorporation into the Lipon films and the N/P ratio could also be achieved by modification of the plasma current. However, this was accompanied by reductions in lithium content as the N/P ratio approached 1.5.
4) XPS peak shift measurements indicated that nitrogen substituted for oxygen in $Li_3PO_4$ in the plasma assisted DVD Lipon films grown here.
5) Analysis of the XPS nitrogen peaks indicates the existence of both triply and doubly coordinated nitrogen.
6) The PA-DVD approach resulted in Lipon films with a Li-ion conductivity in the $10^{-7}$-$10^{-8}$ S/cm range at room temperature. This is well suited for battery applications.

The aspects of the various embodiments of the present invention structure and related method and apparatus have a variety of novel characteristics. The use of a directed vapor deposition techniques facilitates very high rate, economical deposition of solid state, thin film battery anodes, electrolytes and cathodes. Plasma assistance provides a means for the incorporation of reactive elements such as nitrogen from stable gases such the nitrogen dimmer. The technique enables deposition on rough surfaces, fibrous and even cellular substrates with very high specific surfaces. The use of a multi-source crucible would also enable the deposition of a current collector (non-reactive metal) layer on an anode, electrolyte, cathode and current collector multilayer structure in the same deposition system without breaking vacuum conditions. Such a capability has very significant beneficial cost implications.

Figure 2:
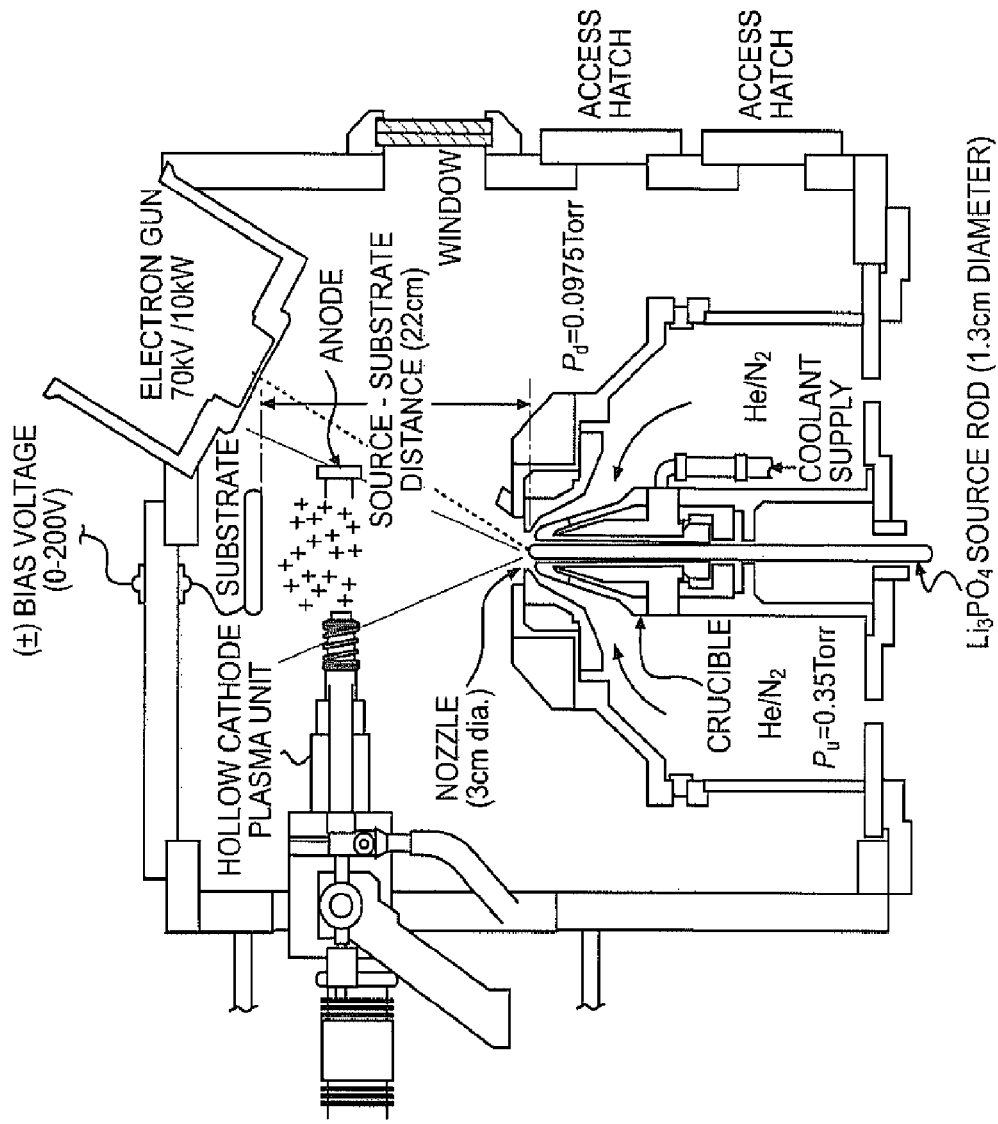
FIG. 2: shows a plasma-assisted directed vapor deposition (PA-DVD) system.

The plasma-assisted directed vapor deposition (PA-DVD) approach (and related structure and apparatus) employed here utilized a 70 kV/10 kW e-beam gun and a water-cooled, copper crucible for source material evaporation. This cold crucible approach was used to minimize reactivity between the crucible and the molten source material. A 2.3 cm outer diameter crucible was positioned coaxially within a 3.0 cm inner diameter nozzle, FIG. 2. The resulting annular nozzle was used to create a supersonic gas jet by maintaining an upstream pressure ($P_u$) that was significantly higher than the downstream pressure ($P_d$) in the DVD chamber. The pressure ratio ($P_u/P_d$) and the ratio of the specific heats of the gas ($\gamma$) then determine the speed, U, of the gas jet at the nozzle exit [Ref. 25]:

$$U = M\sqrt{\gamma R_s T} \quad (1),$$

where $\gamma$ is ratio of specific heats (5/3 for He), M is the Mach number of the flow, T is the absolute temperature (K) and $R_s$ is the specific gas constant (2077 J·kg$^{-1}$ K$^{-1}$ for He). The Mach number for the gas jet is found from [Ref. 27]:

$$\frac{P_u}{P_d} = \left[1 + \frac{\gamma - 1}{2}M^2\right]^{\gamma/(\gamma-1)}, \quad (2)$$

where $P_u$ is the upstream pressure and $P_d$ is the downstream of the nozzle. If the upstream pressure is at least twice that of the downstream region, the jet is initially supersonic (M>1) and increasing the $P_u/P_d$ pressure ratio increases its speed.

Since the vapor is created in the nozzle throat, momentum-transferring collisions between the gas jet forming atoms and the source vapor results in its entrainment of the vapor in the jet plume. This enables the vapor to be focused and transported towards a substrate. The degree of focusing is controlled by the carrier gas flow rate and density and therefore by the upstream pressure, $P_u$ [Ref. 27]. During reactive deposition, the use of low vacuum process conditions enables the reaction rate between the reactive gas and the evaporant to be increased over that achievable with processes that must operate in more rarefied environments.

The DVD deposition process typically operates with a downstream pressure (deposition chamber) of the 0.75-7.5×$10^{-3}$ Torr. The incident vapor molecules therefore undergo numerous thermalizing collisions during vapor transport [Ref. 27]. Thornton empirically showed that these conditions result in porous columnar-structured films [Ref. 31]. Many atomistic simulations have subsequently indicated that denser, equiaxed grain films can be grown by increasing the kinetic energy of the atoms or molecules incident upon a substrate [Ref. 32-34]. Several groups have attempted this by using cathodic arc evaporation [Ref. 35, 36]. These processes unfortunately also create microparticles that disrupt film morphology [Ref. 35]. So called spotless-arc-activated deposition (SAD) processes have sought to overcome these microparticle problems [Ref. 37]. However, because the SAD processes also use the source material as a thermal-plasma cathode, it is challenging to implement this approach with ceramic source materials and is usually restricted to high melting point metallic sources [Ref. 37]. In an alternative approach, Morgner et al. have proposed a hollow cathode-activated deposition (HAD) process, which can be combined with high rate thermal evaporation DVD approach to enable the reactive synthesis of conductive and dielectric films with reduced intercolumnar porosity [Ref. 30, 38].

Figure 3:
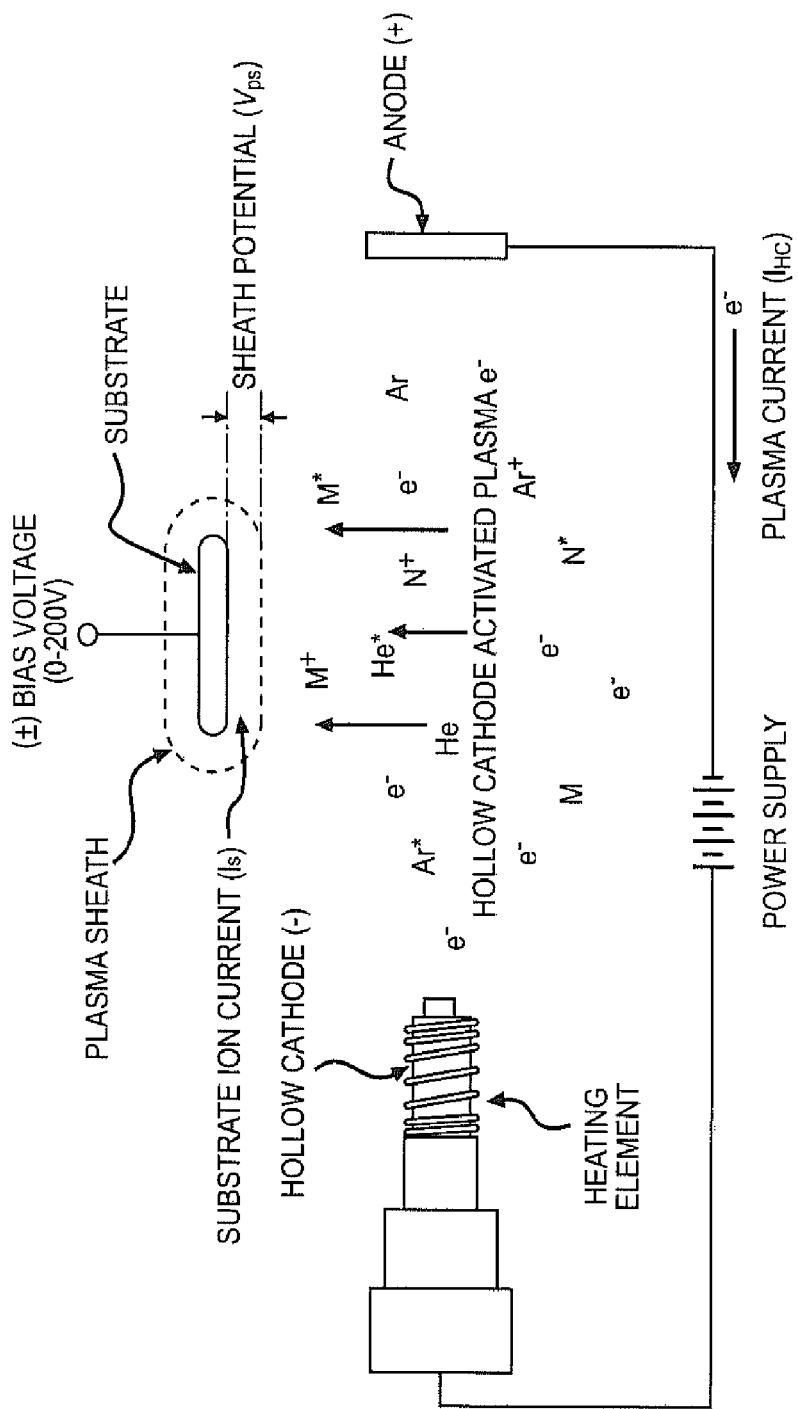
FIG. 3: shows a schematic illustration of the plasma generation process.

Hollow cathode discharges have higher electron densities (in the ~$10^{12}$ cm$^{-3}$ range) than those of an RF discharge (in the ~$10^{10}$ cm$^{-3}$ range) [Ref. 30]. The electron energy distribution function is composed of a Maxwell distribution of isotropically scattered electrons and a superimposed directed electron distribution—the so called low-voltage electron beam (LVEB) whose energy is in the 3-15 eV range [Ref. 30, 38-41]. The low voltage electrons have a high inelastic scattering cross section during collisions with argon and efficiently create an argon plasma. When a vapor flux passes through this plasma, up to ~30% of the vapor can be ionized [Ref. 30]. A schematic illustration of the implementation of this approach in the PA-DVD system is shown in FIG. 3.

The ionized vapor species can be accelerated towards a substrate by the potential gradient that exists in the plasma sheath near the sample surface. If a floating substrate is placed in the plasma, it develops a floating potential, $V_f$, of around −16.0 V [Ref. 30]. For a floating substrate, the ion and electron fluxes are equal at the substrate, and the floating potential can then be estimated [Ref. 42]:

$$V_f = \frac{kT_e}{2e}\ln\left(\frac{\pi}{2}\frac{m_e}{m_i}\right), \quad (3)$$

where
k=Boltzmann's constant (8.617×10$^{-5}$ eV/K)
$T_e$=Electron temperature (K)
$m_e$=Electron mass (9.11×10$^{-31}$ kg)
$m_i$=Ion mass (6.671×10$^{-26}$ kg for argon), and
e=Electron charge (1.602×10$^{-19}$ C).

If a negative substrate bias is applied, the plasma sheath potential strongly attracts positively ionized species towards the substrate. This increases the kinetic energy of both the ionized evaporant molecules and the working gas ions that impact the growing film surface. However, because of multiple scattering with background gas atoms under the high-pressure growth conditions used here, the energy remains below that which causes significant re-sputtering [Ref. 43, 44].

For the reactive deposition experiments described below, the LVEB energy range was sufficient to cause significant ionization of a reactive nitrogen gas in addition to the argon working gas of the hollow cathode system and the evaporant molecules. The plasma sheath potential also changed the average vapor incidence angle making it more perpendicular to the film surface. This reduces the probability of shadowing and associated pore formation. It also increases the reaction rate between the evaporant and reactive gas species [Ref. 30].

The invention described here describes a new method (and related structure and apparatus) for the synthesis of thin film battery cathodes using an EB-DVD approach. Using the lithium manganese oxide system as an example, we show that the gas jet characteristics and electron beam parameters can be used to control the composition, crystal structure, texture, grain size and pore morphology of the films. It is shown that nano-porous cathode films can be grown at very high deposition rates with microstructures that are well suite for thin film battery applications. The deposition approach is well suited for the deposition of a plurality of layers without removing the substrate from the vacuum chamber. It is thus possible to deposit all the layers of a multilayered thin film battery by this approach. The approach also facilitates conformal deposition on non-planar substrates including the surfaces of the ligaments of cellular materials with open cell structures. This permits the synthesis of a novel multifunctional battery where the thin film battery coated cellular material also supports some other function such as structural load support or cross flow heat exchange.

Figure 20:
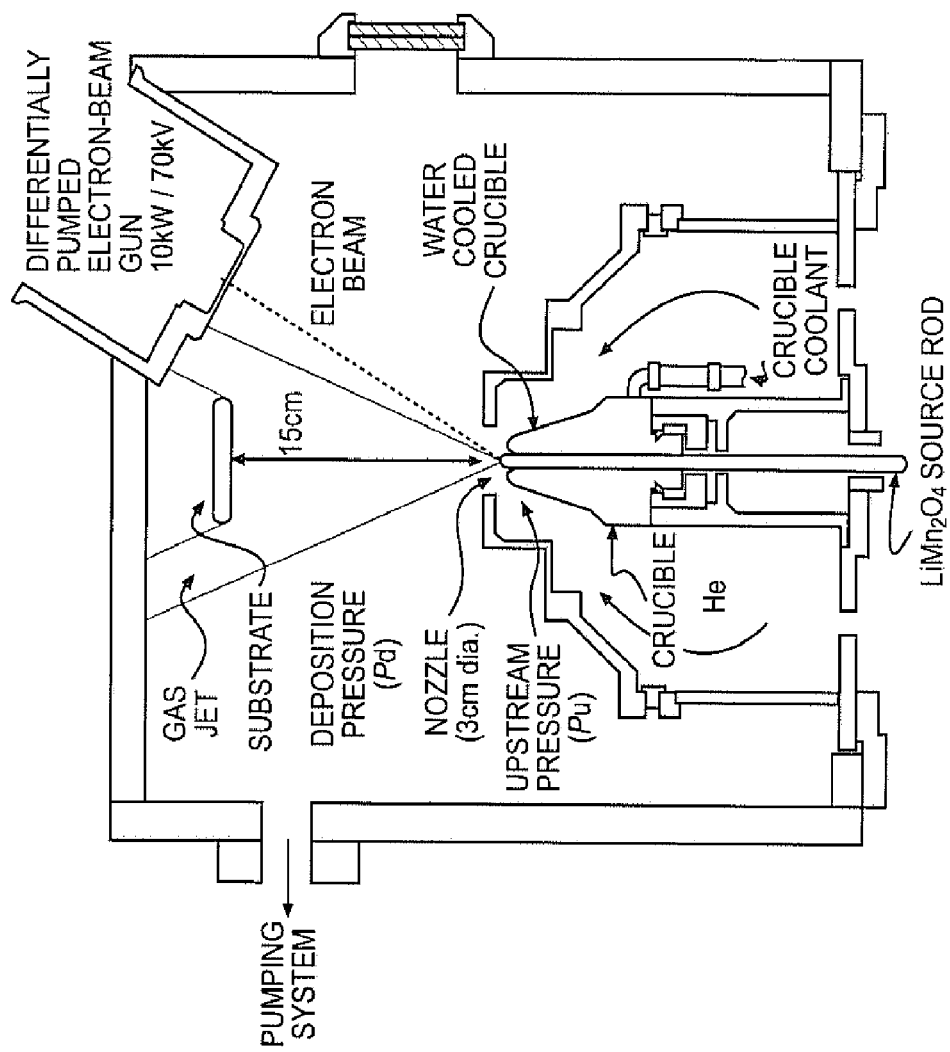
FIG. 20: shows a schematic illustration of an electron beam directed vapor deposition (EB-DVD) technique.

A schematic illustration of the EB-DVD system used here is shown in FIG. 20. In FIG. 20, $P_d$ and $P_u$ indicate the chamber (downstream) and upstream nozzle opening pressure, respectively. Similar to the PA-DVD approach, the pressure ratio, $P_u/P_d$, and ratio of specific heats of the gas determine the speed of the gas jet used to inhibit lateral spreading of the evaporant flux. A transonic rarefied gas jet is first created by expanding helium gas through a 3 cm diameter nozzle. The jet speed at the nozzle opening, U, depends on the ratio of the specific heats of the gas, γ (5/3 for He), the absolute gas temperature, T, and the Mach number of the jet, M [Ref. 37]:

$$U = M\sqrt{\gamma R_s T} \quad (1),$$

where $R_s$ is the specific gas constant (2077 J/Kg K for helium). The Mach number for the jet also depends on the ratio of specific heats of the gas, γ and the upstream and downstream pressures. It can be found from the expression:

$$\frac{P_u}{P_d} = \left[1 + \frac{\gamma - 1}{2} M^2\right]^{\gamma/(\gamma-1)} \quad (2)$$

where $P_u/P_d$ is the ratio of pressures up and downstream of the nozzle opening [Ref. 39].

The source material was placed in a 2.3 cm diameter water-cooled crucible positioned in the nozzle throat to create an annular jet forming aperture, FIG. 20. A 70 kV electron-beam was then used to evaporate 1.3 cm diameter $LiMn_2O_4$ source ingots supplied by TCI Ceramics, Inc. (Maryland). The source to substrate distance was held constant for these experiments at 15 cm. Trials conducted before the film growth campaign was attempted indicated unstable evaporation for electron beam power densities above 10 $mA/cm^2$. All the films were therefore grown using a fixed current density of 6.3 $mA/cm^2$. The resulting evaporant was entrained in a He supersonic jet and deposited on (100) Si substrates covered by a 30-60 nm native oxide layer. The substrate temperature during the deposition rose to around 70° C. due to radiative heating from the evaporation source and condensation of the vapor on the substrate.

Lithium manganese oxide films of various thicknesses were grown under systematically varied gas flow conditions to observe the effects of pressure ratio and gas density upon film morphology. To investigate pressure ratio effects, the pressure within the chamber (Pd) was fixed as 13 Pa, and the upstream pressures (Pu) was adjusted by varying the capacity of the pumping systems [Ref. 105]. Two pressure ratios of 3.0 and 6.0 were achieved in this way. Films with different thicknesses were then fabricated by adjusting the deposition time. A second set of films were synthesized using a fixed pressure ratio of 6, and the various chamber pressure varied to investigate the effect of the deposition pressure on microstructures of films. The as-deposited films were annealed at 700° C. in air for an hour to have well-crystallized films.

Lithium manganese oxide films could be fabricated on flat substrates with high deposition rate (1.3~20 nm/s) and efficiency using electron-beam directed vapor deposition. The deposition rate could be controlled by varying the gas jet pressure ratio and jet density. Significant film morphology change was observed with different processing conditions. The higher pressure ratio created relatively denser and textured films than the lower pressure ratio did. Void geometry was also changed significantly by heat-treatment. Sponge-like open and trapped pores were obtained by lower and higher pressure ratio, respectively. In higher pressure ratio regime, reduced amount of helium carrier gas did not affect film morphology significantly, only producing smoother and denser films.

Quantitative SEM image analysis showed that void agglomeration occurs as the film thickness increases. This reduces the total void surface area, suggesting that thin films (<300 nm) are more promising as a battery electrode than thick films in using EB-DVD system. Thin films with fine sponge-like pores around grain clusters or fine-scale trapped pores among grains distributed uniformly appear very promising for battery applications. XRD studies showed that EB-DVD films have cubic spinel structures with different degree of texture depending on deposition conditions after post-annealing in air at 300° C.-700° C. Higher pressure ratio enhanced film texture. Lattice parameter and composition measurement of EB-DVD lithium manganese oxide showed that films have Mn deficient ($Li_{1+x}Mn_{2-y}O_4$(x, y>0)). The above results demonstrate that thin porous lithium manganese oxide films which have cubic spinel phases can be fabricated more rapidly and efficiently than conventional vacuum deposition techniques by simply adjusting carrier gas characteristics such as the pressure ratio and amount. The easy porosity control of EB-DVD is expected to give a flexible synthetic route for not only battery and fuel cell, but also any kind of the electrode requiring high surface reaction rate. Ultimately, the EB-DVD ability of easy microstructure control can be applied to various thin oxide film fabrication problems.

Because the vapor is deposited from the gas jet stream lines, and because these remain close to the surface of substrates with rough or even porous surfaces, the cathode materials described here can be applied to fibers/wires, fabrics of the same and various cellular structures with higher specific surface area. This possibility could lead many new opportunities to create very high specific mass power storage devices.

The jet flow conditions and deposition rates of lithium manganese oxide films are summarized in Table 1. All the films were deposited using the same electron beam power density (6.3 mA/cm$^2$). The deposition rate increased rapidly with both the pressure ratio and chamber pressure. Since the electron beam current and therefore the source evaporation rates were similar for each experiment, the deposition rate is a measure of the efficiency of a vapor entrainment in the gas jets in the subsequent deposition on a substrate. As shown in the appended examples, increasing the gas jet speed and chamber pressure (the gas jet density) increased the momentum of the jet and improved the efficiency with which the atoms/molecules evaporated by the source were entrained in the gas jet and deposited on the substrate. The dependence of the deposition rate upon different deposition conditions was well modeled by simulation approach. Table 1 provides a summary of deposition conditions and rates.

TABLE 1

| Experiment | Pressure ratio | Chamber pressure (Pa) | Deposition rate (Å/s) |
|---|---|---|---|
| 1 | 3 | 13 | 52 |
| 2-1 | 6 | 13 | 160 |
| 2-2 | 6 | 3.5 | 14 |
| 2-3 | 6 | 8 | 90 |

Figure 21A:
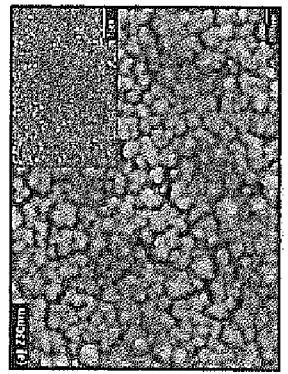
FIG. 21: shows the effect of film thickness upon the surface morphology of as-deposited lithium manganese oxide films.
Figure 21B:
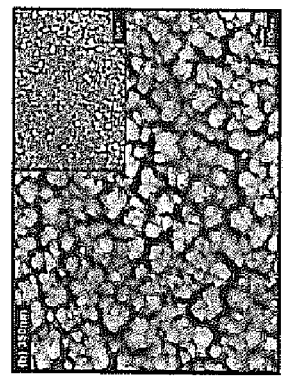
Figure 21C:

The surface morphologies of as-deposit lithium manganese oxide films grown using a pressure ratio of 3, and a chamber pressure of 13 Pa are shown for three film thicknesses in FIG. 21. In FIG. 21, the effect of film thickness upon the surface morphology of as-deposited lithium manganese oxide films. The films were fabricated using a pressure ratio of 3, and a deposition chamber pressure of 13 Pa. The film thicknesses were (a) 230 nm, (b) 350 nm and (c) 510 nm. The growth surface is typical of a columnar film grown under conditions of kinetically constrained adatom mobility [Ref. 109]. It consisted of primary growth columns that were ~0.1 μm in diameter. Primary intercolumnar pores about 0.1 μm in width surrounded the growth columns. The structure was hierarchical in the sense that the primary columns were made up of secondary growth columns with very fine pores separating them. This fractal surface morphology was generally observed on all of the as-deposited lithium manganese films regardless of the deposition conditions.

Figure 22A:
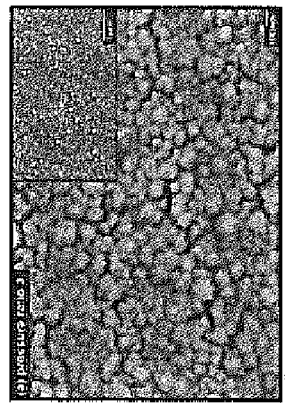
FIG. 22: shows surface morphology of as-deposited lithium manganese oxide films fabricated using different pressure ratios.
Figure 22B:
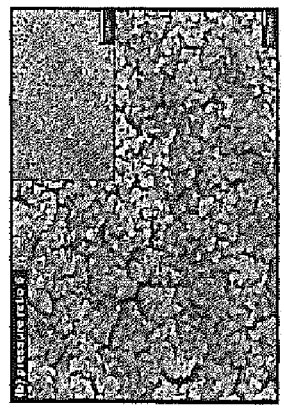
Figure 22C:
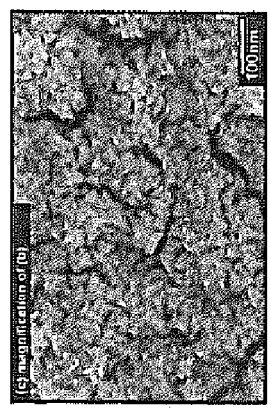

Changing the pressure ratio from 3 to 6 had a significant effect upon the fractal film morphology. FIG. 22 shows surface morphology of as-deposited lithium manganese oxide films fabricated using different pressure ratios; (a) pressure ratio=3, (b) pressure ratio=6. The chamber pressure was 13 Pa for each, and both films were around 250 nm in thickness. (c) Image is a magnified one of (b) to show the faceting of the nanoscopic grains. The thickness of these films was around 250 nm, and they were both grown at a fixed chamber pressure of 13 Pa. The film surface grown under a lower pressure ratio, FIG. 22(*a*), consisted of mounded clusters and could not be resolved a clear grain shape. As the pressure ratio was increased, a film surface composed of more faceted fine grains was observed, FIG. 22(*c*).

Figure 23A:
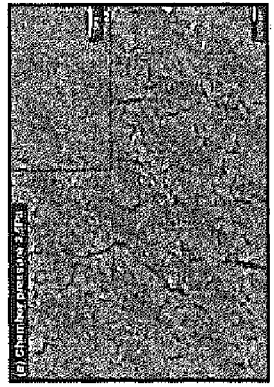
FIG. 23: shows the effect of chamber pressure upon the surface morphology of as-deposited lithium manganese oxide films.
Figure 23B:
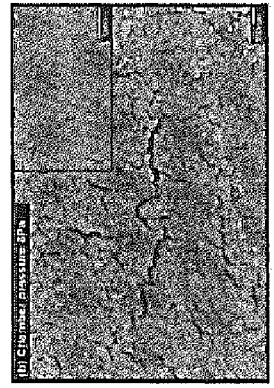
Figure 23C:
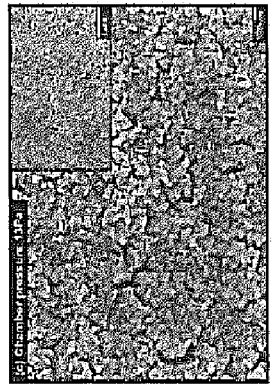

The effect of chamber pressure (gas jet density) on the surface morphology of films grown with a pressure ratio of 6 can be seen in FIG. 23. FIG. 23 shows the effect of chamber pressure upon the surface morphology of as-deposited lithium manganese oxide films; (a) 3.5 Pa, (b) 8 Pa, (c) 13 Pa. The pressure ratio was fixed at 6. The films were all around 250 nm in thickness.

The films were grown using chamber pressures of 3.5, 8, and 13 Pa. All the films had a similar thickness of around 250 nm. It can be seen that increasing the chamber pressure increased the surface breaking porosity but did not otherwise alter the basic surface morphology.

Figure 24A:
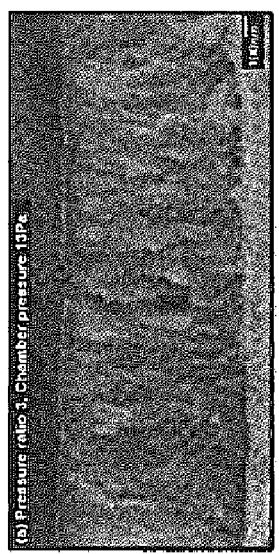
FIG. 24: shows cross-sectional images of as-deposited EB-DVD lithium manganese oxide films.
Figure 24B:
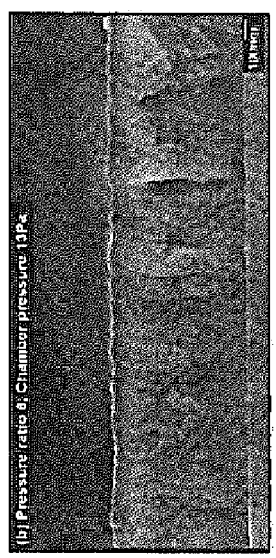
Figure 24C:
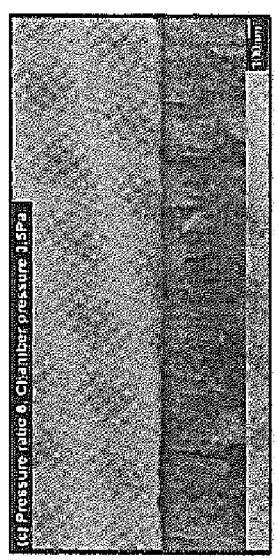

Cross-sectional images of fractured, as-deposited films are shown in FIG. 24. More specifically, FIG. 24 shows cross-sectional images of as-deposited EB-DVD lithium manganese oxide films; (a) pressure ratio=3, chamber pressure=13 Pa, (b) pressure ratio=6, chamber pressure=13 Pa, and (c) pressure ratio=6, chamber pressure=3.5 Pa. All of the films had a columnar structure with the growth columns oriented perpendicular to the substrate surface. The lower pressure ratio (3) films, FIG. 24(*a*) had larger width primary columns (~100 nm in width). It was the spherical tops of these that could be observed as mounds in the surface SEM images, FIG. 21.

Figure 25A:
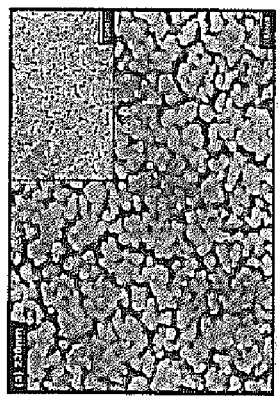
FIG. 25: shows the effect of film thickness upon the surface morphology of lithium manganese oxide films annealed at 700° C. for an hour in air.
Figure 25B:
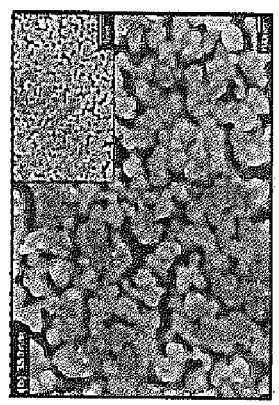
Figure 25C:
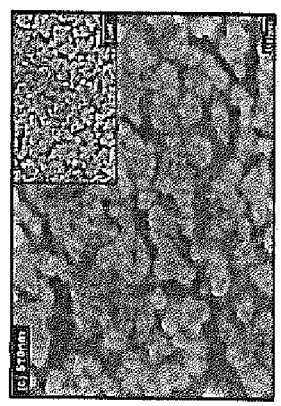

SEM images of heat-treated films grown with a pressure ratio of 3 are shown for several film thicknesses in FIG. 25. More specifically, FIG. 25 shows the effect of film thickness upon the surface morphology of lithium manganese oxide films annealed at 700° C. for an hour in air. The films were fabricated using a pressure ratio of 3, and a chamber pressure of 13 Pa. The film thicknesses were (a) 230 nm, (b) 350 nm and (c) 510 nm. The films underwent significant sintering with many of secondary growth columns having coalesced and the pores between the groups of coalesced columns. This intercolumnar porosity clearly increased with increased film thickness.

Figure 26A:
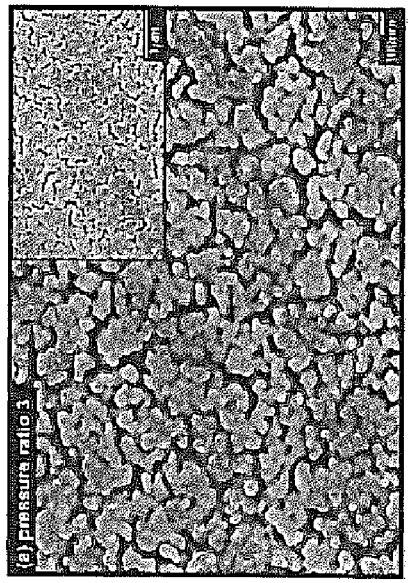
FIG. 26: shows surface morphology of lithium manganese oxide films fabricated using different pressure ratios.
Figure 26B:
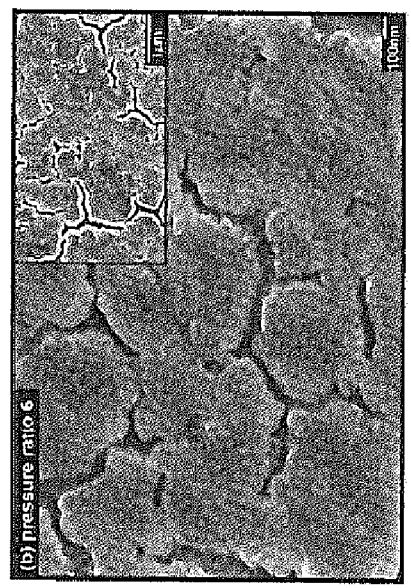

The surface morphologies of heat-treated films grown using pressure ratios of 3, and 6 are compared in FIG. 26. A shown in FIG. 26, films were annealed at 700° C. for an hour in air; (a) pressure ratio=3, (b) pressure ratio=6. The chamber pressure was fixed at 13 Pa, and both films were around 250 nm in thickness. The film grown with the lower pressure ratio, FIG. 26(*a*), contained a sponge-like interconnected pore network. The growth columns and the interconnected network of intercolumnar pores was coarser in the film grown with a higher pressure ratio, FIG. 26(*b*).

FIG. 27 shows heat-treated films grown using different chamber pressures. More specifically, FIG. 27 shows the effect of chamber pressure upon the surface morphology of lithium manganese oxide films. Films were annealed at 700° C. for an hour in air; (a) 3.5 Pa, (b) 8 Pa, (c) 13 Pa. Pressure ratio was fixed at 6. Films were all around 250 nm in thickness. As with the as-deposited films, the use of a higher chamber pressures resulted in larger primary growth columns and therefore a larger distance between the intercolumnar pores.

Figure 28A:
FIG. 28: shows cross-sectional images of EB-DVD lithium manganese oxide films annealed at 700° C. for an hour.
Figure 28B:
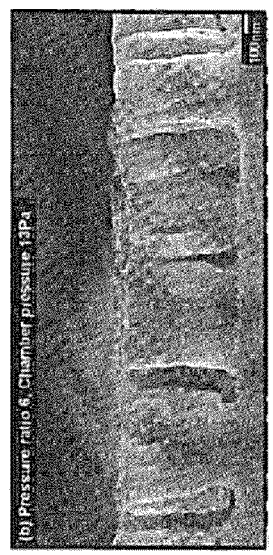
Figure 28C:
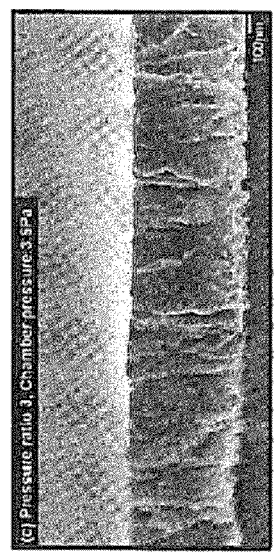

Cross-sectional images of the heat-treated films are shown in FIG. 28. More specifically, FIG. 28 shows cross-sectional images of EB-DVD lithium manganese oxide films annealed at 700° C. for an hour; (a): pressure ratio 3, chamber vacuum 13 Pa; (b): pressure ratio 6, chamber vacuum 13 Pa; (c): pressure ratio 6, chamber vacuum 3.5 Pa. They exhibit analogous trends to those observed on the outer surface. The film deposited with the lower pressure ratio had a more porous structure with both intra and intercolumnar porosity. Films grown at higher pressure ratios and with a higher chamber pressure, FIG. 28(*b*) had well defined intercolumnar porosity with wide intercolumnar pores extending through the film.

Figure 29B:
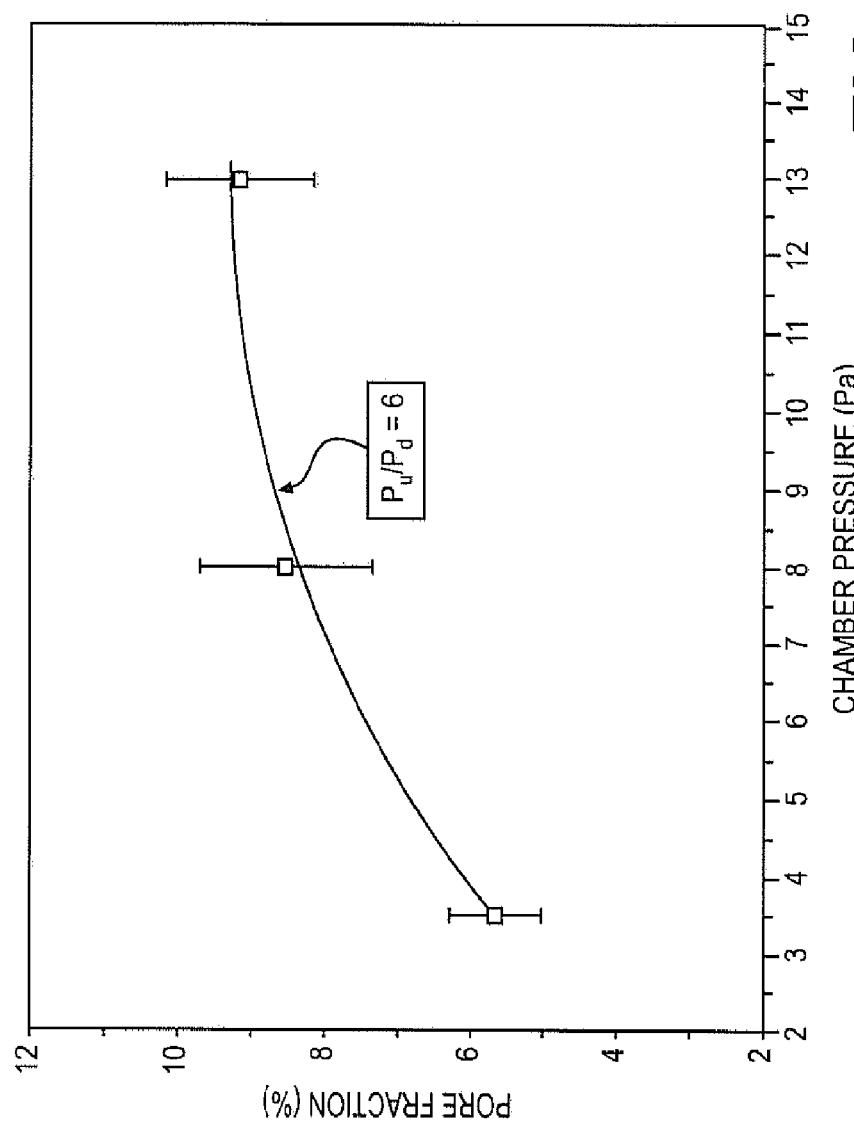
FIG. 29 (a)-(b): show the effect of film thickness and chamber pressure upon void volume fraction variations of heat-treated lithium manganese oxide film.

The measured void area as a function of the film thickness, and chamber pressure is plotted in FIG. 29. More specifically, FIG. 29 (a)-(b) show the effect of film thickness upon void volume fraction variations of heat-treated lithium manganese oxide film. (b) Effect of chamber pressure upon the void volume fraction variations of heat-treated lithium manganese oxide film. Pressure ratio was 6. The void volume fraction generally increased with film thickness (see FIG. 29 (a). As anticipated from SEM images above, the annealed films grown with the lower pressure ratio of 3 yielded the largest void areas while films deposited using a higher pressure ratio of 6 has the smaller void area. From FIG. 29, it is clear that a reducing chamber pressure and a increasing the pressure ratio results in denser films.

Figure 30A:
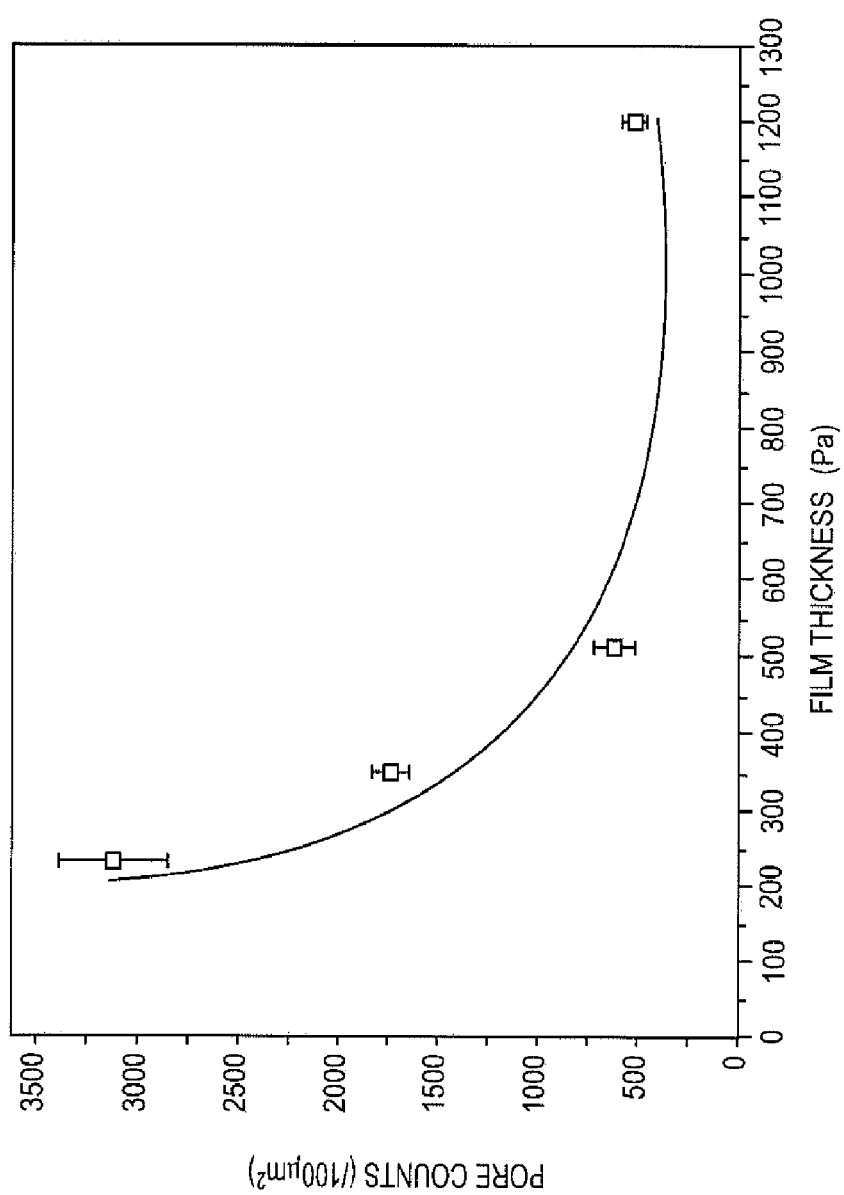
FIG. 30 (a)-(c): show the Effect of film thickness upon (a) void count, (b) average void perimeter, and (c) average void size in heat-treated lithium manganese oxide films.
Figure 30B:
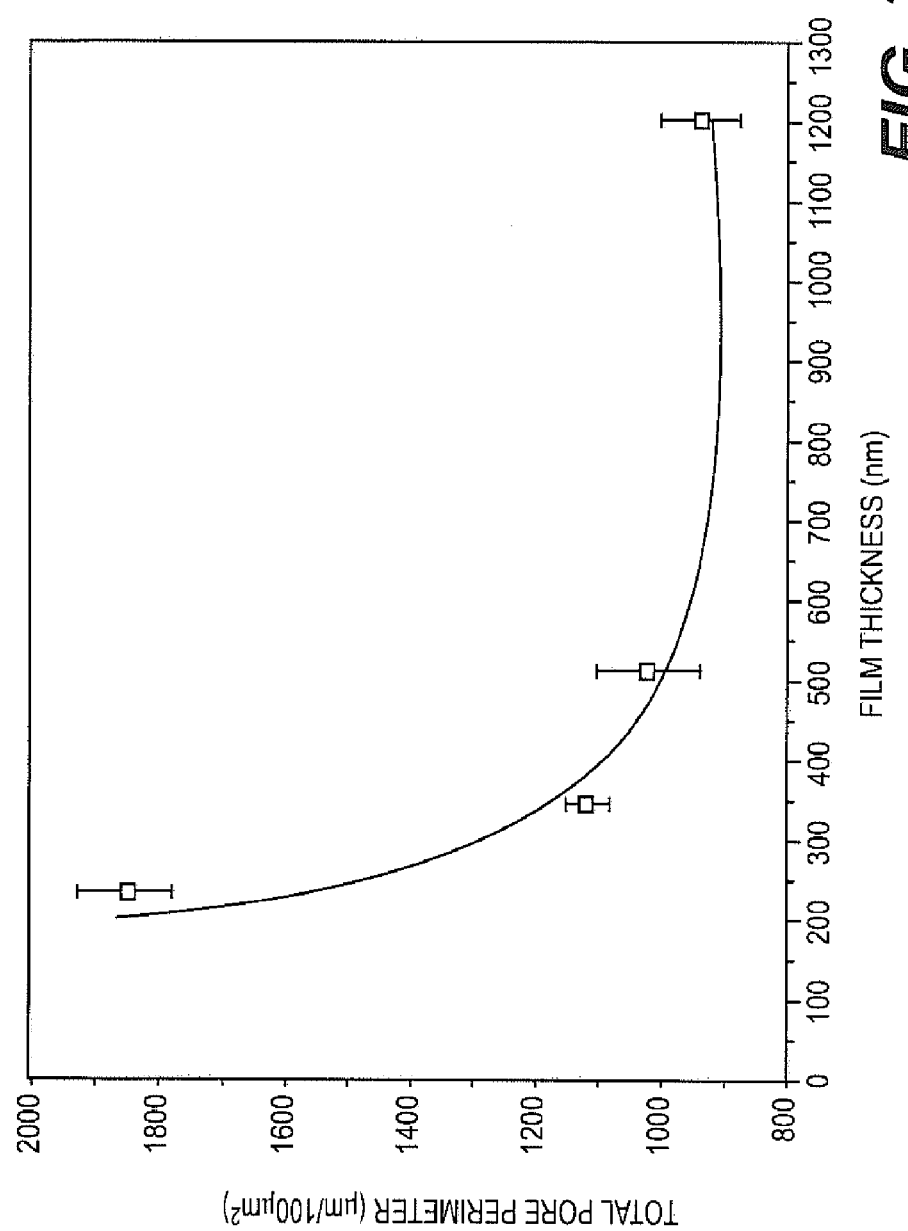
Figure 30C:
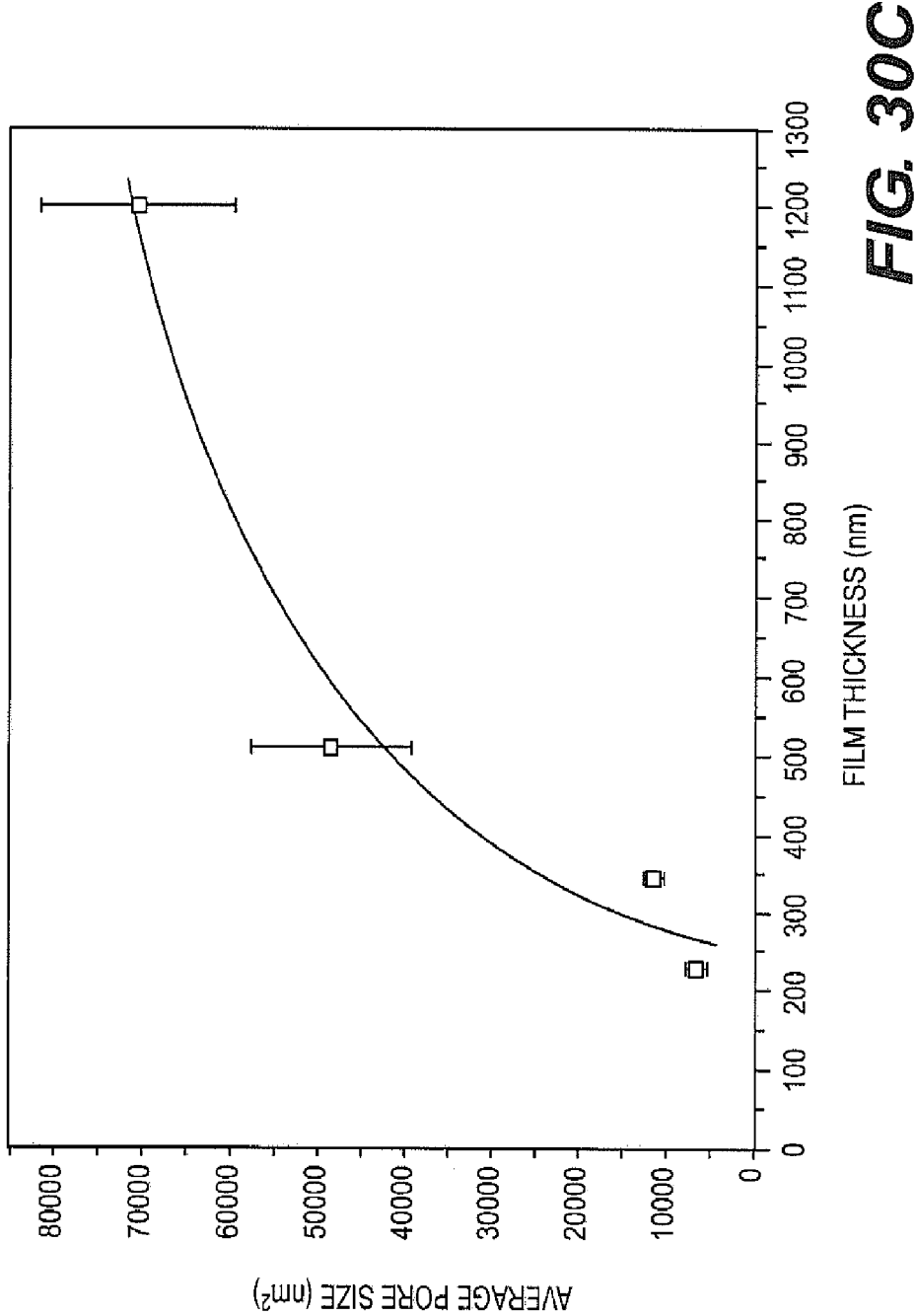

The size and shape of the pores also changed as the deposition conditions were varied. To quantify the change of void geometry with film thickness, the void count, total void perimeter, and the average void size were measured and are plotted in FIG. 30 versus to film thickness. FIG. 30 (a)-(c) show: (a) effect of film thickness upon void count, (b) Effect of film thickness upon average void perimeter, (c) effect of film thickness upon average void size in heat-treated lithium manganese oxide films. The data was obtained from SEM images of annealed films grown under using a chamber pressure of 13 Pa and a pressure ratio of 3. The number of the voids and average size of the voids increased, and the total void perimeter all decreased as films become thicker. The physical importance of these void geometry changes will be discussed later with FIG. 30.

Figure 31A:
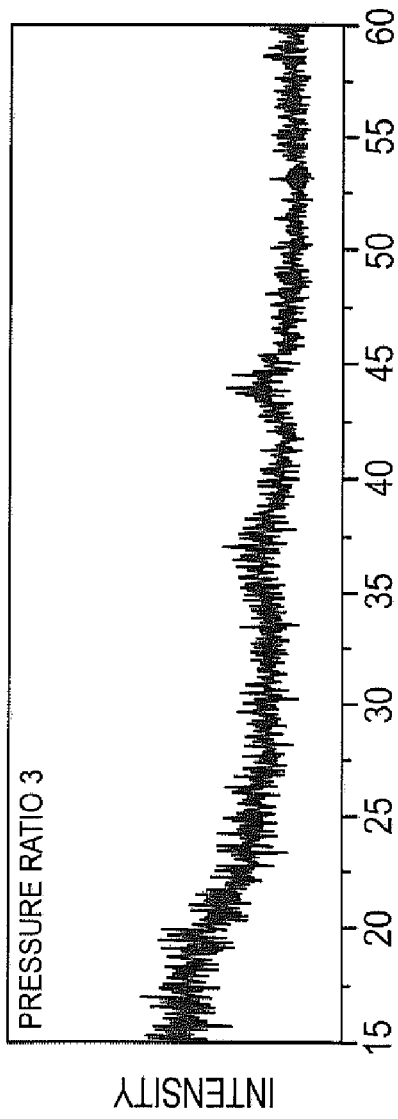
FIG. 31: shows X-ray diffraction patterns of as-deposited lithium manganese oxide films grown with pressure ratios of 3, and 6.
Figure 31B:
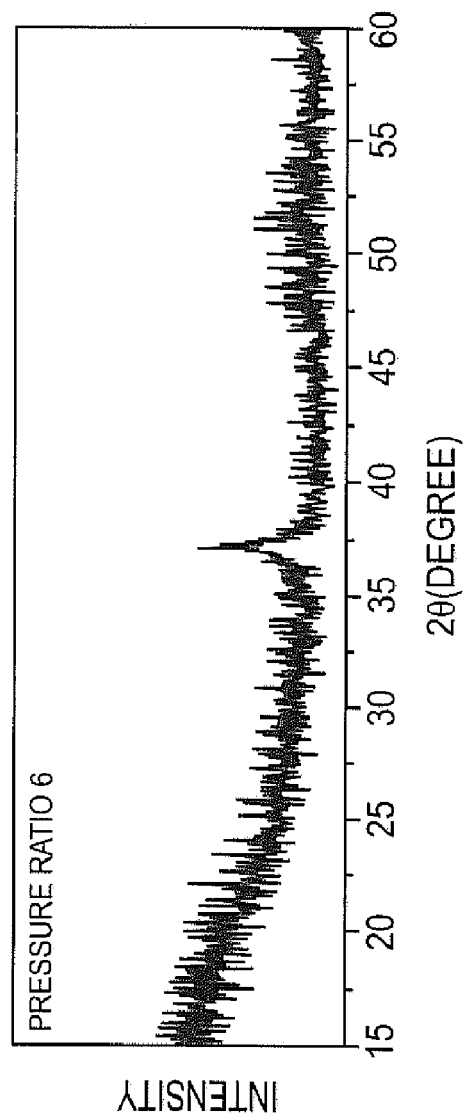

X-ray diffraction data for as-deposited and heat-treated EB-DVD lithium manganese oxide films are shown in FIG. 31 and FIG. 32. More specifically, FIG. 31 shows X-ray diffraction patterns of as-deposited lithium manganese oxide films grown with pressure ratios of 3, and 6. The chamber pressure was 13 Pa. FIG. 32 shows X-ray diffraction patterns of heat-treated lithium manganese oxide films grown using pressure ratios of 3, and 6. The chamber pressure was 13 Pa. The XRD pattern of the as-deposited films had only broad and diffuse peaks, which are both indicative of a nano-crystalline structure. The film grown at a pressure ratio of 3 showed three broad peaks at ~2θ=18°, 36°, and, 44°. These are consistent with diffractions from (111), (311), and (400) planes of a spinel structure [Ref. 19]. In contrast, XRD pattern of the film grown at a pressure ratio of 6 did not exhibit any of the spinel structure peaks, but instead had a relatively sharp peak at a 2θ of ~36°. More thorough analysis of this diffracted pattern has been performed, and it has been found that the thin film has the disordered rock salt like structure [Ref. 110].

After heat-treatment in air at 700° C. for an hour, examination of the XRD data indicated that all the films had converted to a cubic spinel structure, FIG. 32. The films grown with the lower pressure ratio of 3, exhibited many peaks, which matched those of the (111), (311), (222), (400), (331), and (511) planes of a cubic spinel, FIG. 32(a). Films grown using the higher pressure ratio had only two peaks corresponding to (111) and (222) planes regardless of the chamber pressure, FIG. 32(b). Pole-Figures were constructed to investigate the degree of the preferred orientation of films grown with the lower and higher pressure ratios, FIG. 33. The former had an almost random texture [111]. Whereas the film fabricated at the higher pressure ratio exhibited strong <111> texture. The chamber pressure had a little effect upon this strong <111> texture when the films were deposited with a higher pressure ratio. More specifically, FIG. 33 shows pole figures of lithium manganese oxide films annealed 700° C. in air for 1 hour (a) grown at a pressure ratio of 3 and chamber pressure of 13 Pa. (b) pressure ratio of 6 and chamber pressure of 13 Pa. The texture strengths of (a) and (b) are 1.07 and 2.96, respectively. A texture strength of unity indicates random texture [Ref. 111]. The low pressure ratio sample had almost random texture while that deposited at higher pressure ratio was much more textured with a predominance of (111) planes coplanar with the coating surface.

The lattice parameters of EB-DVD lithium manganese oxide films were measured from XRD data. All of the annealed EB-DVD lithium manganese oxide films had the similar lattice parameter of 8.213 Å (±0.02). This lattice parameter is slightly less than that of stoichiometric $LiMn_2O_4$, 8.24762 Å [Ref. 112]. There is a strong relationship between the lattice parameter and manganese oxidation state, which is dependent upon composition [Ref. 74, 80]. A lattice parameter that is smaller than that of stoichiometric $LiMn_2O_4$ is consistent with an oxygen or lithium rich cubic spinel structure [Ref. 113]. Compositions of several of the EB-DVD lithium manganese oxide films were measured using XPS, ICP-AES and RBS and all were found to be $Li_{1+x}Mn_{2-y}O_4$ (0.8<x<0.125 and y~0.2), consistent with a manganese deficient spinel structure.

Generally, in sputtering and conventional electron beam deposition, the vapor flux to the substrate is broad, and only small portion of the vapor reaches to the substrate decreasing the evaporation rate and efficiency. However, in EB-DVD, the solid angle of the vapor can be adjusted easily by changing the pressure ratio and chamber pressure, and has an advantage over other deposition systems above in the aspect of the deposition rate and efficiency.

Except the deposition rate and efficiency, the pressure ratio difference resulted in the clear distinction in the film morphology, density, and texture. Then, it is now in question that how the pressure ratio difference resulted in those distinctions in films. Key deposition parameters, which can affect the film structure, are ad-atom energy [Ref. 115], deposition rate [Ref. 116], ad-atom incidence angle to the substrate [Ref. 115], chamber pressure [Ref. 117] and so on. The higher velocity of vapor atoms would increase the ad-atom energy, but the ad-atom energies obtained by DSMC were not different significantly each other as summarized in Table 2 due to vapor atom wall shock near the substrate. Since the average incident angles of vapor atoms to substrates are similar in all cases as seen in Table A2, the vapor atom incident angle is not responsible for the film morphological difference as well. In the case of the deposition rate effect, the higher deposition rate produces the more porous film morphology. However, in this study, the film produced under higher pressure ratio showed denser morphology in spite of its much higher deposition rate. It is also certain that the film morphological difference between higher and lower pressure ratios does not come from the chamber pressure effect, because the same chamber pressures (~13 Pa) of different pressure ratios did clearly produced distinct film structures as seen in FIG. 23 and FIG. 27.

Now, the only possible mechanism to explain the films' morphological difference between higher and lower pressure ratio values is the homogeneous vapor clustering of evaporated atoms. Because the temperature of vapor atoms in the current EB-DVD set up may be low due to supersonic nozzle expansion, vapor atoms may be highly supersaturated. Those supersaturated vapor atoms can form unstable dimmers, some of which will be stable clusters via collisions with He releasing excess energy [Ref. 118]. The stable clusters will grow very rapidly with continuous cluster—vapor atom and cluster—He collisions. In the study of Jet Vapor Deposition™, the probability of cluster formation in vapor phase was calculated and showed that the average cluster size is the sensitive function of the time of flight of atoms to the substrate and the vapor atom density [Ref. 119]. From DSMC results in appended examples, it is provided that lower pressure ratio and higher vapor atom density in pressure ratio of 3 and chamber pressure of 13 Pa provided low vapor atom speed and high vapor atom density enough for significant clustering.

In the case of clusters formed by EB-DVD, the clusters have low kinetic energy (<0.5 eV/atom), which can be defined as low energy cluster beam deposition (LECBD) [Ref. 120, 121]. According to molecular dynamic simulation results, the low energy clusters do not break apart upon impact on the substrate [Ref. 122], and in the polycrystalline growth, clusters are arrayed with random orientations keeping their arrival orientations due to their low energies [Ref. 123]. These results are clearly consistent with the EB-DVD growth using the lower pressure ratio in EB-DVD, which produced highly porous films with the random texture.

FIG. 30 shows number of voids, total void perimeter, and average void size in the given area according to the film thickness. As the film thickness increases, total numbers and perimeter of voids decrease, while average void size increase. Although the total perimeter of voids is 2-dimensional quantity, it should be proportional to 3-dimensional total void surface area. Thus, it can be concluded that voids agglomerates into larger sizes reducing total surface area, and consequently surface energy as film thickness decreases. When as-deposit films and heat-treated films are compared, the same trend regarding void geometry is observed during the heat-treatment as well. Those results explain why voids tend to agglomerate as film thickness increases and during heat-treatment.

EXAMPLES

Experimental Example 1

Significant changes in the morphology and texture of EB-DVD films can occur as the jet flow conditions are varied. This is consequence of gas phase collision during vapor transport. As the gas jets momentum is varied by changing the flow conditions, its effectiveness at entraining vapor depositing onto a substrate will change. Collisions within the jet plume can also lead to cluster formation, which would have a significant effect upon the morphology of a thin film. Insight into this fundamental process can be gained from directed simulation Monte Carlo and is presented below of a single metal species (Cu) transport in a helium flow. Such an approach is difficult to implement for the many different atomic and molecular species present during deposition of $LiMn_2O_4$. However, several of the most important phenomena can be encountered during the deposition of a simple metal species such as copper for which gas phase collision parameter are provided.

A1.) Direct Simulation of Monte Carlo (DSMC) Method

DSMC is widely used to simulate motions of particles in rarefied gas flows. The major assumption of DSMC is that the motion and collisions of particles are decoupled from each during finite simulation time steps. The interactions of pairs of particles are then randomly selected within a cell for collision and collided particles move in free molecular motion. During each simulation step, such uncoupled collisions and movement of computational particles through the grids of a simulation space, are recorded.

A 2-dimensional DSMC code (ICARUS) developed at Sandia National Laboratory was utilized to model the EB-DVD process. The vapor atom velocity, mean free path, energy and incident flux/angle to the substrate were computed for the conditions used in experiments. FIG. 34 shows the DSMC grid in this simulation. The grid geometry incorporated the nozzle opening diameter and geometry, the source material position, and substrate location used in the DVD experimental setup. The cell size and number of computational particles were carefully chosen to ensure adequate collision statistics.

Two different DSMC problems were examined: one with and without clustering reactions. The former assumes elastic collisions between the copper and helium atoms and does not permit cluster formation. It was used to predict vapor atom velocity, impact energy, incident angle and investigate the monoatomic flux incident upon the substrate. DSMC with clustering reactions were performed to investigate vapor atom clustering during the deposition under low and high pressure ratio/chamber pressure. The ICARUS software allows several mechanisms of interaction to be addressed. An elastic gas reaction, where the reaction is completely kinetic and charge transfer and electron impact are ignored, was used. Serial reactions were permitted such as: $Cu+Cu=Cu_2$, $Cu_2+Cu=Cu_3 \ldots Cu_n+Cu=Cu_{n+1}$. The elastic collision reaction rate in ICARUS code has the form $k=A\exp(-E_a/k_BT)$, where k is the reaction rate, A is the pre-exponential constant, $E_a$ is the activation energy, $k_B$ is the Boltzmann constant, and T is the absolute temperature. A reaction rate of unity was used as comparison of each set of experimental conditions was the primary interest.

Helium was used as the carrier gas. The helium carrier gas flow rates were varied from $0.25 \times 10^{24}/m^2$ s to $0.108 \times 10^{25}/m^2$ s depending on the upstream pressures. The vapor inlet flux was fixed at $0.1 \times 10^{24}/m^2$ s. The chamber pressure was preset to either a pressure of 13 Pa or 3.5 Pa. A variable hard sphere (VHS) model was used to calculate the collisional cross section [Ref. 114]. A detailed report of simulation approach can be found elsewhere [Ref. 105].

A2). DSMC Results

Table 2 summarizes the non-reaction results and gives the estimated vapor flux, incident angle, and ad-atom energies for copper. It can be seen that the average vapor atom speed, density and incident flux (on the substrate) were all increased with the pressure ratio and chamber pressure. The incident flux upon the substrate is correlated to the higher deposition rate.

Figure 36C:
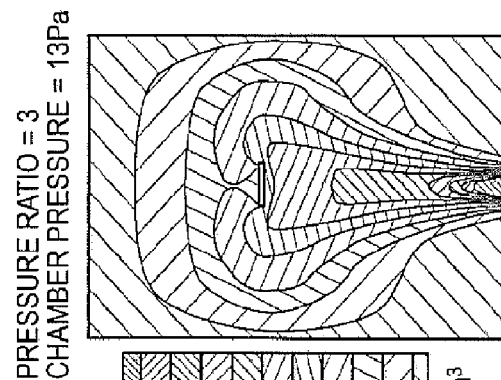
FIG. 36: shows simulated vapor atom densities under experimental processing conditions.
Figure 36B:
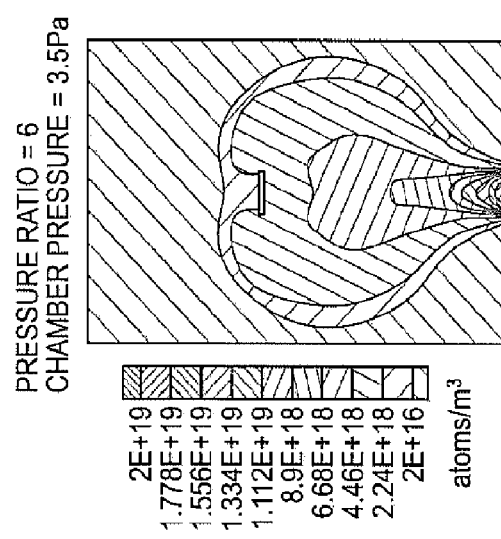
Figure 36A:
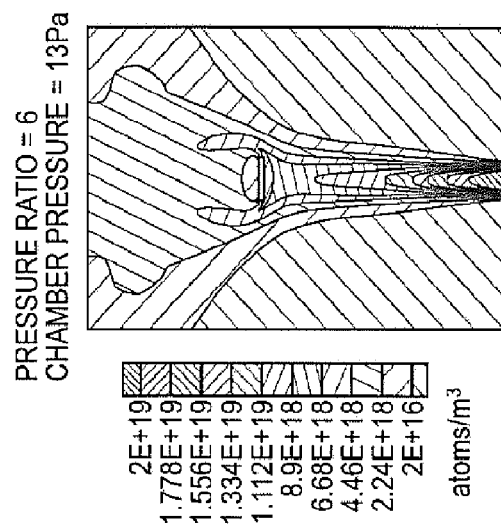

FIG. 35 and FIG. 36 show the vapor atom velocity and density during the deposition. More specifically, FIG. 35 shows simulated vapor atom velocities for experimental processing conditions studied here; (a) pressure ratio of 6, chamber pressure of 13 Pa; (b) pressure ratio of 6, chamber pressure of 3.5 Pa; (c) pressure ratio of 3, chamber pressure of 13 Pa. FIG. 36 shows simulated vapor atom densities under experimental processing conditions studied here; (a) pressure ratio of 6, chamber pressure of 13 Pa; (b) pressure ratio of 6, chamber pressure of 3.5 Pa; (c) pressure ratio of 3, chamber pressure of 13 Pa. It is clear that higher pressure ratio and chamber pressure (pressure ratio ~6, and chamber pressure ~13 Pa) generates faster and more focused vapor stream to the substrate yielding a higher deposition rate. With the same pressure ratio of 6, the lower chamber pressure (3.5 Pa) inefficiently focused the vapor atoms due to the lower collision rate between the helium gas jet and vapor atoms. This also resulted in a lower vapor atom speed. Other deposition parameters such as the average incident angle (from the normal to the substrate) and ad-atom energy (near the substrate) were not so sensitive to the deposition conditions. Table 2 summarizes DSMC results for the synthesis conditions used in the experiment.

TABLE 2

| Pressure ratio | Chamber pressure (Pa) | Average Cu atom Velocity (m/s) | Average Cu atom Density (/m$^3$) | Average Cu atom incident flux (/m$^2 \cdot$s) | Average Cu atom incident angle (°) | Average Cu atom energy (eV) |
|---|---|---|---|---|---|---|
| 6 | 3 | 991 | $1.3 \times 10^{19}$ | $1.3 \times 10^{21}$ | 36.4 | 0.055 |
|   | 5 | 386 | $0.43 \times 10^{19}$ | $1.6 \times 10^{20}$ | 30.9 | 0.048 |
| 3 | 3 | 368 | $1.0 \times 10^{19}$ | $5.1 \times 10^{20}$ | 32.3 | 0.048 |

*The incident flux and ad-atom energy were obtained at the front of the substrate. The average incident angle is the measurement from the normal to the substrate.

Figure 37A:
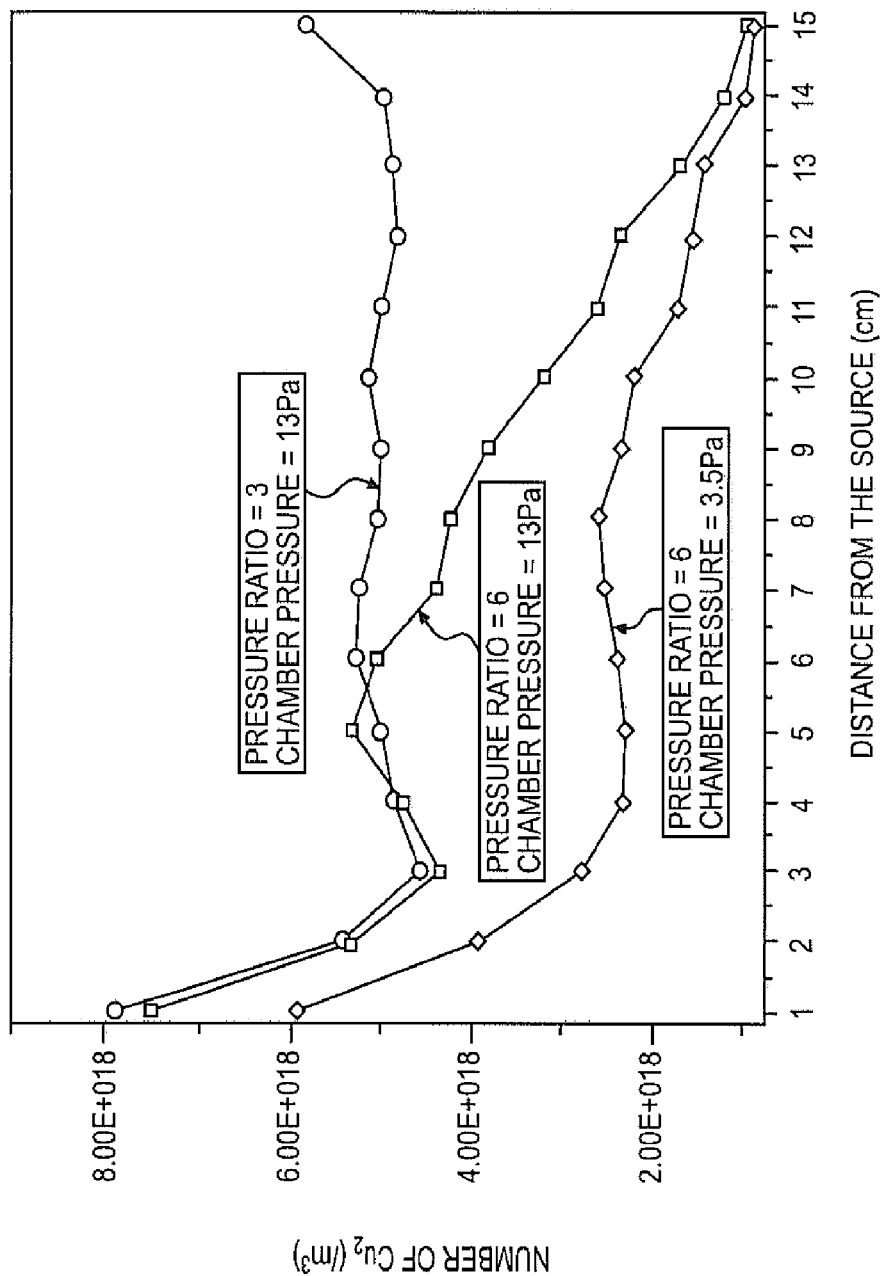
FIG. 37 (a)-(c): show (a) Number of dimmers ($Cu_2$) and (b) trimers ($Cu_3$) as a function of distance from the source to the substrate, and (c) Ratio of number of clustered atoms to monomers near the substrate.

FIG. 37 shows DSMC results when clustering was permitted. FIG. 37 (a)-(c) show: (a) Number of dimmers (Cu$_2$) and (b) trimers (Cu$_3$) as a function of distance from the source to the substrate, and (c) Ratio of number of clustered atoms to monomers near the substrate. FIG. 37(a) and FIG. 37(b) shows the concentration of dimmers (Cu$_2$) and trimers (Cu$_3$) at the centerline of the jet between the source and the substrate. The critical factor, which governs the film microstructure, is not the absolute number of clustered atoms, but the ratio of monomer to clusters to the substrate. FIG. 37(c) shows the ratio of clustered atoms to monomer in each experimental condition, which demonstrates clearly that lower pressure ratio and higher chamber presser produce much higher clustered atoms near the substrate.

The above experimental data suggests that deposition rate can be controlled by the electron beam power, and gas jet density and speed, to thereby enable films to be grown at deposition rates up to 16 nm/s. This is a significantly higher deposition rate than reported for sputtering and other vapor deposition techniques. The lithium manganese oxide films grown by this approach had a composition, $Li_{1+x}Mn_{2-y}O_4$ with $0.08 < x < 0.125$ and $y \sim 0.2$. They had a manganese deficient cubic spinel structure and were composed of very small grains after annealing in air 700° C. The use of low gas speed jets promoted the gas phase formation of clusters and resulted in films with a random texture. These films were highly porous with a sponge-like interconnected pore network after annealing at 700° C. in air. Thin films grown under the high jet speed conditions contained small, uniformly distributed pores with a significant <111> texture. They appeared well suited for use as the cathode layers in thin Li/Li-ion batteries. The vapor deposition approach will facilitate their deposition on flat, rough, fibrous and cellular surfaces with high specific surface area.

Experimental Example 2

Film Deposition

Cold pressed, 1.3 cm diameter Li$_3$PO$_4$ rods provided by Plasmaterials Inc. (California, USA) were used as an evaporation source. They were fabricated from powder and were porous with a density between 60 and 80% of the theoretical density (the theoretical density of Li$_3$PO$_4$ is 2.54 g/cm$^3$). A 10 kW/70 kV electron beam was used to evaporate the source material. The electron beam current density on the source surface then controlled the evaporation rate. This was gradually increased until the critical current density (~0.8 mA/cm$^2$) for unstable evaporation (droplet emission) was reached. All subsequent evaporation campaigns then used a lower power density of ~0.4 mA/cm$^2$ to ensure no droplet incorporation in the films. The Lipon films were deposited on several different substrates in order to conduct a full set of the film characterizations: glass substrates were used for X-ray diffraction studies and X-ray photoelectron spectroscopy, a (100) silicon wafer was for scanning electron microscopy studies and stainless steel substrates were used for electrochemical impedance spectroscopy measurements.

The deposition conditions used for Lipon film synthesis on the glass substrates are summarized in Table 3. The base chamber pressure was around $1.35 \times 10^{-2}$ Torr. The chamber pressure (P$_d$) was then allowed to reach $5.7 \times 10^{-2}$ Torr when the He+N$_2$ (with He:N$_2$=4:1) working gas mixture was introduced into the DVD chamber at a flow rate of 2.5 slm. The deposition experiments with silicon substrates used a higher carrier gas flow of 5.0 slm, Table 4. This increased the chamber pressure to $9.75 \times 10^{-2}$ Torr, and the pressure ratio (P$_u$/P$_d$) from 3.64 to 4.17.

Table 3 shows deposition conditions for Lipon films prepared on glass substrates. The base chamber pressure was $1.35 \times 10^{-2}$ Torr. The upstream pressure (the chamber pressure), P$_u$, was $5.7 \times 10^{-2}$ Torr and the downstream pressure, was $1.57 \times 10^{-2}$ Torr.

TABLE 3

| Plasma current (A) | He + N$_2$ (slm) | Pressure ratio (P$_u$/P$_d$) | Deposition time (min.) |
|---|---|---|---|
| 0 | 2.5 | 3.64 | 30 |
| 60 |  |  | 15 |
| 90 |  |  |  |
| 120 |  |  |  |
| 150 |  |  |  |

For many of the depositions, the hollow cathode plasma technique was employed to ionize the vapor species near the substrate. As shown in FIG. 3, the plasma intensity was controlled by the plasma current (I$_{HS}$), which was measured between the hollow cathode and an anode plate with dimensions of 15.0 cm×9.0 cm. The plasma current could be adjusted from 60 to 200 A by an external power supply. As shown in Tables 3 and 4, a plasma current range of 60 to 150 A was used for the plasma-assisted deposition experiments. Argon was used as the plasma working gas and the electrons emitted from the hollow cathode then created an argon plasma. The Lipon film depositions were all conducted without substrate heating. The substrate temperature during the unassisted deposition runs was 55±5° C. The substrate temperature during the plasma-assisted deposition was higher (195±15° C.) due to resistive sample heating and energetic particle impacts. Table 4 shows deposition conditions for Lipon films prepared on (100) silicon and alumina substrates. The base chamber pressure was $1.35 \times 10^{-2}$ Torr. The upstream pressure (the chamber pressure), P$_u$, was $9.75 \times 10^{-2}$ Torr and the downstream pressure, P$_d$, was $2.34 \times 10^{-2}$ Torr.

TABLE 4

| Plasma current (A) | He + N$_2$ (slm) | Pressure ratio (P$_t$/P$_d$) | Deposition time (min.) | Deposition rate (nm/min.) |
|---|---|---|---|---|
| 0.0 | 5.0 | 4.17 | 10 | 200 |
| 60 | | | 30 | 128 |
| 90 | | | | 19.33 |
| 120 | | | | 10.67 |
| 150 | | | | 9.0 |

The deposition rate was obtained from the deposition time and the measured Lipon thickness determined by scanning electron microscopy. As shown in Table 4, the Lipon film deposition rate decreased when the argon plasma was activated and decreased further with increase of the plasma current. The reduced deposition rate was a result of evaporant plume defocusing by the cross-flowing argon jet utilized during the PA-DVD approach. Even so, the deposition rate was up to 45 times faster than that reported for reactive RF-magnetron sputtering [Ref. 20].

Characterization Methods

Lipon films were characterized by a variety of experimental methods. A JEOL 6700 Scanning Electron Microscopy (SEM) was employed to investigate the surface morphology and cross-sectional microstructure of Lipon films deposited on silicon substrates. For cross-sectional characterization, the epoxy-mounted Lipon samples were mechanically polished and plasma etched. All samples were coated with a Pd/Au layer to reduce surface charging effects. X-ray diffraction (XRD) was used to determine the structure of both the Li$_3$PO$_4$ and Lipon films. The diffractometer employed a CuK$\alpha_1$ radiation source ($\lambda$=1.5405 Å) and scanned a 2θ angle of 10° to 80° with a 0.02° scan increment.

X-ray photoelectron spectroscopy (XPS) was used here to determine an N/P ratio for the films and to provide information about elemental bonding environments. A Perkin-Elmer 560×PS system with an Al K$_\alpha$ X-ray excitation source (1486.6 eV) was used for these measurements. Survey scans were carried out from 1150 eV down to 0 eV and high resolution scans made in the N$_{1s}$, P$_{2p}$ and C$_{1s}$ peak regions. Because surface charging shifted these peak positions, the C$_{1s}$ peak at 285.0 eV was taken as a reference energy position and used to correct the positions of the rest of the XPS spectrum. The atomic fraction of each element, C$_x$, was determined from the XPS peak intensities using the relation:

$$C_x = \frac{I_x}{S_x} \cdot \left[\sum_{i=1}^{n}\left(\frac{I_i}{S_i}\right)\right]^{-1}, \tag{4}$$

where n is the number of elements, I$_x$ is the peak intensity of XPS spectral peak for the x-th element and S$_x$ is the sensitivity factor of the element (provided by Perkin-Elmer) [Ref. 45]. The estimated error of the composition measured in this way was ±10% of the deduced atomic fraction.

X-ray photoelectron spectroscopy (XPS) has a very low sensitivity factor for lithium and a low penetration depth (~2 nm). The EDS method is also insensitive to lithium and cannot be used to determine the concentration of this element. It is therefore difficult to determine the Li concentration in Lipon films by these methods. Here, we utilized a Varian Vista-MPX ICP-OES inductively coupled plasma optical emission spectroscopy (ICP-OES) to determine the Li/P ratio. Because ICP-OES provides a bulk analysis of solids dissolved in a liquid solution, it provided an elemental composition ratio for bulk samples. A Li$_3$PO$_4$ powder sample was used as a standard since this could be completely dissolved in a solution of 80% Mili-Q water (~18.2 MΩ) and 20% HNO$_3$ in the 70-80° C. range. The Lipon films were then dissolved in the same solution. To avoid emission wavelengths common to both Li and P elements, the Li intensity was determined from the emission line with a wavelength of 610.365 nm while that for P was at 213.618 nm. The Li and P intensity ratios of Li$_3$PO$_4$ standard samples were first measured and then used to calibrate the measured Li and P intensities of the Lipon samples. The estimated error of this approach is approximately ±5.0% of the intensity ratio.

Figure 4:
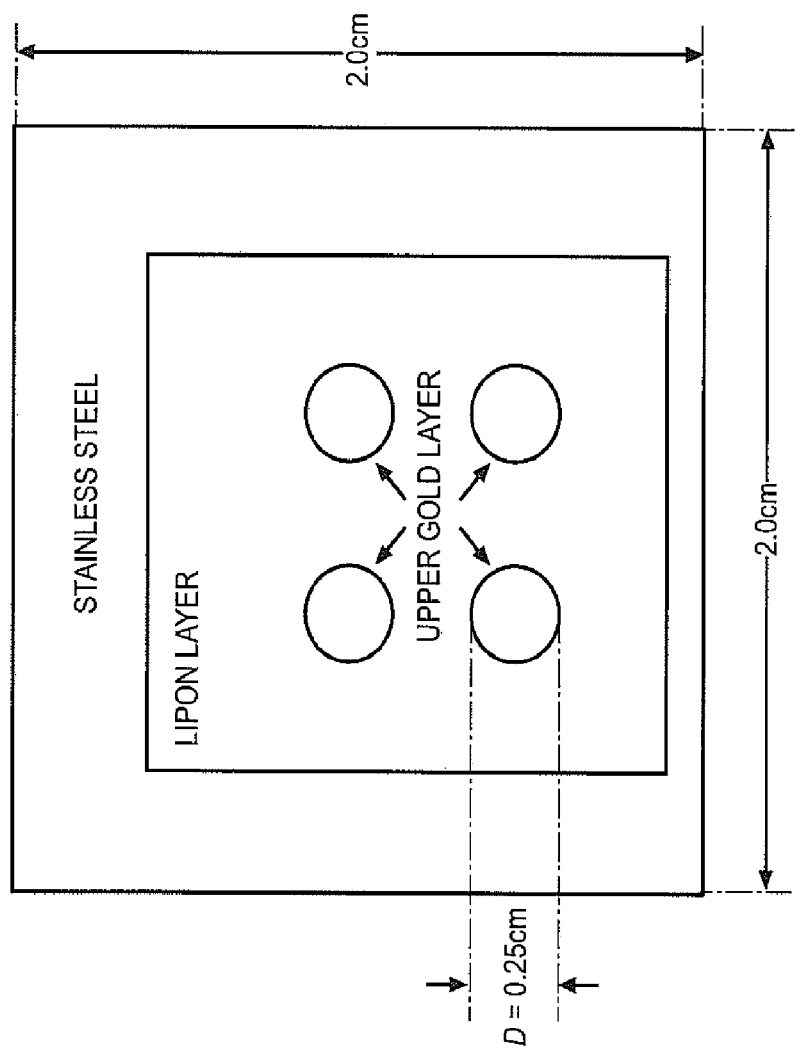
FIG. 4: shows the stainless steel/Lipon/Au test cell structure used to measure Li-ion conductivities by electrochemical impedance spectroscopy (EIS)

The Li-ion conductivity of the Lipon films was determined by electrochemical impedance spectroscopy (EIS) [Ref. 46]. In order to measure the EIS spectra, a stainless steel substrate/Lipon/Au test cell with four test pads was fabricated as shown FIG. 4. The complex impedance of each of the test pads was then measured in the 0.1-10$^5$ Hz frequency range at room temperature with 0.1 logarithimic increments. The EIS measurements of Lipon test cells employed a Princeton Applied Research Potentiostat/Galvanostat (Model 273A) and a Solartron Frequency Response Analyzer (Model 1255 FRA). The Cole-Cole equation was used to deduce the Li-ion conductivities from the impedance plane data [Ref. 18, 46]. The complex impedance, Z(ω), is given by:

$$Z(\omega) = R_\infty + \frac{R_o - R_\infty}{1 + (j\omega\tau)^n}, \tag{5}$$

where
R$_o$=Test structure resistance at low frequency (Ω)
R$_\infty$=Test structure resistance at high frequency (Ω)
$\tau$=(R$_o$-R$_\infty$)×C
C=Capacitance (F) and 0≤n≤1.

The Lipon resistance, R$_o$-R$_\infty$, can be obtained fitting the EIS data to the modified circuit model defined by equation (5). The Lipon resistance is then used to calculate the Li-ion conductivity, σ$_{ionic}$:

$$\sigma_{ionic} = \frac{d}{R_{Lipon} \times A}, \tag{6}$$

where d is the thickness of Lipon films, A is the area of the test cell, and R$_{Lipon}$ is R$_o$-R$_\infty$ as defined by the equation (5).

Figure 5:
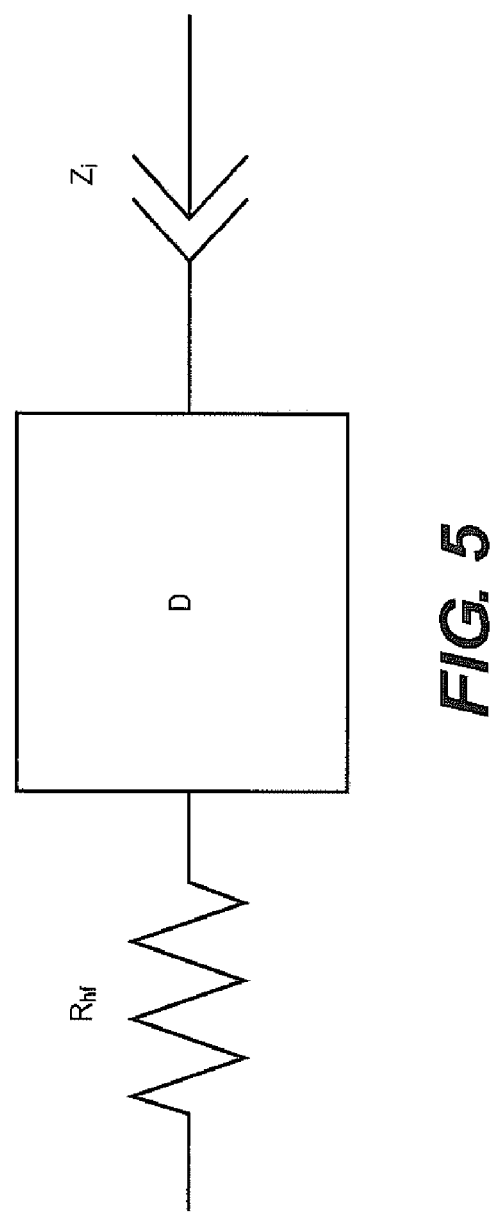
FIG. 5: shows a schematic diagram demonstrating the imperfect capacitor's impedance, $Z_j$, can be combined in series with the Cole-Cole equation.

Sometimes a metal/Lipon/metal test cell structure contains an ion-blocking interface. In this situation only capacitive effects contribute to the measured impedance at low frequencies. If the interface between the electrolyte and the ion-blocking electrode is not smooth, it will sometimes not function as a perfect blocking electrode. The EIS spectra do not then intercept the impedance plane diagrams real impedance axis at a 90° angle in the low frequency regime. In this case, the EIS spectra cannot be represented as a pure capacitance response in the low frequency range. The impedance contribution of an imperfect capacitance, Z$_i$, must then be employed in the low frequency range. As shown in FIG. 5, the imperfect capacitor's impedance, Z$_i$, can be combined in series with the Cole-Cole equation. The impedance-capacitance relation in this regime is defined by:

$$Z_i = C_{dl} \cdot (j\cdot\omega)^{-n} \tag{7},$$

where
C$_{dl}$=Interfacial capacitance between a metal layer and a Lipon film

ω=Angular frequency (Hz), and
0≤n≤1.

In the equation (7), the n can be converted into a radial angle nπ/2. If n is 0.5, the EIS spectra intersect the real component of the impedance axis at a 45° angle. This is indicative of a diffusion process in the low frequency range. If n=1, the EIS spectra make a 90° angle of intersection and is representative of a pure capacitance. When n lies between these two limits, an interpretation of the EIS spectra becomes very complex [Ref. 46].

Figure 6:
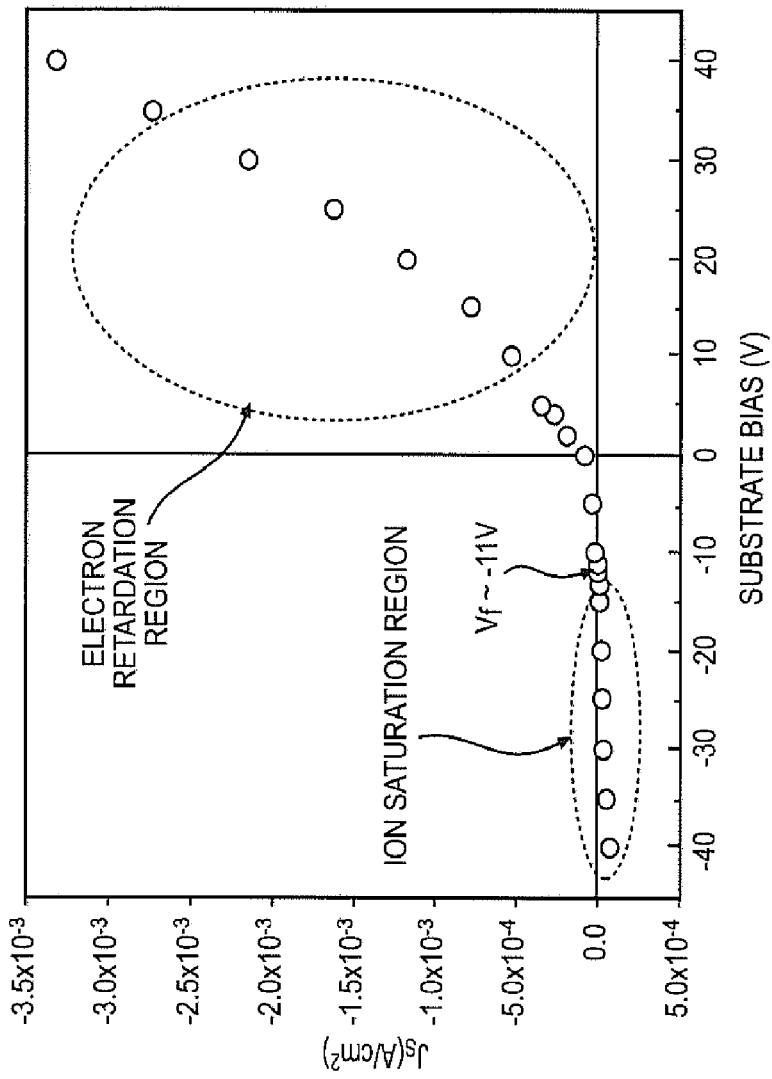
FIG. 6: shows the voltage vs. current density of hollow cathode plasma with no carrier gas flow ($I_s=J_s \times A_{sub}$)

It is essential to know the basic plasma characteristics to how modifications to the plasma conditions effected film growth. Before any of the Lipon films were synthesized, a voltage vs. current response for the hollow cathode plasma was measured using an ammeter and a power supply, FIG. 6. In order to measure the plasma current by controlling voltage, a 2×2 cm² stainless steel probe was used. A boron nitride sheet covered the backside of the stainless steel to block the plasma current flow. The hollow cathode plasma generated a floating potential ($V_f$), around −11.0 V, where the ion current was equal to an electron current in a substrate. Using a similar hollow cathode plasma activation, Schiller et al. have measured a floating potential of −10.0V [Ref. 47], which was quite similar to that measured here. As shown in FIG. 6, application of a substrate bias greater than −11.0V, attracted more electrons into a substrate than positive ions and created an electron retardation region. On the other hand, a substrate bias more negative than −11.0V attracted more positive ions into a substrate than electrons and created an ion saturation region.

When only the electron retardation region is considered, the electron current exponentially increases with substrate bias and the slope of the exponential region provides the electron temperature. In the electron retardation region, the electron current density, $J_e$, is defined by [Ref. 48]:

$$J_e = \frac{1}{4} \cdot e \cdot n_{es} \cdot \bar{v}_e \cdot e^{\frac{V_s - V_p}{T_e}}, \quad (8)$$

where
$n_{es}$=Electron density at plasma sheath edge (cm⁻³)
$\bar{v}_e$=Average electron velocity, $(8eT_e/\pi m_e)^{1/2}$
$V_s$=Substrate bias (V)
$V_p$=Plasma potential (V), and
$T_e$=Electron temperature (V).

Taking logarithms of equation (8) gives:

$$\ln J_e = \ln\left(\frac{1}{4} \cdot e \cdot n_{es} \cdot \bar{v}_e\right) + \frac{V_s}{T_e} - \frac{V_p}{T_e}. \quad (9)$$

Equation (8) can be simply be represented as:

$$\ln J_e = \frac{V_s}{T_e} + C, \quad (10)$$

where $$C = \ln\left(\frac{1}{4} \cdot e \cdot n_{es} \cdot \bar{v}_e\right) - \frac{V_p}{T_e}.$$

Likewise, if a substrate current density is logarithmically plotted and fitted by a linear expression, the slope provides $1/T_e$. The data in FIG. 6 exhibits two regions with different slopes in the electron retardation region with fitted slopes giving $1/T_e$ values of ~0.192 and ~0.066. These correspond to electron energies generated by the hollow cathode plasma of around 5.2 eV and 15.2 eV. Hollow cathode plasmas consist of a Maxwellian distribution of isotropic electrons with a superimposed group of directed electrons (the so-called low-voltage electron beam (LVEB)). Klagge et al. have measured the electron energy of their hollow cathode plasma [Ref. 49]. Their electron energy distribution was in the 0.0-25.0 eV range. The peaks of the two electron energy distributions corresponding to the Maxwellian and LVEB components were found in around 3.5 eV and 11.0 eV which are similar to the electron energies measured here.

During vapor atom transport through the plasma in a PA-DVD deposition approach, both elastic and inelastic collisions occur between electrons and vapor atoms. If we assume that the vapor atoms are stationary with respect to moving electrons and consider only elastic binary collisions, the ratio of the kinetic energy of the vapor atoms ($E_a$) and electrons ($E_e$) is given by [Ref. 50]:

$$\frac{E_a}{E_e} = \frac{\frac{1}{2}M_a v_a^2}{\frac{1}{2}M_e v_e^2} = \frac{4M_e \cdot M_a}{(M_e + M_a)^2}\cos^2\theta, \quad (11)$$

where $M_a$ is a mass of vapor atoms, $M_e$ is electron mass (9.1×10⁻³¹ kg), $v_a$ is the vapor atom's velocity (m/s), $v_e$ is the electron velocity (m/s), and θ is a collision angle between electron and vapor atoms. Because $M_a \gg M_e$, equation (11) approximately becomes:

$$\frac{E_a}{E_e} \approx \frac{4M_e}{M_a}\cos^2\theta = \frac{4M_e}{M_a}, \text{ (for } \cos\theta = 1\text{)}. \quad (12)$$

Thus, because the $M_e/M_a$ mass ratio is usually very small, elastic electron impacts do not transfer significant kinetic energy to the vapor atoms.

If inelastic collisions occur between a moving electron and a vapor atom, the total energy before and after the collision is conserved but the internal energy, U, of vapor atoms changes. If the maximum fraction of kinetic energy transferred is considered, the internal energy change is given by [Ref. 50]:

$$\frac{\Delta U}{E_e} = \frac{\Delta U}{0.5 M_e v_e^2} = \frac{M_a}{M_e + M_a}\cos^2\theta, \quad (13)$$

where ΔU is internal energy change (eV), $M_a$ is a vapor atom's mass (kg), $M_e$ is electron mass (9.1×10⁻³¹ kg), $v_e$ is electron velocity (m/s), and θ is a collision angle between electron and vapor atoms. Also, because $M_a \gg M_e$, the equation (13) approximately becomes:

$$\frac{\Delta U}{E_e} \approx \cos^2\theta = 1, \text{ (if } \cos\theta = 1\text{)}. \quad (14)$$

During an inelastic collision, electrons can virtually transfer all their kinetic energy to the vapor atoms. Thus, in the PA-DVD approach, the electrons generated by the hollow cathode can transfer high energy into vapor atoms. Since they have strong energy peaks at around 5.21 eV and 15.18 eV, their impact is sufficient to dissociate and ionize $N_2$ (molecular dissociation energy: ~9.8 eV and ionization energy: 14.534 eV).

Figure 7:
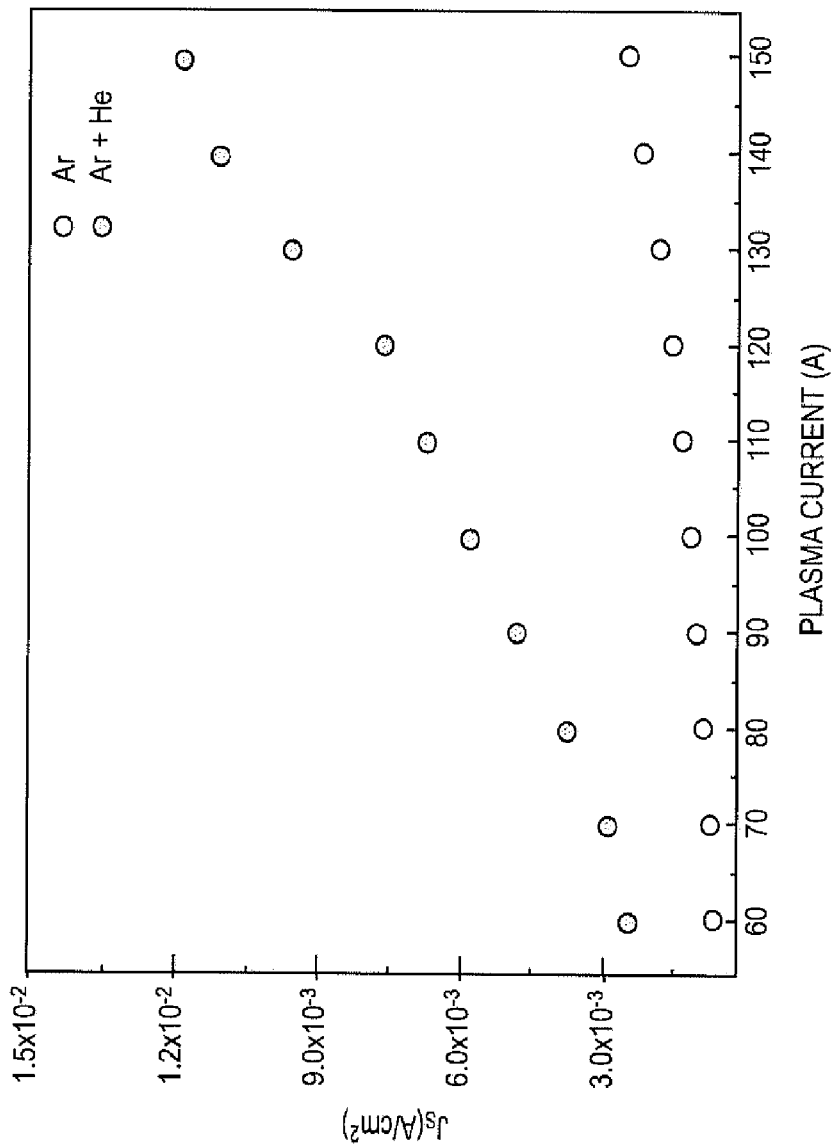
FIG. 7: shows the substrate ion current density ($J_s$) as a function of plasma current ($I_{HC}$)

In order to measure a substrate ion current density (4), a substrate bias of −20 V was applied and the $J_s$ was monitored by ammeter along the plasma current of 60-150 A range, FIG. 7. When argon only was used, $J_s$ slowly increased as the plasma current increased. On the other hand, when argon was used as the plasma working gas and helium carrier gas was introduced through the nozzle of the source rod, $J_s$ initially increased much more rapidly up to ~12 $mA/cm^2$. This increased substrate ion current density indicates that the degree of ionization increased with the plasma current.

Results and Discussion

1. DVD Film Growth without Plasma Assistance

Figure 8:
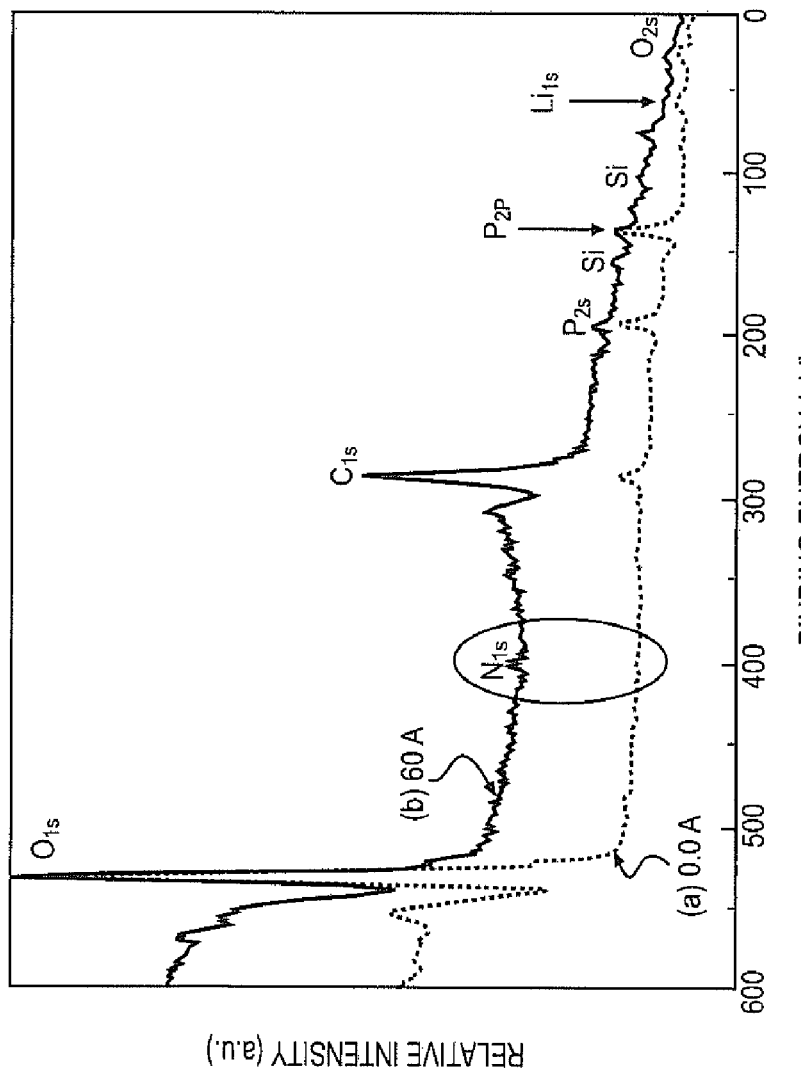
FIG. 8: shows XPS spectra of lithium phosphate synthesized by the DVD method. Curve (a) corresponds to a sample synthesized without plasma assistance. The sample marked (b) utilized plasma assistance with a plasma current of 60 A.

The first series of experiments were conducted without plasma assistance. XPS measurements indicated that films grown from a $Li_3PO_4$ source using a He+$N_2$ gas jet without plasma assistance did not contain nitrogen, FIG. 8 (a). This indicates that the nitrogen is unable to react with the $Li_3PO_4$ vapor during either vapor transport or condensation upon the substrate. The XRD measurements indicate that the $Li_3PO_4$ films grown without plasma assistance were amorphous, FIG. 9. FIG. 10 shows surface and cross-sectional images of one of the $Li_3PO_4$ film deposited on a (100) Si substrate. Extensive networks of connected (mud) cracks and isolated pores were present on the film surface. The mud cracks extended through the entire film thickness. The films contained a high volume fraction of isolated pores and were typical of refractory materials deposited by the DVD method under low vacuum pressure conditions [Ref. 51]. It arises from flux shadowing under severely restricted surface atom mobility conditions [Ref. 27, 31].

2. Plasma-Assisted Film Growth 2.1. Composition

Figure 11:
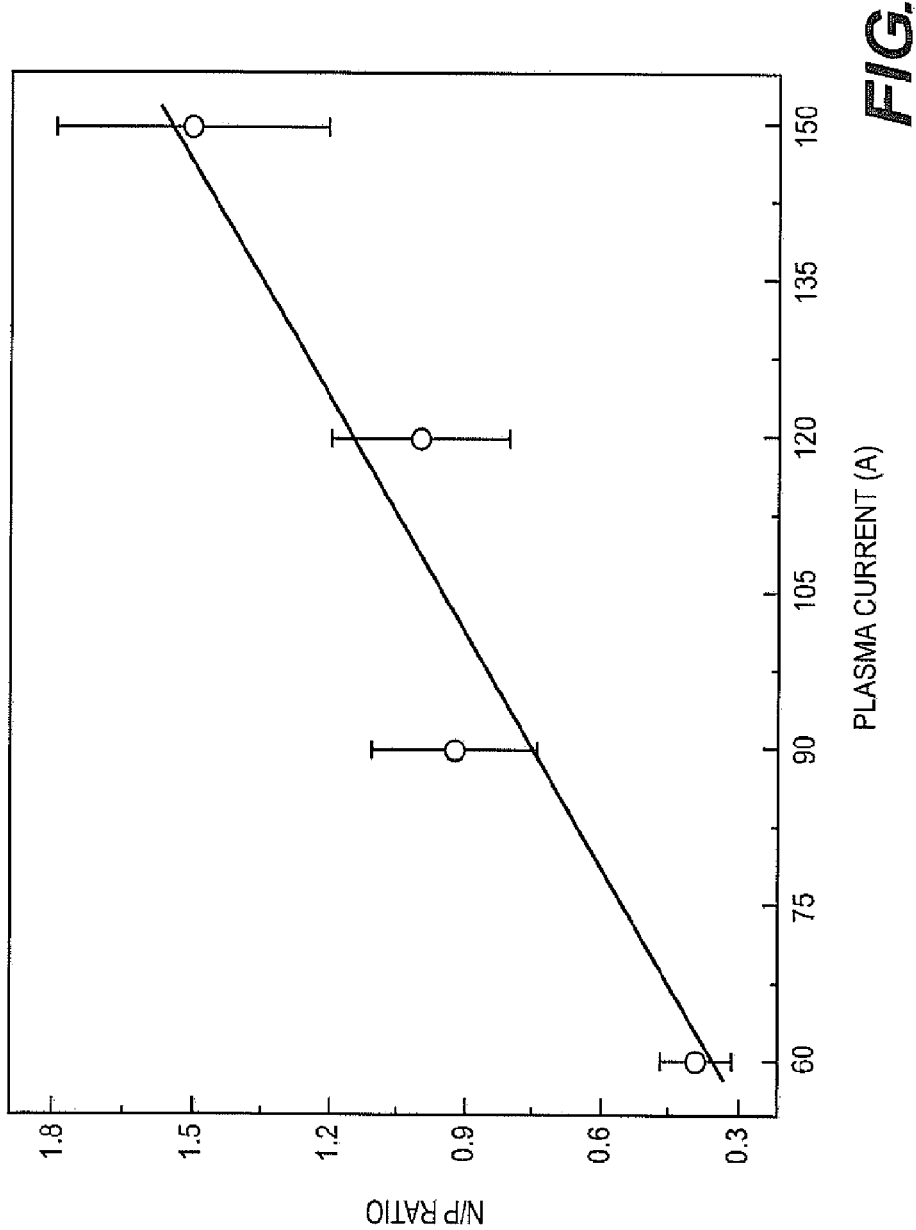
FIG. 11: shows the N/P ratio of Lipon films as determined by XPS.
Figure 12:
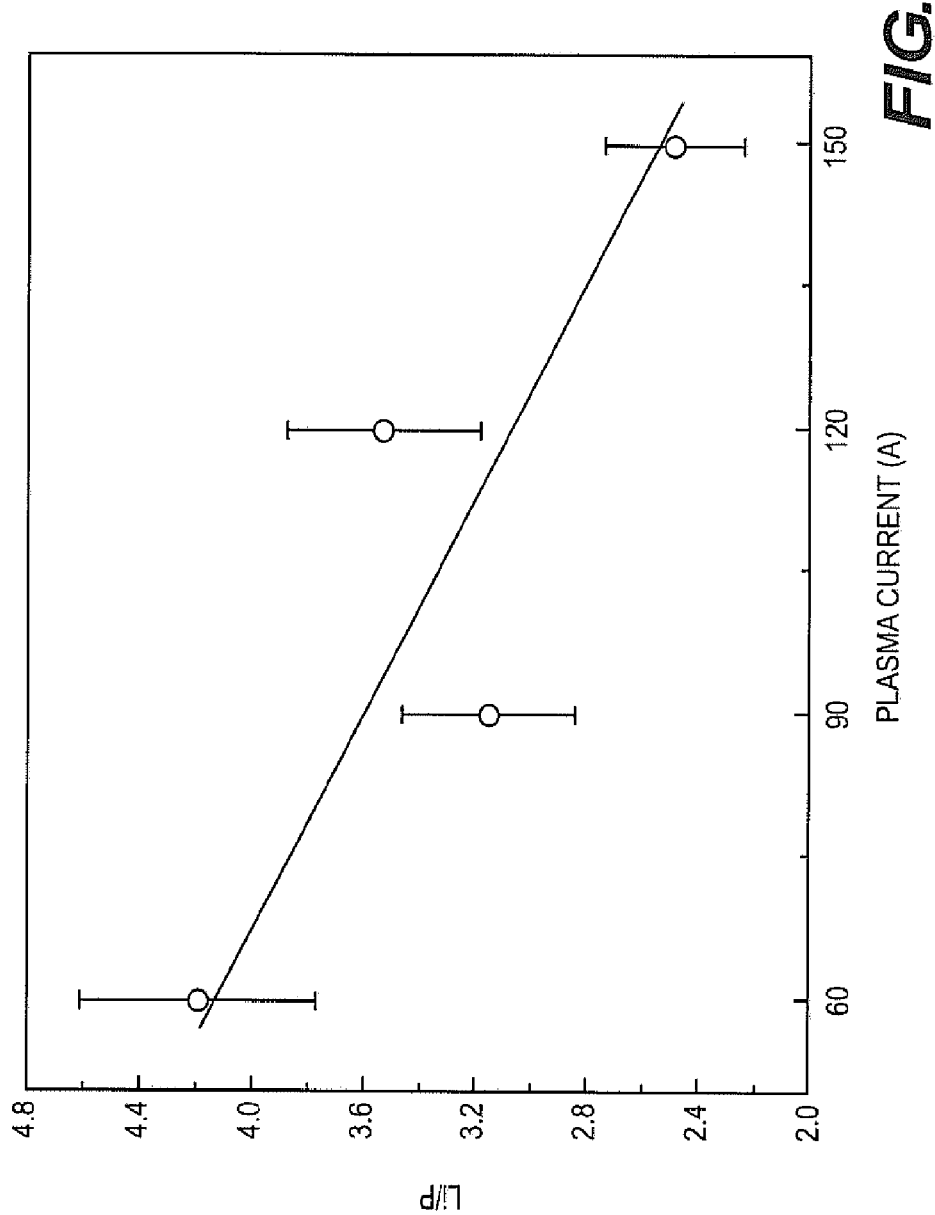
FIG. 12: shows the Li/P ratio of Lipon films measured by ICP-OES.
Figure 14B:
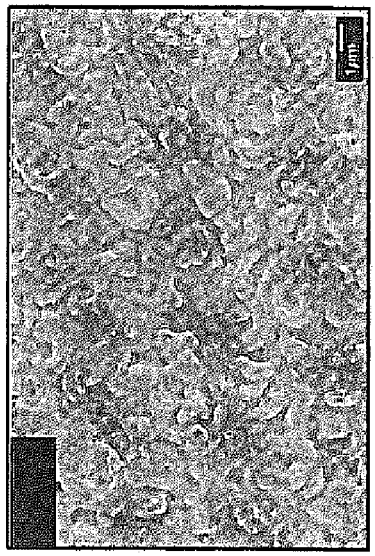
FIG. 14: shows surface morphologies of Lipon films deposited using a plasma current of (a) 60 A, (b) 90 A, (c) 120 A, and (d) 150 A.
Figure 14D:
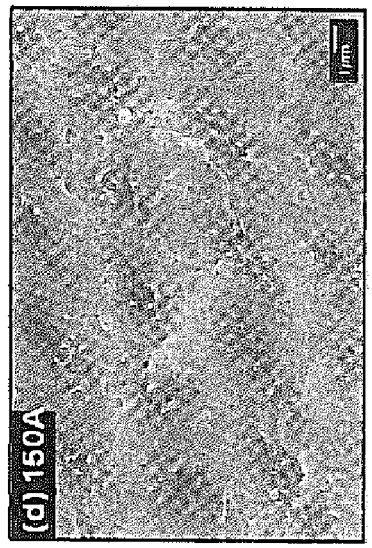
Figure 14A:
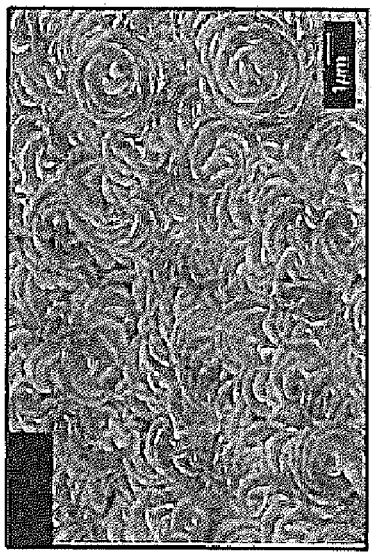
Figure 14C:
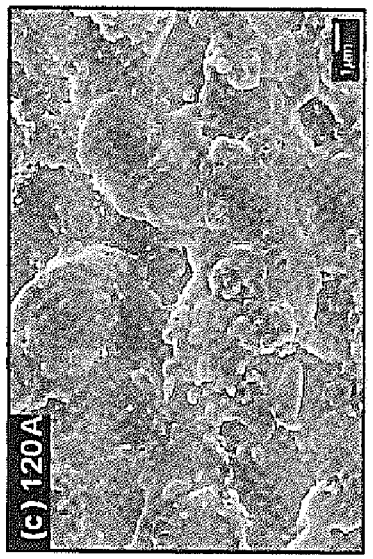
Figure 15B:
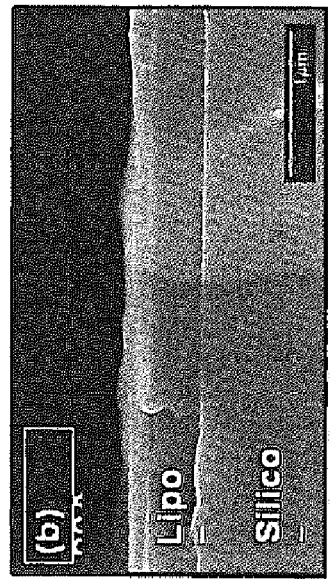
FIG. 15: shows cross-sectional SEM images of Lipon films deposited using a plasma current of (a) 60 A, (b) 90 A, (c) 120 A, and (d) 150 A.
Figure 15D:
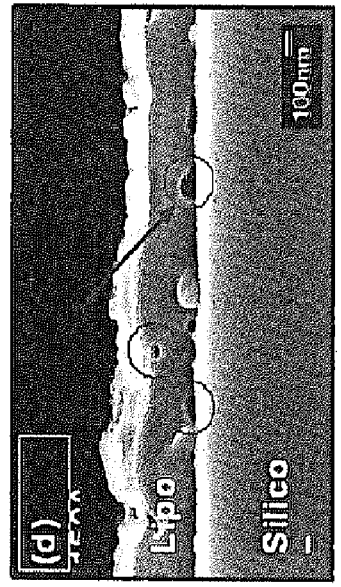
Figure 15A:
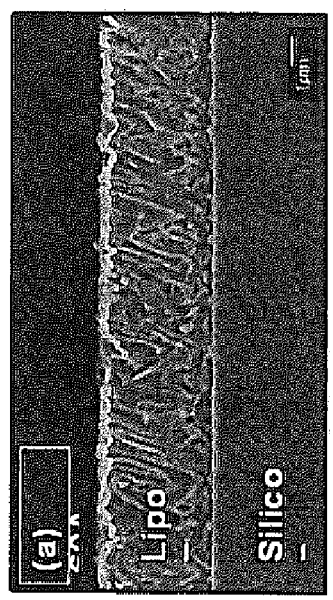
Figure 15C:
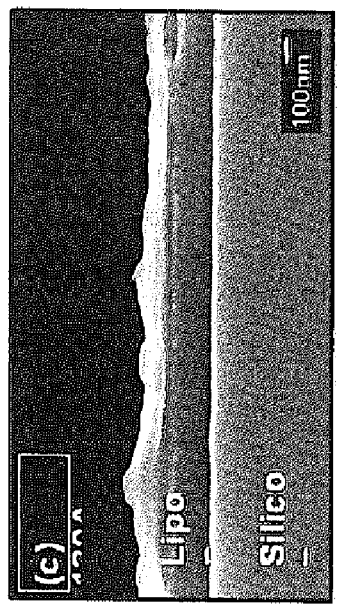

The use of plasma assistance during the deposition of $Li_3PO_4$ resulted in the incorporation of nitrogen. Evidence of this can be seen the appearance of a $N_{1s}$ peak at ~400.0 eV in the XPS spectrum shown in FIG. 8 (b). The N/P ratio measured by XPS for the Lipon films increased linearly with the plasma current, FIG. 11. The Li/P ratio of these Lipon films decreased with increase of the plasma current, FIG. 12. As shown in FIG. 13, if the triply and doubly coordinated nitrogen atoms are locally incorporated, they can form a material with a composition of either $Li_2PO_3N_{0.33}$ or $Li_{2.5}PO_3N_{0.5}$. In both cases, nitrogen incorporation would then result in lithium deficiencies in Lipon films. Previously, Rohrbach et al. indicated that the increase of plasma current increases electron density and increases the electron energy [Ref. 52]. As shown in equation (14), the increased electron energy increases ion energy by inelastic collisions. Since the argon gas jet has higher energy with the increase of plasma current and its direction is perpendicular to the direction of $Li_3PO_4$ vapor plume, the lithium deficiencies might also be enhanced by the argon gas jet scattering of (light) Li atoms from $Li_3PO_4$ vapor plume.

2.2. Morphology

FIG. 14 shows the surface morphology of films prepared by the PA-DVD approach. The Lipon films deposited using plasma assistance did not form mud cracks. These cracks are often associated with differential thermal contraction of the film and substrate. It therefore usually increases with substrate temperature. This was much higher (195±15° C.) during the plasma assisted depositions and so the disappearance of the cracks is either a result of a much stronger interfacial bond strength or an effect of the increased ion energy whose impact with the film can reduce intrinsic stresses [Ref. 53].

Increasing the plasma current also significantly modified the surface morphology of the Lipon films, FIG. 14. When a plasma current of 60 A was used, the surface of the Lipon films was composed of intersecting features with a rose like spiral pattern, FIG. 14 (a). Occasional pores were also present near intersections of these features. When the plasma current was increased to 90 A, the Lipon film became denser and smoother. The use of plasma currents of 120 and 150 A resulted in a smooth film with no evidence of surface voids.

Compared to the $Li_3PO_4$ film, the Lipon films grown using plasma assistance had dense film structures, FIG. 15. At the plasma current of 60 A, the Lipon film had a dense columnar structure. Further increases of plasma currents resulted in columnar-free, dense Lipon films. Recall that FIG. 7 showed that the increase of plasma current increased the probability of vapor and working gas ionization. It also increased their kinetic and internal energies. The resulting densification of the film is then a consequence of atomic reassembly on the growth surface which increased with plasma current. When the plasma current was increased to 150 A, some pores were present at the interface between the substrate and the Lipon film. These pores are highly undesirable since they can facilitate electrical shorting of a thin-film battery during recharging.

2.2. Structure

Figure 9:
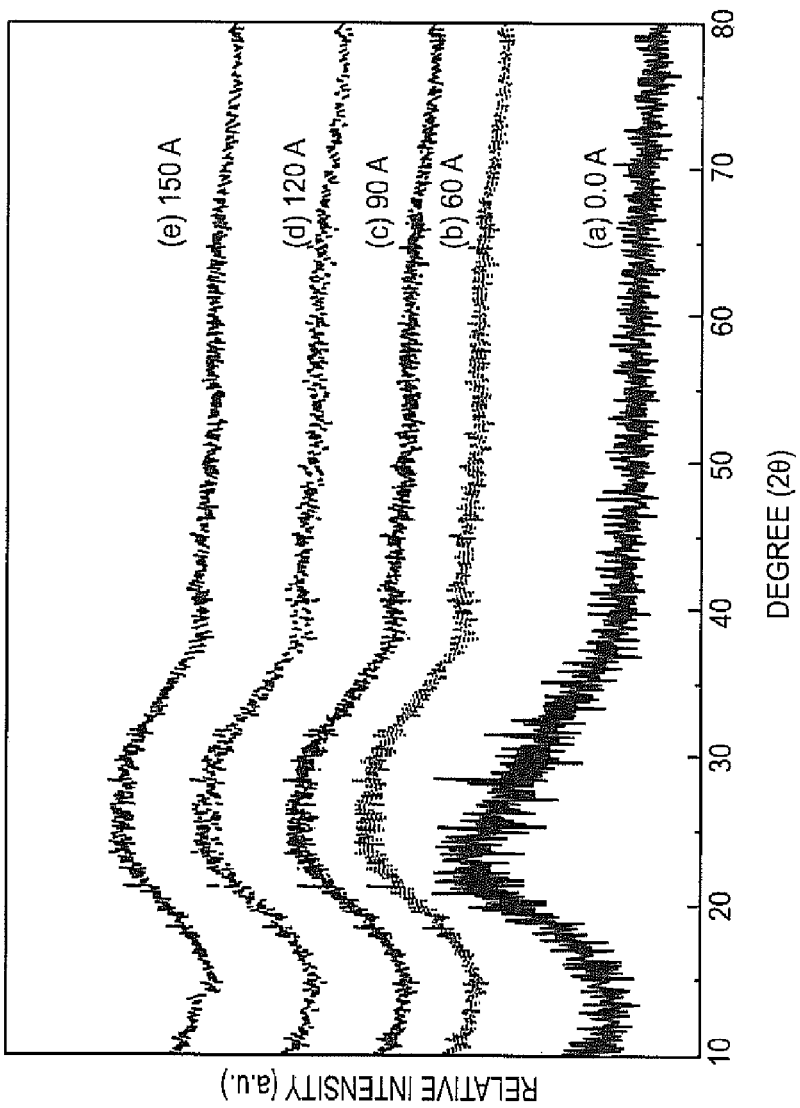
FIG. 9: shows X-ray diffraction (XRD) patterns of Lipon films synthesized using a plasma current of (a) 0.0 A (no plasma assistance), (b) 60 A, (c) 90 A, (d) 120 A, and (e) 150 A.
Figure 10A:
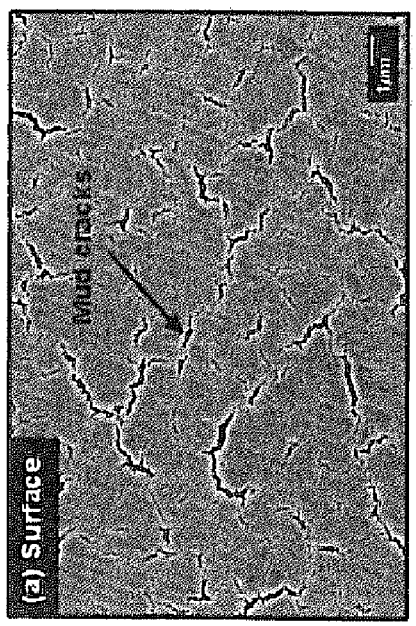
FIG. 10: shows the surface and cross-section of a $Li_3PO_4$ film deposited without the plasma activation.
Figure 10B:
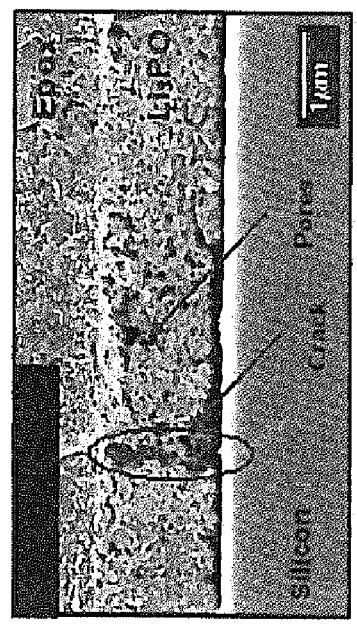

The XRD patterns of films grown with the plasma assistance contained broad peaks, FIG. 9. They are indicative of films that were amorphous. This is beneficial to thin film battery application because the ionic conductivity of amorphous films is generally more isotropic and higher than that of single crystal or textured polycrystalline films [Ref. 6].

Figure 16:
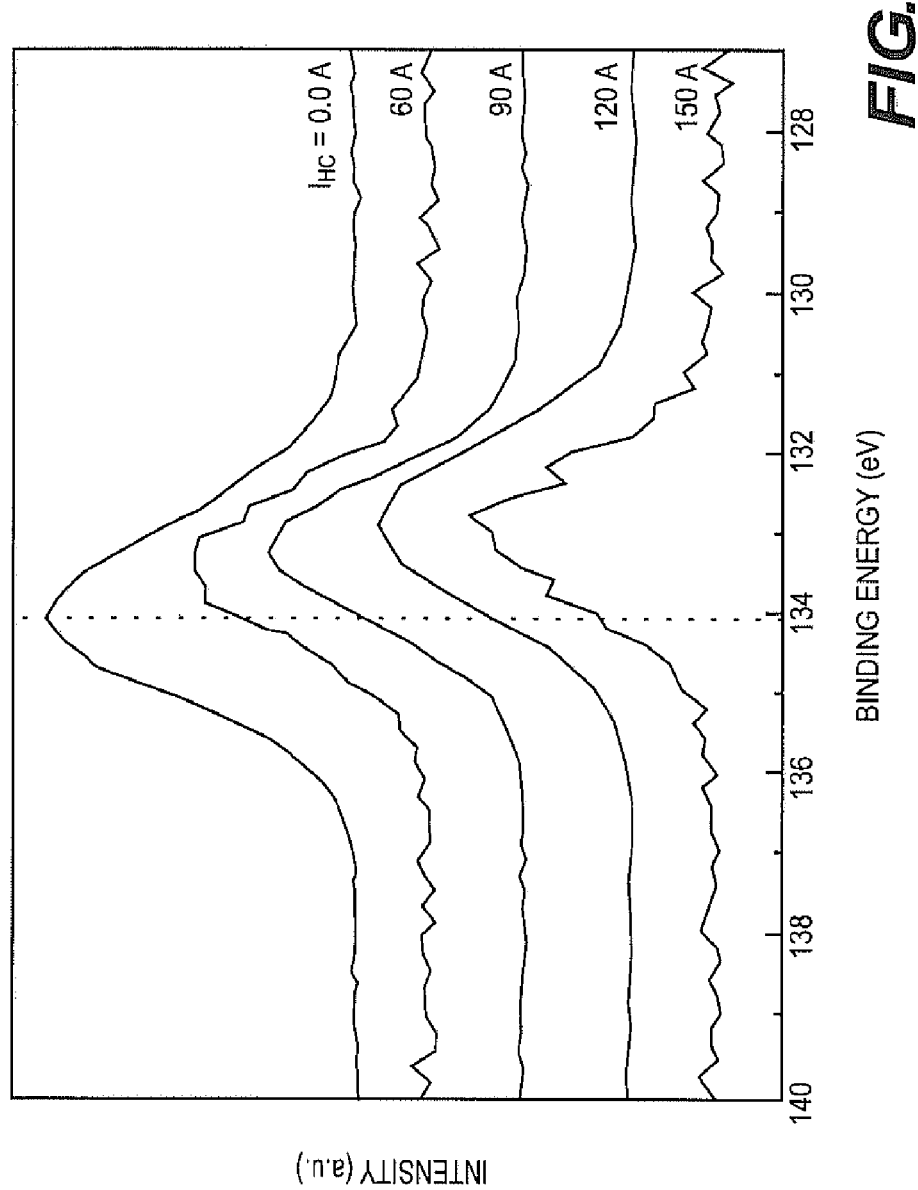
FIG. 16: shows P2p XPS peak shifts of the Lipon films with the plasma current (IHC)
Figure 17:
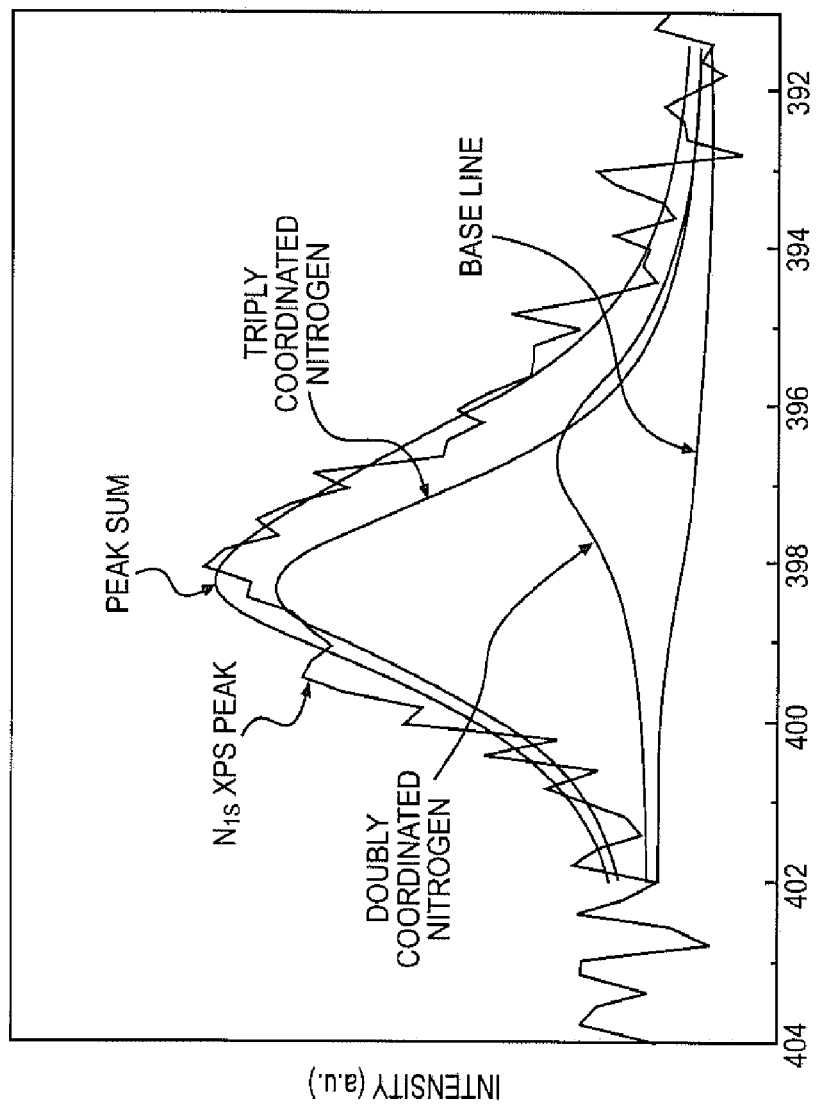
FIG. 17: shows deconvolution of $N_{1s}$ XPS peak of the Lipon film prepared at a plasma current, $I_{HC}$=60 A.

The XPS spectra were measured and used to investigate how nitrogen was incorporated into the Lipon films. FIG. 16 shows that the $P_{2p}$ XPS peaks of Lipon films were shifted down in energy from 134.5 to 132.8 eV as the plasma current was increased. Simple charged-shell models indicate that this binding energy chemical shift is approximately proportional to the change in charge of the ions in the solid [Ref. 54,55]. In this model, the binding energy chemical shift, $\Delta E_i$ is simply given by [Ref. 55]:

$$\Delta E_i = k \cdot \Delta q_i \tag{15}$$

where $\Delta q_i$ is the change of the i-th atom's charge and k is a proportionality constant. Brow et al. have explored the XPS spectra of silicon oxynitride thin films and found that nitrogen incorporation results in a binding energy chemical shift for the silicon ion [Ref. 55]. Brow et al. also investigated sodium phosphorous nitride glasses, $NaPO_xN_y$, and found that the $P_{2p}$ XPS peaks were shifted from 134.8 eV to 133.9 eV with increase in nitrogen concentration [Ref. 56]. They attributed the $P_{2p}$ chemical shift to the replacement of P—O bonds by P—N bonds which change the charge distribution around phosphorous in their films. The same effect is believed to be responsible for the shift seen in the Lipon films here.

Previously, Veprek et al. have conducted XPS measurements of amorphous phosphorous nitrides and suggested that nitrogen was incorporated in both a doubly and triply coordinated state [Ref. 57]. Wang et al. investigated nitrided bulk $Li_3PO_4$ materials [Ref. 58]. They also find strong evidence that two types of nitrogen bonds were incorporated into $Li_3PO_4$ as shown FIG. 12. FIG. 16 indicates that the nitrogen $N_{1s}$ XPS peak can be decomposed into two peaks: one corresponds to triply coordinated nitrogen (—N=) with number density $N_t$, and one for the doubly coordinated nitrogen (—N<) with a number density $N_d$. We observed that the average binding energy of the triply coordinated form was ~397.28 eV while that of the doubly coordinated structure was ~398.52 eV. These results agree well with the binding energies observed by Veprek et al. [Ref. 57].

Table 5 shows the $N_t/N_d$ ratio deduced from each of the films grown using plasma assistance. Increasing the plasma current reduced the $N_t/N_d$ ratio, and was correlated with an increase of the N/P ratio of the films. It also should be noted that because the effective ionic radius of $N^{3-}$ (1.32 Å) is larger than that of $O^{2-}$ (1.24 Å), nitrogen substitution for oxygen is likely to induce a structural distortion of $Li_3PO_4$. Bates et al. suggest that increasing the triply bonded nitrogen concentration results in a higher Li-ion conductivity in Lipon films because these triply coordinated nitrogen atoms induce larger structural distortions compared with the doubly coordinated nitrogen atoms [Ref. 59]. In their experiments, nitrogen incorporation into $Li_3PO_4$ increased the Li-ion conductivity into the $\sim10^{-6}$ S/cm range and enhanced Lipon stability when in contact with Li [Ref. 19, 59]. These factors resulted in significant cyclic life extension (>10,000 discharge cycles) for their rechargeable thin-film lithium batteries [Ref. 60]. Table 5 shows the ratio of triply to doubly coordinated nitrogen binding in Lipon films for the various plasma currents used during PA-DVD growth. The N/P ratio of the films is also shown.

TABLE 5

| | Plasma current, $I_{HC}$ (A) | | | |
|---|---|---|---|---|
| | 60 | 90 | 120 | 150 |
| $N_t/N_d$ | 1.65 | 1.57 | 0.73 | 0.72 |
| N/P | 0.39 | 0.92 | 0.99 | 1.49 |

The PA-DVD approach described above resulted in Lipon films with a N/P ratio of 0.39-1.49. Yu et al. achieved a N/P ratio of 0.16-0.46 by a RF-magnetron sputtering [Ref. 19]. Dudney et al. used a co-sputtering technique with $Li_3PO_4$ and $Li_3N$ targets and achieved a high N/P ratio of 1.2 [Ref. 61]. Choi et al. also conducted reactive RF-magnetron sputtering of a $Li_3PO_4$ target under a pure $N_2$ atmosphere and achieved a N/P ratio of 0.4-1.25 [Ref. 62]. More recently, Harmon et al. were able to achieve a N/P ratio of 0.7-1.4 by a RF-magnetron sputtering [Ref. 63]. The PA-DVD approach therefore appears capable of achieving nitrogen concentrations in Lipon films that are similar to these present in RF sputtered material.

2.4. Li-Ion Conductivity

Figure 18B:
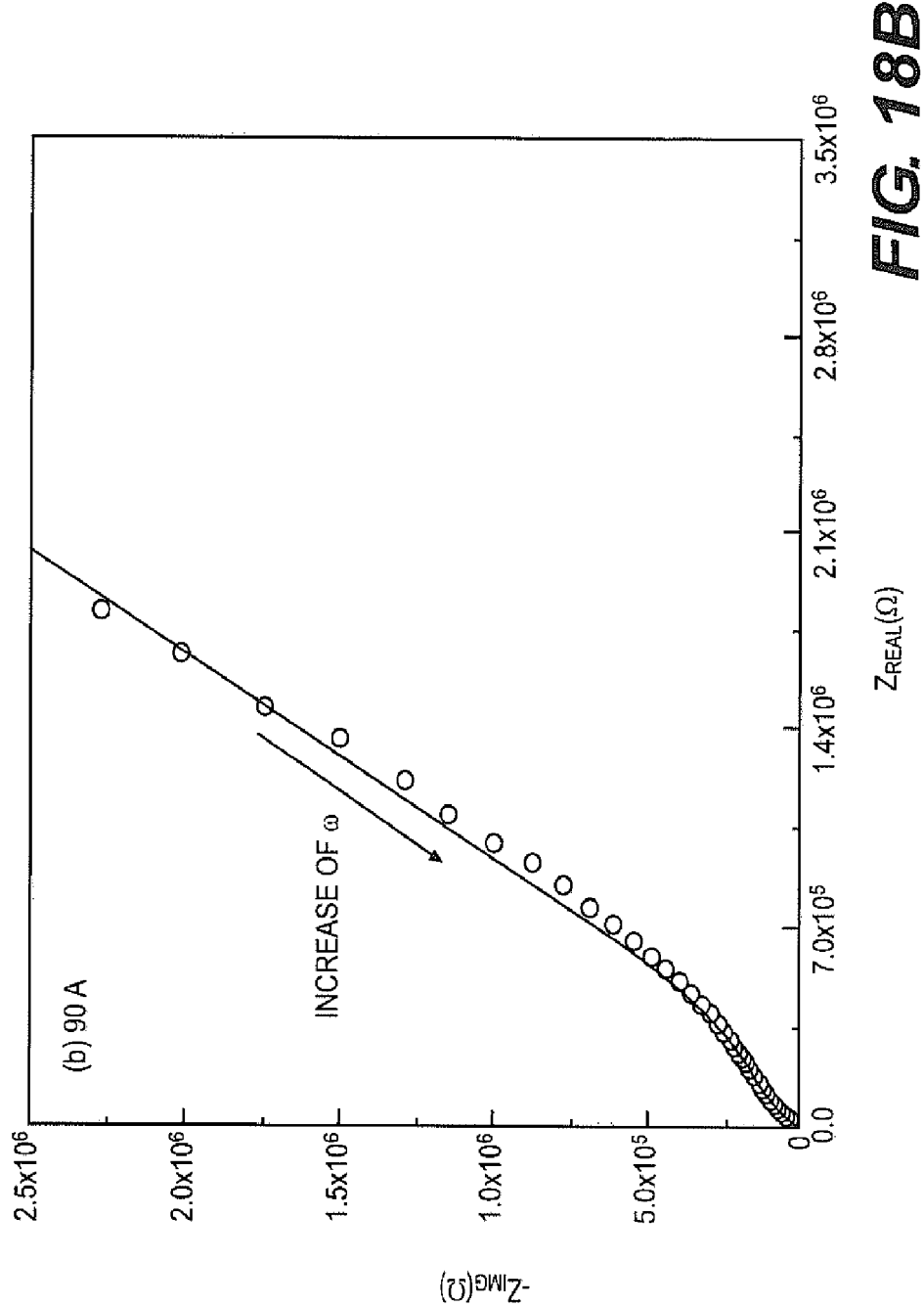
FIG. 18 (a)-(c): show electrochemical impedance spectroscopy (EIS) data for Lipon films prepared using a plasma currents of (a) 60 A, (b) 90 A, and (c) 120 A.

The Li-ion conductivity of the Lipon films has been deduced from electrochemical impedance spectroscopy (EIS) measurements. FIG. 18 shows the EIS spectra for three of the Lipon films prepared by the PA-DVD approach. Table 5 shows the fitting parameters of the EIS spectra used to calculate the Li-ion conductivities via the equation (5) and (7). These conductivities are shown in Table 6. The Li-ion conductivities of the Lipon films synthesized by the PA-DVD approach were in the $10^{-7}$-$10^{-8}$ S/cm range, which is comparable to the values reported for films grown by the e-beam evaporation technique [Ref. 24]. However, they were lower than those of Lipon films prepared by the RF-magnetron sputtering [Ref. 19, 59, 62].

Choi et al. reported that Li-ion conductivity had the highest value of $\sigma_{ionic}=1.67\times10^{-6}$ S/cm for high nitrogen Lipon films with a composition near $Li_{2.971}PO_{1.875}N_{1.250}$ [Ref. 62]. However, Bates et al. reported that a Li-ion conductivity of their Lipon films was highest ($3.3\times10^{-6}$ S/cm) with a moderate nitrogen incorporation corresponding to an overall composition near $Li_{2.9}PO_{3.3}N_{0.46}$ [Ref. 19, 59]. Hamon et al. have argued that the Li-ion conductivity of Lipon films depends on deposition parameters and deposition process equipment [Ref. 63]. This may be connected to variations in the fraction of doubly and coordinated nitrogen in the forms. The experimental relationship between the nitrogen incorporation and the Li-ion conductivity has yet to be fully resolved in part because of the difficulty of precisely determining the composition and the coordination state. The work reported here indicates that the Li-ion conductivity achieved by the PA-DVD approach decreased with increase of the plasma current even though the N/P ratio increased. This may have been a result of lithium losses in the Lipon films which also increased with plasma current, FIG. 12.

Motivated by rechargeable thin-film battery applications, Park et al. synthesized Lipon films by the reactive RF-magnetron sputtering and obtained Li-ion conductivities of $9.1\times10^{-7}$-$7.2\times10^{-9}$ S/cm range [Ref. 64]. Using films with these different Li-ion conductivities, they fabricated rechargeable thin-film lithium batteries. The Lipon films that had Li-ion conductivities of $9.1\times10^{-7}$ S/cm showed good charge-discharge properties required for rechargeable thin-film lithium batteries. The Lipon films that had Li-ion conductivities of $1.2\times10^{-8}$ S/cm also showed acceptable charge-discharge properties. However, the use of Lipon films with Li-ion conductivities of $7.2\times10^{-9}$ S/cm, resulted in rechargeable thin-film lithium batteries that suffered serious capacity losses. In the work reported here, Lipon films synthesized by the PA-DVD approach had Li-ion conductivities between $10^{-7}$ and $10^{-8}$ S/cm and therefore appear well suited for applications as the electrolyte of rechargeable thin-film lithium batteries. Because of its high deposition rate capability, the PA-DVD approach might also potentially provide an economical deposition route for synthesizing Lipon films.

Table 56 shows fitting parameters used to calculate Li-ion conductivities of the Lipon films prepared on stainless steal or gold coated silicon substrates. Here, subscript letters are represented by: hf=high frequency, el=electrolyte, and dl=double layer.

TABLE 6

| | Plasma current (A) | | |
|---|---|---|---|
| | 60 | 90 | 120 |
| $R_{hf}(\Omega)$ | 900 | 600 | 300 |
| $n_{el}$ | 0.76 | 0.7 | 0.5 |
| $Z_{el}(\Omega)$ | $3.7\times10^3$ | $2.5\times10^5$ | $3.0\times10^5$ |
| $C_g$ (F) | $3.8\times10^{-9}$ | $8.3\times10^{-9}$ | $1.1\times10^{-9}$ |
| $n_{dl}$ | 0.87 | 0.62 | 0.3 |
| $C_{dl}$ (F) | $2.5\times10^{-8}$ | $3.0\times10^{-7}$ | $9.\times10^{-6}$ |

Table 7 shows Li-ion conductivities of the Lipon films. Note that the thickness of the Lipon layers was measured by a thickness profiler meter.

TABLE 7

| Plasma current (A) | $\sigma_{ionic}$ (S/cm) |
|---|---|
| 60 | $5.24\times10^{-7}$ |
| 90 | $1.22\times10^{-8}$ |
| 120 | $1.07\times10^{-8}$ |

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

The following patents, applications and publications as listed below and throughout this document are hereby incorporated by reference in their entirety herein.

1. J. M. Tarascon and M. Armand, *Nature* 414 (2001) 359-367.
2. J. B. Bates, N. J. Dudney, B. Nuedecker, A. Ueda and C. D. Evans, *Solid State Ionics* 135 (2000) 33-45.
3. J. B. Bates, N. J. Dudney, D. C. Lubben, G. R. Gruzalski, B. S. Kwak, Xiaohua Yu and R. A. Zuhr, *J. Power Sources* 54 (1995) 58-62.
4. B. J. Neudecker, N. J. Dudney, and J. B. Bates, *J. Electrochem. Soc.* 147 (2000) 517-523.
5. D. Linden and T. B. Reddy, *Handbook of Batteries* (3rd), McGraw-Hill (2002).
6. Peter G. Bruce, *Solid State Electrochemistry*, Cambridge University Press (1997).
7. S. O. Kasap, *Principles of Electrical Engineering Materials and Devices*, McGraw-Hill (1997).
8. Michel Duclot and Jean-Louis Souquet, *J. Power Sources* 97-98 (2001) 610-615.
9. Gholam-Abbas Nazri and Gianfranco Pistoia, *Lithium batteries science and technology*, Chapter 20, Kluwer Academic Publishers (2004).
10. R. Mercier, J. P. Malugani, B. Fahys, and A. Saida, *Solid State Ionics* 5 (1981) 663.
11. J. H. Kennedy and Y. Yang, *J. Electrochem. Soc.* 133 (1986) 2437.
12. S. Kondo, K. Takada, and Y. Yamamoto, *Solid State Ionics* 53 (1992) 1183.
13. M. Ganguli, M. Harish Bhat, and K. J. Rao, *Solid State Ionics*, 122 (1999) 23-33.
14. Levasseur, J. C. Brethous, J. M. Reau, P. Hagenmuller, and M. Couzi, *Solid State Ionics* 1 (1980) 177.
15. M. D. Granguli, M. A. Machenzie, W. Muller, and M. Torge, *Solid State Ionics* 28-30 (1988) 677.
16. K. Jackowska and A. R. West, *J. Mater. Sci.* 18 (1983) 2380.
17. M. Tatsumisago, K. Yoneda, N. Machida, and T. Minami, *J. Non-Cryst. Solids.* 95/96 (1988) 857.
18. J. B. Bates, N. J. Dudney, G. R. Gruzalski, R. A. Zuhr, A. Choudhury, C. F. Luck, and J. D. Robertson, *Solid State Ionics* 53-56 (1992) 647.
19. Xiaohua Yu, J. B. Bates, G. E. Jellison and F. X. Hart, *J. Electrochem. Soc.*, 144 (1997) 524.
20. N. J. Dudney, J. B. Bates, and J. D. Robertson, *J. Vac. Sci. Technol.* A11 (1993) 377.
21. J. B. Bates and Xiaohus Yu, *J. Vac. Sci. Technol. A* 14(1) (1996) 34.
22. Shengli Zhao, Zhengwen Fu, and Qizong Qin, *Thin Solid Films* 415 (2002) 108-113.
23. Fernado Vereda, Ronald B. Goldner, Terry E. Hass and Peter Zerigian, *Electrochem. Solid-State Lett.* 5 (2002) A239-A241.
24. Wen-Yuan Liu, Zheng-Wen Fu, Chi-Lin Li, and Qi-Zong Qin, *Electrochem. Solid-State Lett.* 7(9) (2004) J36-J40.
25. G. P. Lamaze, H. H. Chen-Mayer, D. A. Becker, F. Vereda, R. B. Goldner, T. Hass, and P. Zerigian, *J. Power Sources* 119-121 (2003) 680-685.
26. J. B. Bates, G. R. Gruzalski, N. J. Dudney, C. F. Luck, and Xiaohua Yu, *Solid State Ionics* 70/71 (1994) 619-628.
27. J. F. Groves, *Directed Vapor Deposition*, University of Virginia, Ph.D. Dissertation, 1998.
28. J. F. Groves, Y. Marciano, D. D. Hass, G. Mattausch, H. Morgner, H. N. G. Wadley, *Society of Vacuum Coaters* 44th Annual Technical Conference Proceedings, (2001) 99-104.
29. Derek D. Hass, *Thermal Barrier Coatings via Directed Vapor Deposition*, University of Virginia, Ph.D. Dissertation, 2001.
30. H. Morgner, M. Neumann, S. Straach and M. Krug, *Surf. Coat. Technol.* 108-109 (1998) 513-519.
31. J. A. Thornton, *J. Vac. Sci. Technol.* 12 (1975) 830-835.
32. J. J. Quan, X. W. Zhou and H. N. G. Wadley, *Surf. Sci.* 600 (2006) 2275-2287.
33. J. J. Quan, X. W. Zhou and H. N. G. Wadley, *Surf. Sci.* (2006), doi:10.1016/j.susc.2006.07.022.
34. J. C. S. Kools, *J. Vac. Sci. Technol. A* 23 (2005) 85.
35. David M. Sanders, *J. Vac. Sci. Technol. A* 7(3) (1989) 2339.
36. J. Vyskoöil and J. Musil, *J. Vac. Sci. Technol. A* 10(4) (1992) 1740.
37. K. Goedicke, B. Scheffel and S. Schiller, *Surf. Coat. Technol.* 68/69 (1994) 799-803.
38. J. F. Groves, G. Mattausch, H. Morgner, D. D. Hass, and H. N. G. Wadley, *Surface Engineering* 16 (2000) 461-464.
39. S. Schiller, C. Metzner, and O. Zywitski, *Surf. Coat. Technol.* 125 (2000) 240-245.
40. S. Schiller, V. Kirchhoff, N. Schiller, and H. Morgner, *Surf. Coat. Technol.* 125 (2000) 354-360.
41. O. Zywitzki, K. Goedicke, and H. Morgner, *Surf. Coat. Technol.* 151-152 (2002) 14-20.
42. R. F. Bunshah, *Handbook of Deposition Technologies for films and coatings: Science, Applications and Technology*, 2nd ed, Park Ridge, Noyes, N.J., (1994).
43. J. Bohdansky, J. Roth and H. L. Bay, *J. Appl. Phy.* 51 (1980) 2861.
44. W. Eckstein, C. Garcia-Rosales, J. Roth and J. Laszlo. *Nucl. Instr. and Meth.* B83 (1993) 95.
45. C. D. Wagner, *Analytical Chemistry* 44 (1972) 1050-1053.
46. Evgenij Barsoukov and J. Ross Macdonald, *Impedance Spectroscopy*, 2nd ed, Wiley-Interscience (2005).
47. S. Schiller, G. Hoetzsch, M. Neumann, H. Morgner and O. Zywitzki, *Surf. Coat. Tech.* 68/69 (1994) 788-793.
48. Michael A. Lieberman and Allan J. Lichtenberg, *Principles of plasma discharges and materials processing*, 2nd ed, John Wiley & Sons, Inc. (1994).
49. S. Klagge and A. Lunk, *J. Appl. Phys.* 70 (1991) 99.
50. B. Chapman, "*Glow discharge processes: sputtering and plasma etching*", Wiley-Interscience (1980).
51. D. D. Hass, A. J. Slifka, and H. N. G. Wadley, *Acta Mater.* 49 (2001) 973-983.

52. G. Rohrbach and A. Lunk, *Surface and Coatings Technology* 123 (2000) 231-238.
53. J. A. Thornton and D. W. Hoffman, *Thin Solid Films* 171 (1989) 5-31.
54. U. Gelius, *Phys. Scr.* 9 (1974) 133-147.
55. B. K. Brow and Carlo G. Pantano, *J. Am. Ceram. Soc.* 69 (1986) 314-316.
56. B. K. Brow, M. R. Reidmeyer and D. E. Day, *J. Non-Cryst. Solids* 99 (1988) 178-189.
57. S. Veprek, S. Iqbal, J. Brunner and M. Scharli, *Philos. Mag.* 43 (1981) 527.
58. B. Wang, B. S. Kwak, B. C. Sales, and J. B. Bates, *J. Non-Cryst. Solids* 183 (1995) 297.
59. J. B. Bates, N. J. Dudney, G. R. Gruzalski, R. A. Zuhr, A. Choudhury, C. F. Luck, and J. D. Robertson, *J. Power. Sources* 43-44 (1993) 103-110.
60. B. Wang, J. B. Bates, F. X. Hart, B. C. Sales, R. A. Zuhr and J. D. Robertson, *J. Electrochem. Soc.* 143 (1996) 3203.
61. N. J. Dudney and M. L. Jenson, "*Properties of vacuum deposited thin films of lithium phosphorous oxynitride (Lipon) with an expanded composition range*," CRADA Final report (2003).
62. C. H. Choi, W. I. Cho, B. W. Cho, H. S. Kim, and Y. S. Yoon, *Electrochem. Solid-State Lett.* 5(1) (2002) A14-A17.
63. Y. Hamon. A. Douard, F. Sabary, C. Marcel, P Vinatier, B. Pecquenard, and A. Levasseur, *Solid State Ionics* 177 (2006) 257-261.
64. H. Y. Park, S. C. Nam, Y. C. Lim, K. G. Choi, K. C. Lee, G. B. Park, S. R. Lee, H. P. Kim and S. B. Cho, *J. Electroceram.* 17 (2006) 1023-1030.
65. James F. Shackelford and William Alexander, *Handbook of Materials Science and Engineering* (3rd ed.), CRC Press (2001).
66. L. Boukbir and R. Marchand, *Rev. Chim. Min.* 23 (1986) 343.
67. Raffaelle, R. P., Harris, J. D., Hehemann, D., Scheiman, D., Rybicki, G., and Hepp, A. F. (2000). *A facile route to thin-film solid state lithium microelectronic batteries.* Journal of Power Sources 89, 52-55.
68. Singh, D., Houriet, R., Giovannini, R., Hofmann, H., Craciun, V., and Singh, R. K. (2001). *Challenges in making of thin films for LixMnyO4 rechargeable lithium batteries for MEMS.* Journal of Power Sources 97-98, 826-831.
69. Jasinski, R. J. (1967). *High Energy Batteries* (New York: Plenium)
70. Mizushima, K., Jones, P. C., Wiseman, P. J., and Goodenough, J. B. (1980). LixCoO2 (0<x<-1): *A new cathode material for batteries of high energy density.* Materials Research Bulletin 15, 783-789.
71. Antaya, M., Dahn, J. R., Preston, J. S., Rossen, E., and Reimers, J. N. (1993). *Preparation and Characterization of LiCoO[sub 2] Thin Films by Laser Ablation Deposition.* Journal of The Electrochemical Society 140, 575-578.
72. Wang, B., Bates, J. B., Hart, F. X., Sales, B. C., Zuhr, R. A., and Robertson, J. D. (1996). *Characterization of Thin-Film Rechargeable Lithium Batteries with Lithium Cobalt Oxide Cathodes.* Journal of The Electrochemical Society 143, 3203-3213.
73. Fonseca, C. P., and Neves, S. (2004). *The usefulness of a LiMn2O4 composite as an active cathode material in lithium batteries.* Journal of Power Sources 135, 249-254.
74. Xia, Y., Zhou, Y., and Yoshio, M. (1997). *Capacity Fading on Cycling of 4 V Li/LiMn[sub 2]O[sub 4] Cells.* Journal of The Electrochemical Society 144, 2593-2600.
75. Whittingham, M. S. (2000). *Insertion electrodes as SMART materials: the first 25 years and future promises.* Solid State Ionics 134, 169-178.
76. Gummow, R. J., de Kock, A., and Thackeray, M. M. (1994). *Improved capacity retention in rechargeable 4 V lithium/lithium-manganese oxide (spinel) cells.* Solid State Ionics 69, 59-67.
77. Tarascon, J. M., and Guyomard, D. (1993). *The Li1+xMn2O4/C rocking-chair system: a review.* Electrochimica Acta 38, 1221-1231.
78. Gao, Y., and Dahn, J. R. (1996). *Synthesis and Characterization of Li1+xMn2-xO4 for Li-ion Battery Application.* Journal of the Electrochemical Society 143.
79. Yamada, A., Miura, K., Hinokuma, K., and Tananka, M. (1995). *Synthesis and Structural Aspects of LiM2O4±d as a Cathode for Rechargeable Lithium Batteries.* Journal of the Electrochemical Society 142, 2149.
80. Morcrette, M., Barboux, P., Perriere, J., Brousse, T., Traverse, A., and Boilot, J. P. (2001). *Non-stoichiometry in LiMn2O4 thin films by laser ablation.* Solid State Ionics 138, 213-219.
81. Chiu, K. F., Lin, N. C., Lin, K. M., and Tsai, C. H. (2005). *Modification of Sputter-Deposited Nanocrystalline Li[sub x]Mn[sub 2-y]O[sub 4] Thin-Film Cathodes by In Situ Substrate Bias and Postanneal.* Journal of The Electrochemical Society 152, A2058-A2062.
82. Shokoohi, F. K., Tarascon, J. M., Wilkens, B. J., Guyomard, D., and Chang, C. C. (1992). *Low Temperature LiMn2O4 Spinel films for Secondary Lithium batteries.* Journal of the Electrochemical Society 139, 1845.
83. Wang, C. L., Liao, Y. C., Hsu, F. C., Tai, N. H., and Wu, M. K. (2005). *Preparation and Characterization of Thin Film Li[sub 4]Ti[sub 5]O[sub 12] Electrodes by Magnetron Sputtering.* Journal of The Electrochemical Society 152, A653-A657.
84. Shui, J. L., Jiang, G. S., Xie, S., and Chen, C. H. (2004). *Thin films of lithium manganese oxide spinel as cathode materials for secondary lithium batteries.* Electrochimica Acta 49, 2209-2213.
85. Sickafus, K. E., Wills, J. M., and Grimes, N. W. (1999). *Structure of Spinel.* Journal of the American Ceramic Society 82, 3279-3292.
86. Thackeray, M. M., David, W. I. F., Bruce, P. G., and Goodenough, J. B. (1983). *Lithium insertion into manganese spinels.* Materials Research Bulletin 18, 461-472.
87. Julien, C. M., and Massot, M. (2003). *Lattice vibrations of materials for lithium rechargeable batteries I. Lithium manganese oxide spinel.* Materials Science and Engineering B 97, 217-230.
88. Sugiyama, J., Atsumi, T., Hioki, T., Noda, S., and Kamegashira, N. (1997). *Nonstoichiometry and defect structure of spinel LiMn2O4-[delta].* Journal of Power Sources 68, 641-645.
89. Shokoohi, F. K., Tarascon, J. M., and Wilkens, B. J. (1991). *Fabrication of thin-film LiMn[sub 2]O[sub 4] cathodes for rechargeable microbatteries.* Applied Physics Letters 59, 1260-1262.
90. Chiu, K. F., Hsu, F. C., Chen, G. S., and Wu, M. K. (2003). *Texture and Microstructure Development of RF Sputter-Deposited Polycrystalline Lithium Transition Metal Oxide Thin Films.* Journal of The Electrochemical Society 150, A503-A507.
91. Bates, J. B., Dudney, N. J., Lubben, D. C., Gruzalski, G. R., Kwak, B. S., Yu, X., and Zuhr, R. A. (1995). *Thin-film rechargeable lithium batteries.* Journal of Power Sources 54, 58-62.
92. Bates, J. B., Dudney, N. J., Neudecker, B., Ueda, A., and Evans, C. D. (2000). *Thin-film lithium and lithium-ion batteries.* Solid State Ionics 135, 33-45.

93. Dudney, N. J., Bates, J. B., Zuhr, R. A., Young, S., Robertson, J. D., Jun, H. P., and Hackney, S. A. (1999). *Nanocrystalline Li[sub x]Mn[sub 2-y]O[sub 4] Cathodes for Solid-State Thin-Film Rechargeable Lithium Batteries*. Journal of The Electrochemical Society 146, 2455-2464.

94. Hwang, K. H., Lee, S. H., and Joo, S. K. (1995). *Fabrication and characterization of an Li—Mn—O thin-film cathode for rechargeable lithium microbatteries*. Journal of Power Sources 54, 224-227.

95. Julien, C., Haro-Poniatowski, E., Camacho-Lopez, M. A., Escobar-Alarcon, L., and Jimenez-Jarquin, J. (2000). *Growth of LiMn2O4 thin films by pulsed-laser deposition and their electrochemical properties in lithium microbatteries*. Materials Science and Engineering B 72, 36-46.

96. Rougier, A., Striebel, K. A., Wen, S. J., Richardson, T. J., Reade, R. P., and Cairns, E. J. (1998). *Characterization of pulsed laser-deposited LiMn2O4 thin films for rechargeable lithium batteries*. Applied Surface Science 134, 107-115.

97. Singh, D., Kim, W. S., Craciun, V., Hofmann, H., and Singh, R. K. (2002). *Microstructural and electrochemical properties of lithium manganese oxide thin films grown by pulsed laser deposition*. Applied Surface Science 197-198, 516-521.

98. Hass, D. D., Groves, J. F., and Wadley, H. N. G. (2001). *Reactive vapor deposition of metal oxide coatings*. Surface & Coatings Technology 146, 85-93.

99. Hass, D. D., Parrish, P. A., and Wadley, H. N. G. (1998). *Electron beam directed vapor deposition of thermal barrier coatings*. Journal of Vacuum Science & Technology A: Vacuum, Surfaces, and Films 16, 3396-3401.

100. Groves, J. F., Wadley, H. N. G., Ritenour, A. P., Hass, D. D., and Ratnaparkhi, P. L. (1997). *Electron Beam Directed Vapor Deposition*. Proc. Electron Beam Melting and Refining, Bakish Material Corp, 46-60.

101. Groves, J. F., and Wadley, H. N. G. (1997). *Functionally graded materials synthesis via low vacuum directed vapor deposition*. Composites Part B: Engineering 28, 57-69.

102. Zhao, H., Yu, F., Bennett, T. D., and Wadley, H. N. G. *Morphology and thermal conductivity of yttria-stabilized zirconia coatings*. Acta Materialia In Press, Corrected Proof.

103. Bird, G. A. (1994). Molecular Gas *Dynamics and the Direct Simulation of Gas Flows* (Oxford: Clarendon Press).

104. Zhao, H., Yu, F., Bennett, T. D., and Wadley, H. N. G. (2006). *Morphology and thermal conductivity of yttria-stabilized zirconia coatings*. Acta Materialia 54, 5195-5207.

105. Hass, D. D., Marciano, Y., and Wadley, H. N. G. (2004). *Physical vapor deposition on cylindrical substrates*. Surface & Coatings Technology 185, 283-291.

106. Abramoff, M. D., Magelhaes, P. J., and Ram, S. J. (2004). *Image Processing with Image*, J. Biophotonics International 11, 36-42.

107. Dong, C., and Langford, J. I. (2000). *LAPODS: a computer program for refinement of lattice parameters using optimal regression*. Journal of Applied Crystallography 33, 1177-1179.

108. Kallend, J. S., Kocks, U. F., Rollett, A. D., and Wenk, H. R. (1991). *Operational texture analysis*. Materials Science and Engineering A 132, 1-11.

109. Ohring, M. (2002). *The materials science of thin films: deposition and structure* (San Diego, Calif. Academic press).

110. Jin, S.-w., Agnew, S. R., and Wadley, H. N. G. *Disordered lithium manganese oxide films fabricated by electron-beam directed vapor deposition*, in literature preparation.

111. Kocks, U. F., Tome, C. N., and Wenk, H.-R. (1998). *Texture and Anisotropy* (Cambridge, UK: Cambridge University Press).

112. ICDD No. 35-0782.

113. Xia, Y., and Yoshio, M. (1997). *Optimization of Spinel Li[sub 1+x]Mn[sub 2-y]O[sub 4] as a 4 V Li-Cell Cathode in Terms of a Li-Mn-O Phase Diagram*. Journal of The Electrochemical Society 144, 4186-4194.

114. Bartel, T. J., and Plimpton, S. J. (1992). AIAA 92-2860

115. Zhou, X. W., Johnson, R. A., and Wadley, H. N. G. (1997). *A molecular dynamics study of nickel vapor deposition: Temperature, incident angle, and adatom energy effects*. Acta Materialia 45, 1513-1524.

116. Thornton, J. A. (1975). *Influence of substrate temperature and deposition rate on structure of thick sputtered Cu coatings*. Journal of Vacuum Science and Technology 12, 830-835.

117. Thornton, J. A. (1974). *Influence of apparatus geometry and deposition conditions on the structure and topography of thick sputtered coatings*. Journal of Vacuum Science and Technology 11, 666-670.

118. Steinwandel, J., and Hoeschele, J. (1987). *Thermodynamics and kinetics of nucleation in metal vapors*. Particulate and Multiphase Processes, vol. 1 of General Particulate Phenomena, 571.

119. Hill, D. L. (1994). *Jet vapor deposition coating of fibers*, Masters Thesis, University of Virginia.

120. Perez, A., Melinon, P., Dupuis, V., Jensen, P., Prevel, B., Tuaillon, J., Bardotti, L., Martet, C., Treilleux, M., and Broyer et, a. (1997). *Cluster assembled materials: a novel class of nanostructured solids with original structures and properties*. Journal of Physics D: Applied Physics 30, 709-721.

121. Barborini, E., Piseri, P., Li Bassi, A., Ferrari, A. C., Bottani, C. E., and Milani, P. (1999). *Synthesis of carbon films with controlled nanostructure by separation of neutral clusters in supersonic beams*. Chemical Physics Letters 300, 633-638.

122. Haberland, H., Insepov, Z., and Moseler, M. (1995). *Molecular-dynamics simulation of thin-film growth by energetic cluster impact*. Physical Review B (Condensed Matter) 51, 11061-11067.

123. Muller, K.-H. (1985). *A computer model for postdeposition annealing of porous thin films*. Journal of Vacuum Science & Technology A: Vacuum, Surfaces, and Films 3, 2089-2092.

124. Grovenor, C. R. M., Hentzell, H. T. G., and Smith, D. A. (1984). *The development of grain structure during growth of metallic films*. Acta Metallurgica 32, 773-781.

125. Karl-Heinz, M. (1987). *Cluster-beam deposition of thin films: A molecular dynamics simulation*. Journal of Applied Physics 61, 2516-2521.

126. Cho, G. B., Cho, K. K., and Kim, K. W. (2006). *Effects of Ni film thickness on the structural stability of Si/Ni/Cu film electrodes*. Materials Letters 60, 90-93.

127. Messier, R. (1986). *Toward quantification of thin film morphology*. Journal of Vacuum Science & Technology A: Vacuum, Surfaces, and Films 4, 490-495.

128. Lloyd, J. R., and Nakahara, S. (1982). *Formation and growth of voids and/or gas bubbles in thin films*. Thin Solid Films 93, 281-286.

What is claimed is:

1. A method for forming electrolyte and cathode layers of a thin film battery on a substrate using directed vapor deposition, the method comprising sequentially forming each layer by:
   evaporating in a deposition chamber at least one source material for deposition on said substrate, the evaporation of said material generating a plurality of vapor molecules;
   inserting as a carrier gas an inert gas with at least one doping agent into the deposition chamber;
   aligning the vapor molecules using characteristics of the carrier gas such that the vapor molecules are directed for deposition on at least portions of the substrate by a stream of said carrier gas, wherein the deposition occurs at a rate of at least 1 nm/min, wherein the inert gas flow directs evaporated cathode source material directly to said substrate, thereby providing faster deposition than sputtering of source material without directed inert gas flow;
   wherein the at least one source material is selected from the group consisting of group IA metals, group IIA metals, group IIIB metals, group IVB metals, group VB metals, group VIB metals, group VIIB metals, group VIII metals, group IB metals, group IIB metals, mixtures thereof, compounds thereof, and alloys thereof;
   wherein the gas stream has an upstream pressure ($P_u$) and a downstream pressure ($P_d$), and wherein $P_u$ is at least twice $P_d$; and
only for the electrolyte layer, passing said gas stream through a plasma.

2. The method of claim 1, wherein the at least one source material comprises Li.

3. The method of claim 1, wherein the at least one source material is elemental Li.

4. The method of claim 1, wherein the at least one source material is a Li alloy.

5. The method of claim 1, wherein the at least one source material is lithium phosphate.

6. The method of claim 1, wherein the at least one doping agent is a compound used to fabricate thin film lithium ion batteries.

7. The method of claim 1, wherein the at least one doping agent is selected from the group consisting of nitrogen ($N_2$), oxygen ($O_2$), and ammonia ($NH_3$).

8. The method of claim 1, wherein the at least one doping agent is provided in a flux of from greater than 0 to $4.28 \times 10^{18}$ molecules/cm$^2$·s.

9. The method of claim 1, wherein the gas stream further comprises at least one inert component.

10. The method of claim 9, wherein the at least one inert component comprises at least one of helium (He), neon (Ne), argon (Ar), krypton (Kr), and Xenon (Xe).

11. The method of claim 1, wherein the substrate comprises an electron conductive material.

12. The method of claim 1, wherein the substrate comprises at least one of silicon, carbon, platinum, copper, and silver.

13. The method of claim 1, wherein the deposition occurs in a low-vacuum environment of from $7.5 \times 10^{-3}$ to 0.75 Torr.

14. The method of claim 1, wherein passing the gas stream through the plasma increases the gas phase reactivity and/or the surface reactivity of the at least one doping agent by causing the at least one doping agent to undergo a degree of electronic excitation, ionization and/or dissociation.

15. The method of claim 14, wherein passing the gas stream through the plasma also increases the gas phase reactivity and/or the surface reactivity of the at least one source material by causing the at least one source material to undergo a degree of electronic excitation, ionization and/or dissociation.

16. The method of claim 1, wherein the at least one entrained source material is at least one evaporant produced in a low vacuum environment by bombarding at least one source target with directed energy.

17. The method of claim 16, wherein the directed energy is an electron beam.

18. The method of claim 16, wherein the at least one source target is at least one $Li_3PO_4$ rod.

19. The method of claim 18, wherein the process further comprises initially sintering the at least one $Li_3PO_4$ rod in air.

20. The method of claim 19, wherein the sintering is conducted at a temperature of from 850 to 950° C. for a duration of from 9 to 11 hours.

21. The method of claim 16, wherein multiple source targets are bombarded with directed energy to produce multiple evaporants.

22. The method of claim 21, wherein the multiple source targets are bombarded with directed energy sequentially to produce a multilayer structure.

23. The method of claim 21, wherein the multiple source targets are bombarded with directed energy simultaneously.

24. The method of claim 1, further comprising applying a negative bias voltage to the substrate.

25. The method of claim 24, wherein the negative bias voltage is in a range of from 0 to 50 V.

26. The method of claim 1, wherein the deposition occurs at rate of up to 177.7 nm/min.

27. The method of claim 1, wherein the gas stream is supersonic.

28. The method of claim 1, wherein the electrolyte layer comprises at least three components, wherein the at least three components include:
   one or more cationic bonding components each selected from the group consisting of lithium (Li), sodium (Na), potassium (K), rubidium (Rb), cesium (Cs), francium (Fr), boron (B), aluminum (Al), gallium (Ga), indium (In), thallium (Tl);
   one or more anionic bonding components each selected from the group consisting of nitrogen (N), phosphorus (P), arsenic (As), antimony (Sb), bismuth (Bi), ununpentium (Uup), oxygen (O), sulfur (S), selenium (Se), tellurium (Te), polonium (Po), fluorine (F), chlorine (Cl), bromine (Br), and iodine (I); and
   optionally one or more covalent bonding components each selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanum (La), hafnium (Hf), tantalum (Ta), tungsten (W), rhenium (Re), osmium (Os), iridium (Ir), platinum (Pt), gold (Au), mercury (Hg), actinium (Ac), carbon (C), silicon (Si), germanium (Ge), tin (Sn), and lead (Pb).

29. The method of claim 28, wherein at least one layer produced is pore free.

30. The method of claim 28, wherein the electrolyte layer is a lithium phosphorus oxynitride (Lipon) film.

31. The method of claim 30, wherein the Lipon film has a nitrogen:phosphorous atomic ratio of 0.1 to 5.

32. The method of claim 30, wherein the Lipon film has a nitrogen:phosphorous atomic ratio of 0.39 to 1.49.

33. The method of claim 30, wherein the Lipon film has a thickness in the range of from 0.01-10 μm.

34. The method of claim 30, wherein the Lipon film has a thickness in the range of from 1-2 μm.

35. The method of claim 30, wherein the Lipon film has a lithium ion conductivity less than $10^{-7}$ S/cm.

36. The method of claim 30, wherein the Lipon film has a lithium ion conductivity in the range of from $10^{-6}$ to $10^{-7}$ S/cm.

37. The method of claim 1, wherein the substrate is positioned such that a plasma sheath is formed on at least one surface of the substrate, the plasma sheath establishing a potential which attracts positively charged ions toward the substrate.

38. The method of claim 1, wherein the plasma is an argon hollow cathode plasma, activated with a low voltage electron beam with a current of from 1 to 200 A, and wherein the hollow cathode injected electrons are accelerated towards an anode plate.

39. The method of claim 38, wherein the low voltage electron beam has a current of from 60 to 200 A.

40. The method of claim 39, wherein the low voltage electron beam has a current of from 120 to 150 A.

41. A method of fabricating a battery comprising:

fabricating a plurality of power cells each having a plurality of layers formed in accordance with the method of claim 1.

42. The method of claim 41, further comprising electrically interconnecting a current collecting layer of a first power cell to a current collecting layer of a second power cell, wherein said interconnecting is accomplished by lithographically electrically connecting said current collecting layers.

43. The method of claim 1, wherein the deposition takes place within a single chamber.

* * * * *